US012396486B2

(12) United States Patent
Illidge et al.

(10) Patent No.: US 12,396,486 B2
(45) Date of Patent: Aug. 26, 2025

(54) SMOKING SUBSTITUTE APPARATUS WITH ELECTRICAL CONTACTS

(71) Applicant: Imperial Tobacco Limited, Bristol (EE)

(72) Inventors: Benjamin Illidge, Liverpool (GB); Benjamin Astbury, Liverpool (GB); Nikhil Aggarwal, Liverpool (GB); Andrew Duckworth, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 451 days.

(21) Appl. No.: 17/687,063

(22) Filed: Mar. 4, 2022

(65) Prior Publication Data

US 2022/0183379 A1 Jun. 16, 2022

Related U.S. Application Data

(63) Continuation of application No. PCT/EP2020/076273, filed on Sep. 21, 2020.

(30) Foreign Application Priority Data

Sep. 20, 2019 (EP) .................................... 19198585
Sep. 20, 2019 (EP) .................................... 19198609

(51) Int. Cl.
*A24F 40/485* (2020.01)
*A24F 40/10* (2020.01)
(Continued)

(52) U.S. Cl.
CPC ............ *A24F 40/485* (2020.01); *A24F 40/10* (2020.01); *A24F 40/42* (2020.01); *H01R 13/24* (2013.01)

(58) Field of Classification Search
CPC ......... A24F 40/485; A24F 40/10; A24F 40/42
See application file for complete search history.

(56) References Cited

U.S. PATENT DOCUMENTS 8,997,753 B2 4/2015 Li et al.
9,901,122 B2 2/2018 Li et al.
(Continued)

FOREIGN PATENT DOCUMENTS

CN 208 286 368 U 12/2018
EP 2 712 511 A1 4/2014
(Continued)

OTHER PUBLICATIONS

International Search Report and Written Opinion (PCT/EP2020/076273), dated Dec. 7, 2020, 17 pages.
(Continued)

*Primary Examiner* — Philip Y Louie
*Assistant Examiner* — Jennifer A Kessie
(74) *Attorney, Agent, or Firm* — Dunlap Codding, P.C.

(57) ABSTRACT

A smoking substitute apparatus comprises: a housing having a longitudinal axis; an air outlet provided at a first end of the housing; an air inlet provided at a second end of the housing opposite to the first end; an air flow channel extending through the housing between the air inlet and the air outlet; a heater in fluid communication with the air flow channel. The heater is configured to generate an aerosol from an aerosol precursor. Electrical contacts are provided on a sidewall of the housing and are electrically connected with the heater. The electrical contacts are configured to engage with corresponding electrical terminals on a main body of a smoking substitute system.

15 Claims, 28 Drawing Sheets

(51) Int. Cl.
*A24F 40/42* (2020.01)
*H01R 13/24* (2006.01)

(56) References Cited

U.S. PATENT DOCUMENTS

| | | | |
|---|---|---|---|
| 2009/0032034 | A1 | 2/2009 | Steinberg |
| 2015/0013701 | A1 | 1/2015 | Liu |
| 2016/0029699 | A1* | 2/2016 | Li ........................... A24F 40/46 131/329 |
| 2016/0213065 | A1 | 7/2016 | Wensley et al. |
| 2016/0227837 | A1 | 8/2016 | Hammel et al. |
| 2017/0135399 | A1 | 5/2017 | Gavrielov et al. |
| 2017/0246405 | A1 | 8/2017 | Wensley et al. |
| 2017/0311644 | A1* | 11/2017 | Collett ...................... B65B 3/14 |
| 2017/0340011 | A1 | 11/2017 | Batista |
| 2018/0020735 | A1 | 1/2018 | Bilat et al. |
| 2018/0153219 | A1 | 6/2018 | Verleur et al. |
| 2018/0242643 | A1 | 8/2018 | Silvesstrini et al. |
| 2018/0360123 | A1 | 12/2018 | Silvestrini |

FOREIGN PATENT DOCUMENTS

| | | | |
|---|---|---|---|
| EP | 3 183 979 | A1 | 6/2017 |
| EP | 3 504 989 | A1 | 7/2019 |
| WO | WO 2013/149404 | A1 | 10/2013 |
| WO | WO 2016/050246 | A1 | 4/2016 |
| WO | WO 2017/051150 | A1 | 3/2017 |
| WO | WO 2017/163047 | A1 | 9/2017 |
| WO | WO 2019/154811 | A1 | 8/2019 |

OTHER PUBLICATIONS

International Search Report (19198585.2-1004), dated Apr. 17, 2020, 7 pages.

International Search Report (19198609.0-1004), dated Apr. 2, 2020, 14 pages.

* cited by examiner $I$ = 0.77% $I$ = 0.77% $I$ = 0.77%

$I$ = 1.06% $I$ = 1.06% $I$ = 1.06%

$I$ = 1.34% $I$ = 1.34% $I$ = 1.34%

SMOKING SUBSTITUTE APPARATUS WITH ELECTRICAL CONTACTS

CROSS-REFERENCE TO RELATED APPLICATIONS/INCORPORATION BY REFERENCE STATEMENT

This application is a non-provisional application claiming benefit to the international application no. PCT/EP2020/076273 filed on Sep. 21, 2020, which claims priority to EP 19198609.0 filed on Sep. 20, 2019 and to EP 19198585.2 filed on Sep. 20, 2019. The entire contents of each of the above-referenced applications are hereby incorporated herein by reference in their entirety.

FIELD OF THE DISCLOSURE

The present disclosure relates to a smoking substitute apparatus and, in particular, a smoking substitute apparatus that is able to deliver nicotine to a user in an effective manner.

BACKGROUND

The smoking of tobacco is generally considered to expose a smoker to potentially harmful substances. It is thought that a significant amount of the potentially harmful substances is generated through the burning and/or combustion of the tobacco and the constituents of the burnt tobacco in the tobacco smoke itself.

Low temperature combustion of organic material such as tobacco is known to produce tar and other potentially harmful by-products. There have been proposed various smoking substitute systems in which the conventional smoking of tobacco is avoided.

Such smoking substitute systems can form part of nicotine replacement therapies aimed at people who wish to stop smoking and overcome a dependence on nicotine.

Known smoking substitute systems include electronic systems that permit a user to simulate the act of smoking by producing an aerosol (also referred to as a "vapor") that is drawn into the lungs through the mouth (inhaled) and then exhaled. The inhaled aerosol typically bears nicotine and/or a flavorant without, or with fewer of, the health risks associated with conventional smoking.

In general, smoking substitute systems are intended to provide a substitute for the rituals of smoking, whilst providing the user with a similar, or improved, experience and satisfaction to those experienced with conventional smoking and with combustible tobacco products.

The popularity and use of smoking substitute systems has grown rapidly in the past few years. Although originally marketed as an aid to assist habitual smokers wishing to quit tobacco smoking, consumers are increasingly viewing smoking substitute systems as desirable lifestyle accessories. There are a number of different categories of smoking substitute systems, each utilizing a different smoking substitute approach. Some smoking substitute systems are designed to resemble a conventional cigarette and are cylindrical in form with a mouthpiece at one end. Other smoking substitute devices do not generally resemble a cigarette (for example, the smoking substitute device may have a generally box-like form, in whole or in part).

One approach is the so-called "vaping" approach, in which a vaporizable liquid, or an aerosol former, sometimes typically referred to herein as "e-liquid", is heated by a heating device (sometimes referred to herein as an electronic cigarette or "e-cigarette" device) to produce an aerosol vapor which is inhaled by a user. The e-liquid typically includes a base liquid, nicotine and may include a flavorant. The resulting vapor therefore also typically contains nicotine and/or a flavorant. The base liquid may include propylene glycol and/or vegetable glycerin.

A typical e-cigarette device includes a mouthpiece, a power source (typically a battery), a tank for containing e-liquid and a heating device. In use, electrical energy is supplied from the power source to the heating device, which heats the e-liquid to produce an aerosol (or "vapor") which is inhaled by a user through the mouthpiece.

E-cigarettes can be configured in a variety of ways. For example, there are "closed system" vaping smoking substitute systems, which typically have a sealed tank and heating element. The tank is pre-filled with e-liquid and is not intended to be refilled by an end user. One subset of closed system vaping smoking substitute systems include a main body which includes the power source, wherein the main body is configured to be physically and electrically couplable to a consumable including the tank and the heating element. In this way, when the tank of a consumable has been emptied of e-liquid, that consumable is removed from the main body and disposed of. The main body can then be reused by connecting it to a new, replacement, consumable. Another subset of closed system vaping smoking substitute systems are completely disposable, and intended for one-use only.

There are also "open system" vaping smoking substitute systems which typically have a tank that is configured to be refilled by a user. In this way the entire device can be used multiple times.

An example vaping smoking substitute system is the Myblu™ e-cigarette. The Myblu™ e-cigarette is a closed system which includes a main body and a consumable. The main body and consumable are physically and electrically coupled together by pushing the consumable into the main body. The main body includes a rechargeable battery. The consumable includes a mouthpiece and a sealed tank which contains e-liquid. The consumable further includes a heater, which for this device is a heating filament coiled around a portion of a wick. The wick is partially immersed in the e-liquid, and conveys e-liquid from the tank to the heating filament. The system is controlled by a microprocessor on board the main body. The system includes a sensor for detecting when a user is inhaling through the mouthpiece, the microprocessor then activating the device in response. When the system is activated, electrical energy is supplied from the power source to the heating device, which heats e-liquid from the tank to produce a vapor which is inhaled by a user through the mouthpiece.

SUMMARY OF THE DISCLOSURE

Development A

For a smoking substitute system, it is desirable to deliver nicotine into the user's lungs, where it can be absorbed into the bloodstream. However, the present disclosure is based in part on a realization that some prior art smoking substitute systems, such delivery of nicotine is not efficient. In some prior art systems, the aerosol droplets have a size distribution that is not suitable for delivering nicotine to the lungs. Aerosol droplets of a large particle size tend to be deposited in the mouth and/or upper respiratory tract. Aerosol particles of a small (e.g., sub-micron) particle size can be inhaled into the lungs but may be exhaled without delivering nicotine to the lungs. As a result, the user would require drawing a longer puff, more puffs, or vaporizing e-liquid with a higher nicotine concentration in order to achieve the desired experience.

Accordingly, there is a need for improvement in the delivery of nicotine to a user in the context of a smoking substitute system.

The present disclosure (Development A) has been devised in the light of the above considerations.

In a general aspect of Development A, the present disclosure relates to a smoking substitute apparatus with at least one electrical contact on a sidewall of the apparatus.

According to a first preferred aspect of Development A there is provided a smoking substitute apparatus comprising: a housing having a longitudinal axis; an air outlet provided at a first end of the housing; an air inlet provided at a second end of the housing opposite to the first end; an air flow channel extending through the housing between the air inlet and the air outlet; an aerosol generator in fluid communication with the air flow channel, wherein the aerosol generator is configured to generate an aerosol from an aerosol precursor; and one or more electrical contacts provided on a sidewall of the housing and electrically connected with the heater, wherein the one or more electrical contacts are configured to engage with corresponding electrical terminals on a main body of a smoking substitute system.

An advantage of positioning the one or more electrical contacts on a sidewall of the housing is to provide additional space at the second end of the housing for other features of the apparatus, such as allowing a larger inlet at the second end of the housing. It is considered that in turn this permits the airflow at the aerosol generator, to be more uniform. This can allow the generation of larger aerosol particles, which is considered to be advantageous for the reasons explained above.

In a second aspect of Development A, there is provided a method of operating a smoking substitute apparatus according to the first aspect of Development A, in which an air flow is drawn through the apparatus from the air inlet to the air outlet by user inhalation, and the heater operated to generate an aerosol from an aerosol precursor.

Optionally, the one or more electrical contacts are provided on an outer surface of the sidewall of the housing.

Optionally, the one or more electrical contacts have an electrically conductive surface which is parallel to the longitudinal axis of the housing.

Optionally, the one or more electrical contacts is resiliently movable in a radial direction.

Optionally, the one or more electrical contacts have an electrically conductive surface which is radial.

Optionally, the one or more electrical contacts is resiliently movable in an axial direction.

Optionally, a pair of contacts is provided on diametrically opposite sides of the housing.

Positioning the one or more electrical contacts on a sidewall of the housing can allow a larger inlet at the second end of the housing. Optionally, the air inlet has an area which is at least 50%, or at least 60%, or at least 70%, or at least 80%, or at least 90% of a total area of the second end of the housing.

The aerosol generator may include a heater, operable to vaporize the aerosol precursor.

In another aspect of the disclosure, there is provided a smoking substitute system comprising: a main body having one or more electrical contacts connected to, or connectable to, a power source in the main body; and a smoking substitute apparatus according to the first aspect.

Optionally, the one or more electrical contacts on the main body have an electrically conductive surface which is parallel to a longitudinal axis of the main body and the one or more electrical contacts of the smoking substitute apparatus have an electrically conductive surface which is parallel to the longitudinal axis of the housing, wherein respective contacts of the main body and the smoking substitute apparatus are configured to engage by a sliding fit.

Optionally, the one or more electrical contacts on the main body are resiliently movable in a radial direction.

Optionally, the one or more electrical contacts on the main body have a radial electrically conductive surface and the one or more electrical contacts of the smoking substitute apparatus have a radial electrically conductive surface.

Optionally, the one or more electrical contacts on the main body are resiliently movable in an axial direction.

In a further aspect of the disclosure, there is provided a smoking substitute device comprising a main body having one or more electrical contacts connected to, or connectable to, a power source in the main body, wherein said one or more electrical contacts are configured for engagement with the electrical contacts of a smoking substitute apparatus according to the first aspect.

The electrical contacts of the main body may be located on an inner wall of a recessed region. Said recessed region may be shaped to receive at least a corresponding part of the smoking substitute apparatus.

There now follows a disclosure of various optional features. These are intended to be applicable to Development A, disclosed above, and may also be applied in any combination (unless the context demands otherwise) to any aspect, embodiment or optional feature set out with respect to Development B.

The smoking substitute apparatus may be in the form of a consumable. The consumable may be configured for engagement with a main body. When the consumable is engaged with the main body, the combination of the consumable and the main body may form a smoking substitute system such as a closed smoking substitute system. For example, the consumable may comprise components of the system that are disposable, and the main body may comprise non-disposable or non-consumable components (e.g., power supply, controller, sensor, etc.) that facilitate the generation and/or delivery of aerosol by the consumable. In such an embodiment, the aerosol precursor (e.g., e-liquid) may be replenished by replacing a used consumable with an unused consumable.

Alternatively, the smoking substitute apparatus may be a non-consumable apparatus (e.g., that is in the form of an open smoking substitute system). In such embodiments an aerosol former (e.g., e-liquid) of the system may be replenished by re-filling, e.g., a reservoir of the smoking substitute apparatus, with the aerosol precursor (rather than replacing a consumable component of the apparatus).

In light of this, it should be appreciated that some of the features described herein as being part of the smoking substitute apparatus may alternatively form part of a main body for engagement with the smoking substitute apparatus. This may be the case in particular when the smoking substitute apparatus is in the form of a consumable.

Where the smoking substitute apparatus is in the form of a consumable, the main body and the consumable may be configured to be physically coupled together. For example, the consumable may be at least partially received in a recess of the main body, such that there is an interference fit between the main body and the consumable. Alternatively, the main body and the consumable may be physically coupled together by screwing one onto the other, or through a bayonet fitting, or the like.

Thus, the smoking substitute apparatus may comprise one or more engagement portions for engaging with a main body. In this way, one end of the smoking substitute apparatus may be coupled with the main body, whilst an opposing end of the smoking substitute apparatus may define a mouthpiece of the smoking substitute system.

The smoking substitute apparatus may comprise a reservoir configured to store an aerosol precursor, such as an e-liquid. The e-liquid may, for example, comprise a base liquid. The e-liquid may further comprise nicotine. The base liquid may include propylene glycol and/or vegetable glycerin. The e-liquid may be substantially flavorless. That is, the e-liquid may not contain any deliberately added additional flavorant and may consist solely of a base liquid of propylene glycol and/or vegetable glycerin and nicotine.

The reservoir may be in the form of a tank. At least a portion of the tank may be light-transmissive. For example, the tank may comprise a window to allow a user to visually assess the quantity of e-liquid in the tank. A housing of the smoking substitute apparatus may comprise a corresponding aperture (or slot) or window that may be aligned with a light-transmissive portion (e.g., window) of the tank. The reservoir may be referred to as a "clearomizer" if it includes a window, or a "cartomizer" if it does not.

The smoking substitute apparatus may comprise a passage for fluid flow therethrough. The passage may extend through (at least a portion of) the smoking substitute apparatus, between openings that may define an inlet and an outlet of the passage. The outlet may be at a mouthpiece of the smoking substitute apparatus. In this respect, a user may draw fluid (e.g., air) into and through the passage by inhaling at the outlet (i.e., using the mouthpiece). The passage may be at least partially defined by the tank. The tank may substantially (or fully) define the passage, for at least a part of the length of the passage. In this respect, the tank may surround the passage, e.g., in an annular arrangement around the passage.

The aerosol generator may comprise a wick. The aerosol generator may further comprise a heater. The wick may comprise a porous material, capable of wicking the aerosol precursor. A portion of the wick may be exposed to air flow in the passage. The wick may also comprise one or more portions in contact with liquid stored in the reservoir. For example, opposing ends of the wick may protrude into the reservoir and an intermediate portion (between the ends) may extend across the passage so as to be exposed to air flow in the passage. Thus, liquid may be drawn (e.g., by capillary action) along the wick, from the reservoir to the portion of the wick exposed to air flow.

The heater may comprise a heating element, which may be in the form of a filament wound about the wick (e.g., the filament may extend helically about the wick in a coil configuration). The heating element may be wound about the intermediate portion of the wick that is exposed to air flow in the passage. The heating element may be electrically connected (or connectable) to a power source. Thus, in operation, the power source may apply a voltage across the heating element so as to heat the heating element by resistive heating. This may cause liquid stored in the wick (i.e., drawn from the tank) to be heated so as to form a vapor and become entrained in air flowing through the passage. This vapor may subsequently cool to form an aerosol in the passage, typically downstream from the heating element.

The smoking substitute apparatus may comprise a vaporization chamber. The vaporization chamber may form part of the passage in which the heater is located. The vaporization chamber may be arranged to be in fluid communication with the inlet and outlet of the passage. The vaporization chamber may be an enlarged portion of the passage. In this respect, the air as drawn in by the user may entrain the generated vapor in a flow away from heater. The entrained vapor may form an aerosol in the vaporization chamber, or it may form the aerosol further downstream along the passage. The vaporization chamber may be at least partially defined by the tank. The tank may substantially (or fully) define the vaporization chamber. In this respect, the tank may surround the vaporization chamber, e.g., in an annular arrangement around the vaporization chamber.

In use, the user may puff on a mouthpiece of the smoking substitute apparatus, i.e., draw on the smoking substitute apparatus by inhaling, to draw in an air stream therethrough. A portion, or all, of the air stream (also referred to as a "main air flow") may pass through the vaporization chamber so as to entrain the vapor generated at the heater. That is, such a main air flow may be heated by the heater (although typically only to a limited extent) as it passes through the vaporization chamber. Alternatively, or in addition, a portion of the air stream (also referred to as a "dilution air flow" or "bypass air flow") may bypass the vaporization chamber and be directed to mix with the generated aerosol downstream from the vaporization chamber. That is, the dilution air flow may be an air stream at an ambient temperature and may not be directly heated at all by the heater. The dilution air flow may combine with the main air flow for diluting the aerosol contained therein. The dilution air flow may merge with the main air flow along the passage downstream from the vaporization chamber. Alternatively, the dilution air flow may be directly inhaled by the user without passing though the passage of the smoking substitute apparatus.

As a user puffs on the mouthpiece, vaporized e-liquid entrained in the passing air flow may be drawn towards the outlet of passage. The vapor may cool, and thereby nucleate and/or condense along the passage to form a plurality of aerosol droplets, e.g., nicotine-containing aerosol droplets. A portion of these aerosol droplets may be delivered to and be absorbed at a target delivery site, e.g., a user's lung, whilst a portion of the aerosol droplets may instead adhere onto other parts of the user's respiratory tract, e.g., the user's oral cavity and/or throat. Typically, in some known smoking substitute apparatuses, the aerosol droplets as measured at the outlet of the passage, e.g., at the mouthpiece, may have a droplet size, $d_{50}$, of less than 1 μm.

In some embodiments of the disclosure, the $d_{50}$ particle size of the aerosol particles is preferably at least 1 micron. Typically, the $d_{50}$ particle size is not more than 10 microns, preferably not more than 9 microns, not more than 8 microns, not more than 7 microns, not more than 6 microns, not more than 5 microns, not more than 4 microns or not more than 3 microns. It is considered that providing aerosol particle sizes in such ranges permits improved interaction between the aerosol particles and the user's lungs.

The mean particle droplet sizes, $d_{50}$, of an aerosol may be measured by a laser diffraction technique. For example, the stream of aerosol output from the outlet of the passage may be drawn through a Malvern Spraytec laser diffraction system, where the intensity and pattern of scattered laser light are analyzed to calculate the size and size distribution of aerosol droplets. As will be readily understood, the particle size distribution may be expressed in terms of $d_{10}$, $d_{50}$ and $d_{90}$, for example. Considering a cumulative plot of the volume of the particles measured by the laser diffraction technique, the $d_{10}$ particle size is the particle size below which 10% by volume of the sample lies. The $d_{50}$ particle size is the particle size below which 50% by volume of the sample lies. The $d_{90}$ particle size is the particle size below which 90% by volume of the sample lies. Unless otherwise indicated herein, the particle size measurements are volume-based particle size measurements, rather than number-based or mass-based particle size measurements.

The smoking substitute apparatus (or main body engaged with the smoking substitute apparatus) may comprise a power source. The power source may be electrically connected (or connectable) to a heater of the smoking substitute apparatus (e.g., when the smoking substitute apparatus is engaged with the main body). The power source may be a battery (e.g., a rechargeable battery). A connector in the form of, e.g., a USB port may be provided for recharging this battery.

When the smoking substitute apparatus is in the form of a consumable, the smoking substitute apparatus may comprise an electrical interface for interfacing with a corresponding electrical interface of the main body. One or both of the electrical interfaces may include one or more electrical contacts. Thus, when the main body is engaged with the consumable, the electrical interface of the main body may be configured to transfer electrical power from the power source to a heater of the consumable via the electrical interface of the consumable.

The electrical interface of the smoking substitute apparatus may also be used to identify the smoking substitute apparatus (in the form of a consumable) from a list of known types. For example, the consumable may have a certain concentration of nicotine and the electrical interface may be used to identify this. The electrical interface may additionally or alternatively be used to identify when a consumable is connected to the main body.

Again, where the smoking substitute apparatus is in the form of a consumable, the main body may comprise an identification means, which may, for example, be in the form of an RFID reader, a barcode or QR code reader. This identification means may be able to identify a characteristic (e.g., a type) of a consumable engaged with the main body. In this respect, the consumable may include any one or more of an RFID chip, a barcode or QR code, or memory within which is an identifier and which can be interrogated via the identification means.

The smoking substitute apparatus or main body may comprise a controller, which may include a microprocessor. The controller may be configured to control the supply of power from the power source to the heater of the smoking substitute apparatus (e.g., via the electrical contacts). A memory may be provided and may be operatively connected to the controller. The memory may include non-volatile memory. The memory may include instructions which, when implemented, cause the controller to perform certain tasks or steps of a method.

The main body or smoking substitute apparatus may comprise a wireless interface, which may be configured to communicate wirelessly with another device, for example a mobile device, e.g., via Bluetooth®. To this end, the wireless interface could include a Bluetooth® antenna. Other wireless communication interfaces, e.g., WIFI®, are also possible. The wireless interface may also be configured to communicate wirelessly with a remote server.

A puff sensor may be provided that is configured to detect a puff (i.e., inhalation from a user). The puff sensor may be operatively connected to the controller so as to be able to provide a signal to the controller that is indicative of a puff state (i.e., puffing or not puffing). The puff sensor may, for example, be in the form of a pressure sensor or an acoustic sensor. That is, the controller may control power supply to the heater of the consumable in response to a puff detection by the sensor. The control may be in the form of activation of the heater in response to a detected puff. That is, the smoking substitute apparatus may be configured to be activated when a puff is detected by the puff sensor. When the smoking substitute apparatus is in the form of a consumable, the puff sensor may be provided in the consumable or alternatively may be provided in the main body.

The term "flavorant" is used to describe a compound or combination of compounds that provide flavor and/or aroma. For example, the flavorant may be configured to interact with a sensory receptor of a user (such as an olfactory or taste receptor). The flavorant may include one or more volatile substances.

The flavorant may be provided in solid or liquid form. The flavorant may be natural or synthetic. For example, the flavorant may include menthol, licorice, chocolate, fruit flavor (including, e.g., citrus, cherry etc.), vanilla, spice (e.g., ginger, cinnamon) and tobacco flavor. The flavorant may be evenly dispersed or may be provided in isolated locations and/or varying concentrations.

The present inventors consider that a flow rate of 1.3 L $min^{-1}$ is towards the lower end of a typical user expectation of flow rate through a conventional cigarette and therefore through a user-acceptable smoking substitute apparatus. The present inventors further consider that a flow rate of 2.0 L $min^{-1}$ is towards the higher end of a typical user expectation of flow rate through a conventional cigarette and therefore through a user-acceptable smoking substitute apparatus. Embodiments of the present disclosure therefore provide an aerosol with advantageous particle size characteristics across a range of flow rates of air through the apparatus.

The aerosol may have a Dv50 of at least 1.1 μm, at least 1.2 μm, at least 1.3 μm, at least 1.4 μm, at least 1.5 μm, at least 1.6 μm, at least 1.7 μm, at least 1.8 μm, at least 1.9 μm or at least 2.0 μm.

The aerosol may have a Dv50 of not more than 4.9 μm, not more than 4.8 μm, not more than 4.7 μm, not more than 4.6 μm, not more than 4.5 μm, not more than 4.4 μm, not more than 4.3 μm, not more than 4.2 μm, not more than 4.1 μm, not more than 4.0 μm, not more than 3.9 μm, not more than 3.8 μm, not more than 3.7 μm, not more than 3.6 μm, not more than 3.5 μm, not more than 3.4 μm, not more than 3.3 μm, not more than 3.2 μm, not more than 3.1 μm or not more than 3.0 μm.

A particularly preferred range for Dv50 of the aerosol is in the range 2-3 μm.

The air inlet, flow passage, outlet and the vaporization chamber may be configured so that, when the air flow rate inhaled by the user through the apparatus is 1.3 L $min^{-1}$, the average magnitude of velocity of air in the vaporization chamber is in the range 0-1.3 $ms^{-1}$. The average magnitude velocity of air may be calculated based on knowledge of the geometry of the vaporization chamber and the flow rate.

When the air flow rate inhaled by the user through the apparatus is 1.3 L $min^{-1}$, the average magnitude of velocity of air in the vaporization chamber may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 1.3 L $min^{-1}$, the average magnitude of velocity of air in the vaporization chamber may be at most 1.2 $ms^{-1}$, at most 1.1 $ms^{-1}$, at most 1.0 $ms^{-1}$, at most 0.9 $ms^{-1}$, at most 0.8 $ms^{-1}$, at most 0.7 $ms^{-1}$ or at most 0.6 $ms^{-1}$.

The air inlet, flow passage, outlet and the vaporization chamber may be configured so that, when the air flow rate inhaled by the user through the apparatus is 2.0 L $min^{-1}$, the average magnitude of velocity of air in the vaporization chamber is in the range 0-1.3 $ms^{-1}$. The average magnitude velocity of air may be calculated based on knowledge of the geometry of the vaporization chamber and the flow rate.

When the air flow rate inhaled by the user through the apparatus is 2.0 L $min^{-1}$, the average magnitude of velocity of air in the vaporization chamber may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 2.0 L $min^{-1}$, the average magnitude of velocity of air in the vaporization chamber may be at most 1.2 $ms^{-1}$, at most 1.1 $ms^{-1}$, at most 1.0 $ms^{-1}$, at most 0.9 $ms^{-1}$, at most 0.8 $ms^{-1}$, at most 0.7 $ms^{-1}$ or at most 0.6 $ms^{-1}$.

When the calculated average magnitude of velocity of air in the vaporization chamber is in the ranges specified, it is considered that the resultant aerosol particle size is advantageously controlled to be in a desirable range. It is further considered that the configuration of the apparatus can be selected so that the average magnitude of velocity of air in the vaporization chamber can be brought within the ranges specified, at the exemplary flow rate of 1.3 L $min^{-1}$ and/or the exemplary flow rate of 2.0 L $min^{-1}$.

The aerosol generator may comprise a vaporizer element loaded with aerosol precursor, the vaporizer element being heatable by a heater and presenting a vaporizer element surface to air in the vaporization chamber. A vaporizer element region may be defined as a volume extending outwardly from the vaporizer element surface to a distance of 1 mm from the vaporizer element surface.

The air inlet, flow passage, outlet and the vaporization chamber may be configured so that, when the air flow rate inhaled by the user through the apparatus is 1.3 L $min^{-1}$, the average magnitude of velocity of air in the vaporizer element region is in the range 0-1.2 $ms^{-1}$. The average magnitude of velocity of air in the vaporizer element region may be calculated using computational fluid dynamics.

When the air flow rate inhaled by the user through the apparatus is 1.3 L $min^{-1}$, the average magnitude of velocity of air in the vaporizer element region may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 1.3 L $min^{-1}$, the average magnitude of velocity of air in the vaporizer element region may be at most 1.1 $ms^{-1}$, at most 1.0 $ms^{-1}$, at most 0.9 $ms^{-1}$, at most 0.8 $ms^{-1}$, at most 0.7 $ms^{-1}$ or at most 0.6 $ms^{-1}$.

The air inlet, flow passage, outlet and the vaporization chamber may be configured so that, when the air flow rate inhaled by the user through the apparatus is 2.0 L $min^{-1}$, the average magnitude of velocity of air in the vaporizer element region is in the range 0-1.2 $ms^{-1}$. The average magnitude of velocity of air in the vaporizer element region may be calculated using computational fluid dynamics.

When the air flow rate inhaled by the user through the apparatus is 2.0 L $min^{-1}$, the average magnitude of velocity of air in the vaporizer element region may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 2.0 L $min^{-1}$, the average magnitude of velocity of air in the vaporizer element region may be at most 1.1 $ms^{-1}$, at most 1.0 $ms^{-1}$, at most 0.9 $ms^{-1}$, at most 0.8 $ms^{-1}$, at most 0.7 $ms^{-1}$ or at most 0.6 $ms^{-1}$.

When the average magnitude of velocity of air in the vaporizer element region is in the ranges specified, it is considered that the resultant aerosol particle size is advantageously controlled to be in a desirable range. It is further considered that the velocity of air in the vaporizer element region is more relevant to the resultant particle size characteristics than consideration of the velocity in the vaporization chamber as a whole. This is in view of the significant effect of the velocity of air in the vaporizer element region on the cooling of the vapor emitted from the vaporizer element surface.

Additionally, or alternatively is it relevant to consider the maximum magnitude of velocity of air in the vaporizer element region.

Therefore, the air inlet, flow passage, outlet and the vaporization chamber may be configured so that, when the air flow rate inhaled by the user through the apparatus is 1.3 L $min^{-1}$, the maximum magnitude of velocity of air in the vaporizer element region is in the range 0-2.0 $ms^{-1}$.

When the air flow rate inhaled by the user through the apparatus is 1.3 L $min^{-1}$, the maximum magnitude of velocity of air in the vaporizer element region may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 1.3 L $min^{-1}$, the maximum magnitude of velocity of air in the vaporizer element region may be at most 1.9 $ms^{-1}$, at most 1.8 $ms^{-1}$, at most 1.7 $ms^{-1}$, at most 1.6 $ms^{-1}$, at most 1.5 $ms^{-1}$, at most 1.4 $ms^{-1}$, at most 1.3 $ms^{-1}$ or at most 1.2 $ms^{-1}$.

The air inlet, flow passage, outlet and the vaporization chamber may be configured so that, when the air flow rate inhaled by the user through the apparatus is 2.0 L $min^{-1}$, the maximum magnitude of velocity of air in the vaporizer element region is in the range 0-2.0 $ms^{-1}$.

When the air flow rate inhaled by the user through the apparatus is 2.0 L $min^{-1}$, the maximum magnitude of velocity of air in the vaporizer element region may be at least 0.001 $ms^{-1}$, or at least 0.005 $ms^{-1}$, or at least 0.01 $ms^{-1}$, or at least 0.05 $ms^{-1}$.

When the air flow rate inhaled by the user through the apparatus is 2.0 L $min^{-1}$, the maximum magnitude of velocity of air in the vaporizer element region may be at most 1.9 $ms^{-1}$, at most 1.8 $ms^{-1}$, at most 1.7 $ms^{-1}$, at most 1.6 $ms^{-1}$, at most 1.5 $ms^{-1}$, at most 1.4 $ms^{-1}$, at most 1.3 $ms^{-1}$ or at most 1.2 $ms^{-1}$.

It is considered that configuring the apparatus in a manner to permit such control of velocity of the airflow at the vaporizer permits the generation of aerosols with particularly advantageous particle size characteristics, including Dv50 values.

Additionally, or alternatively is it relevant to consider the turbulence intensity in the vaporizer chamber in view of the effect of turbulence on the particle size of the generated aerosol. For example, the air inlet, flow passage, outlet and the vaporization chamber may be configured so that, when the air flow rate inhaled by the user through the apparatus is 1.3 L $min^{-1}$, the turbulence intensity in the vaporizer element region is not more than 1%.

When the air flow rate inhaled by the user through the apparatus is 1.3 L $min^{-1}$, the turbulence intensity in the vaporizer element region may be not more than 0.95%, not more than 0.9%, not more than 0.85%, not more than 0.8%, not more than 0.75%, not more than 0.7%, not more than 0.65% or not more than 0.6%.

It is considered that configuring the apparatus in a manner to permit such control of the turbulence intensity in the vaporizer element region permits the generation of aerosols with particularly advantageous particle size characteristics, including Dv50 values.

Following detailed investigations, the inventors consider, without wishing to be bound by theory, that the particle size characteristics of the generated aerosol may be determined by the cooling rate experienced by the vapor after emission from the vaporizer element (e.g., wick). In particular, it appears that imposing a relatively slow cooling rate on the vapor has the effect of generating aerosols with a relatively large particle size. The parameters discussed above (velocity and turbulence intensity) are considered to be mechanisms for implementing a particular cooling dynamic to the vapor.

More generally, it is considered that the air inlet, flow passage, outlet and the vaporization chamber may be configured so that a desired cooling rate is imposed on the vapor. The particular cooling rate to be used depends of course on the nature of the aerosol precursor and other conditions. However, for a particular aerosol precursor it is possible to define a set of testing conditions in order to define the cooling rate, and by extension this imposes limitations on the configuration of the apparatus to permit such cooling rates as are shown to result in advantageous aerosols. Accordingly, the air inlet, flow passage, outlet and the vaporization chamber may be configured so that the cooling rate of the vapor is such that the time taken to cool to 50° C. is not less than 16 ms, when tested according to the following protocol. The aerosol precursor is an e-liquid consisting of 1.6% freebase nicotine and the remainder a 65:35 propylene glycol and vegetable glycerin mixture, the e-liquid having a boiling point of 209° C. Air is drawn into the air inlet at a temperature of 25° C. The vaporizer is operated to release a vapor of total particulate mass 5 mg over a 3 second duration from the vaporizer element surface in an air flow rate between the air inlet and outlet of 1.3 L $min^{-1}$.

Additionally, or alternatively, the air inlet, flow passage, outlet and the vaporization chamber may be configured so that the cooling rate of the vapor is such that the time taken to cool to 50° C. is not less than 16 ms, when tested according to the following protocol. The aerosol precursor is an e-liquid consisting of 1.6% freebase nicotine and the remainder a 65:35 propylene glycol and vegetable glycerin mixture, the e-liquid having a boiling point of 209° C. Air is drawn into the air inlet at a temperature of 25° C. The vaporizer is operated to release a vapor of total particulate mass 5 mg over a 3 second duration from the vaporizer element surface in an air flow rate between the air inlet and outlet of 2.0 L $min^{-1}$.

Cooling of the vapor such that the time taken to cool to 50° C. is not less than 16 ms corresponds to an equivalent linear cooling rate of not more than 10° C./ms.

The equivalent linear cooling rate of the vapor to 50° C. may be not more than 9° C./ms, not more than 8° C./ms, not more than 7° C./ms, not more than 6° C./ms or not more than 5° C./ms.

Cooling of the vapor such that the time taken to cool to 50° C. is not less than 32 ms corresponds to an equivalent linear cooling rate of not more than 5° C./ms.

The testing protocol set out above considers the cooling of the vapor (and subsequent aerosol) to a temperature of 50° C. This is a temperature which can be considered to be suitable for an aerosol to exit the apparatus for inhalation by a user without causing significant discomfort. It is also possible to consider cooling of the vapor (and subsequent aerosol) to a temperature of 75° C. Although this temperature is possibly too high for comfortable inhalation, it is considered that the particle size characteristics of the aerosol are substantially settled by the time the aerosol cools to this temperature (and they may be settled at still higher temperature).

Accordingly, the air inlet, flow passage, outlet and the vaporization chamber may be configured so that the cooling rate of the vapor is such that the time taken to cool to 75° C. is not less than 4.5 ms, when tested according to the following protocol. The aerosol precursor is an e-liquid consisting of 1.6% freebase nicotine and the remainder a 65:35 propylene glycol and vegetable glycerin mixture, the e-liquid having a boiling point of 209° C. Air is drawn into the air inlet at a temperature of 25° C. The vaporizer is operated to release a vapor of total particulate mass 5 mg over a 3 second duration from the vaporizer element surface in an air flow rate between the air inlet and outlet of 1.3 L $min^{-1}$.

Additionally, or alternatively, the air inlet, flow passage, outlet and the vaporization chamber may be configured so that the cooling rate of the vapor is such that the time taken to cool to 75° C. is not less than 4.5 ms, when tested according to the following protocol. The aerosol precursor is an e-liquid consisting of 1.6% freebase nicotine and the remainder a 65:35 propylene glycol and vegetable glycerin mixture, the e-liquid having a boiling point of 209° C. Air is drawn into the air inlet at a temperature of 25° C. The vaporizer is operated to release a vapor of total particulate mass 5 mg over a 3 second duration from the vaporizer element surface in an air flow rate between the air inlet and outlet of 2.0 L $min^{-1}$.

Cooling of the vapor such that the time taken to cool to 75° C. is not less than 4.5 ms corresponds to an equivalent linear cooling rate of not more than 30° C./ms.

The equivalent linear cooling rate of the vapor to 75° C. may be not more than 29° C./ms, not more than 28° C./ms, not more than 27° C./ms, not more than 26° C./ms, not more than 25° C./ms, not more than 24° C./ms, not more than 23° C./ms, not more than 22° C./ms, not more than 21° C./ms, not more than 20° C./ms, not more than 19° C./ms, not more than 18° C./ms, not more than 17° C./ms, not more than 16° C./ms, not more than 15° C./ms, not more than 14° C./ms, not more than 13° C./ms, not more than 12° C./ms, not more than 11° C./ms or not more than 10° C./ms.

Cooling of the vapor such that the time taken to cool to 75° C. is not less than 13 ms corresponds to an equivalent linear cooling rate of not more than 10° C./ms.

It is considered that configuring the apparatus in a manner to permit such control of the cooling rate of the vapor permits the generation of aerosols with particularly advantageous particle size characteristics, including Dv50 values.

Development B

For a smoking substitute system, it is desirable to deliver nicotine into the user's lungs, where it can be absorbed into the bloodstream. However, the present disclosure is based in part on a realization that some prior art smoking substitute systems, such delivery of nicotine is not efficient. In some prior art systems, the aerosol droplets have a size distribution that is not suitable for delivering nicotine to the lungs. Aerosol droplets of a large particle size tend to be deposited in the mouth and/or upper respiratory tract. Aerosol particles of a small (e.g., sub-micron) particle size can be inhaled into the lungs but may be exhaled without delivering nicotine to the lungs. As a result, the user would require drawing a longer puff, more puffs, or vaporizing e-liquid with a higher nicotine concentration in order to achieve the desired experience.

Accordingly, there is a need for improvement in the delivery of nicotine to a user in the context of a smoking substitute system.

The present disclosure (Development B) has been devised in the light of the above considerations.

In a general aspect of Development B, the present disclosure relates to a smoking substitute apparatus with an enlarged air inlet.

According to a first preferred aspect of Development B there is provided a smoking substitute apparatus comprising: a housing having a longitudinal axis; an air inlet provided at a first end of the housing and an air outlet provided at a second end of the housing opposite the first end; an air flow channel extending longitudinally between the air inlet and the air outlet through the housing; and an aerosol generation chamber, the aerosol generation chamber having an aerosol generator configured to generate an aerosol from an aerosol precursor, wherein the aerosol generation chamber forms part of the air flow channel at a position downstream of the air inlet along the air flow channel; wherein the first end of the housing has a first cross-sectional area and the air inlet has a second cross-sectional area, and wherein a ratio of the second cross-sectional area to the first cross-sectional area, expressed as a percentage, is at least 5%.

Optionally, the ratio of the second cross-sectional area to the first cross-sectional area, expressed as a percentage, is at least 10%, optionally at least 20%, optionally at least 30%, optionally at least 40%, optionally at least 50%, optionally at least 60%, optionally at least 70%, optionally at least 80%, optionally at least 90%.

Optionally, the ratio of the second cross-sectional area to the first cross-sectional area, expressed as a percentage, is less than 95%.

An enlarged cross-sectional area of the air inlet can reduce velocity of the air flow as the incoming air flow is now distributed over a larger cross-sectional area. An enlarged cross-sectional area of the air inlet can help to provide a more even air flow in the aerosol generation chamber. The air flow may be more evenly distributed across the aerosol generation chamber, which can improve an area of contact between the air flow and an aerosol generator, such as a heater. The air flow may be less turbulent in the aerosol generation chamber. The above factors can help to increase particle size of particles formed in the aerosol generation chamber.

Optionally, the aerosol generation chamber has a third cross-sectional area, and wherein the second cross-sectional area is less than the third cross-sectional area. The ratio may be at least 10%, optionally at least 20%, optionally at least 30%, optionally at least 40%, optionally at least 50%, optionally at least 60%, optionally at least 70%, optionally at least 80%, optionally at least 90%.

Optionally, the aerosol generation chamber has a third cross-sectional area, and wherein the second cross-sectional area is equal to the third cross-sectional area.

An enlarged cross-sectional area of the air inlet can help to reduce turbulence, or jetting, of air flow in the aerosol generation chamber. This can help to increase particle size of particles formed in the aerosol generation chamber. The cross-sectional area of the aerosol generation chamber (i.e., the "third cross-sectional area") may be measured immediately downstream of the air inlet. Alternatively, the "third cross-sectional area" may be the largest cross-sectional area of the aerosol generation chamber. This may be at a position which is offset (along the longitudinal axis of the housing) downstream from the air inlet.

Optionally, the air inlet is configured to receive air flow from a substantially radial direction. The need to change the direction of incoming air flow from the radial direction to a generally longitudinal direction (i.e., aligned with, or parallel to, a longitudinal axis of the housing) can increase the issue of turbulence and/or jetting of air in the aerosol generation chamber. The enlarged inlet can help to reduce velocity of the air flow and/or reduce turbulence. The use of a radial air flow path to the air inlet can allow an air flow path to the smoking substitute apparatus which does not have to be routed via a main body of a smoking substitute system.

Optionally, the air inlet has a first dimension in a first direction within a plane defined by the air inlet and a second dimension in a second direction orthogonal to the first direction, the second direction also being within the plane defined by the air inlet, wherein the first dimension is greater than the second dimension.

The first dimension may be parallel to a longitudinal axis of a heater, or other aerosol generator, in the aerosol generation chamber. This can help to match the incoming air flow to the shape of the aerosol generator.

Optionally, the air inlet is centered on the longitudinal axis of the housing.

Optionally, the smoking substitute apparatus comprises at least one electrical contact provided adjacent to the air inlet, wherein the at least one electrical contact is electrically connected to a heating element of the aerosol generator.

Optionally, the at least one electrical contact is located beyond a perimeter of the air inlet. This can reduce obstruction of the air inlet which can help to reduce turbulence, or jetting, of air flow in the aerosol generation chamber.

Optionally, the at least one electrical contact is substantially flush with an end face of the housing.

Optionally, a channel is provided between the housing and the at least one electrical contact, the channel extending from the air inlet, the channel extending towards a perimeter of the housing. The channel can help to guide air flow toward the air inlet and may reduce the amount of incoming air flow which has to pass around the electrical contact. This can reduce turbulence.

Optionally, at least one electrical contact is provided across the air inlet and wherein a perimeter of the air inlet extends radially beyond the at least one electrical contact, such that there is an air flow path between a perimeter of the housing and the air inlet which is not obstructed by the at least one electrical contact. This can help to reduce turbulence of the incoming air flow, which can help to increase particle size of particles formed in the aerosol generation chamber.

Another aspect of Development B provides a smoking substitute system comprising: a main body; and a smoking substitute apparatus according to the first aspect.

Optionally, the smoking substitute system comprises an upstream air flow channel positioned at least in part between the main body and the smoking substitute apparatus, the upstream air flow channel fluidly connecting with the air inlet. This allows an air flow path to the smoking substitute apparatus which does not have to be routed via the main body.

At least one embodiment may reduce an amount of jetting of the air flow leading to the aerosol generator. Stated another way, the air flow is made more even, or less turbulent. This can improve an area of contact between the air flow and the aerosol generator. An advantage of reduced turbulence is an increased particle size of an aerosol generated in the aerosol generation chamber. As explained above, aerosol particles of a small (e.g., sub-micron) particle size are undesirable as they can be inhaled into the lungs but may be exhaled without delivering nicotine to the lungs. The $d_{50}$ particle size of the aerosol particles is preferably at least 1 micron. Typically, the $d_{50}$ particle size is not more than 10 microns, preferably not more than 9 microns, not more than 8 microns, not more than 7 microns, not more than 6 microns, not more than 5 microns, not more than 4 microns or not more than 3 microns. It is considered that providing aerosol particle sizes in such ranges permits improved interaction between the aerosol particles and the user's lungs.

The disclosure includes the combination of the developments, aspects and preferred features described except where such a combination is clearly impermissible or expressly avoided.

BRIEF DESCRIPTION OF THE DRAWINGS

So that the disclosure may be understood, and so that further aspects and features thereof may be appreciated, embodiments illustrating the principles of the disclosure will now be discussed in further detail with reference to the accompanying figures, in which.

DETAILED DESCRIPTION

Further background to the present disclosure and further aspects and embodiments of the present disclosure will now be discussed with reference to the accompanying figures. Further aspects and embodiments will be apparent to those skilled in the art. The contents of all documents mentioned in this text are incorporated herein by reference in their entirety.

Figure 17:
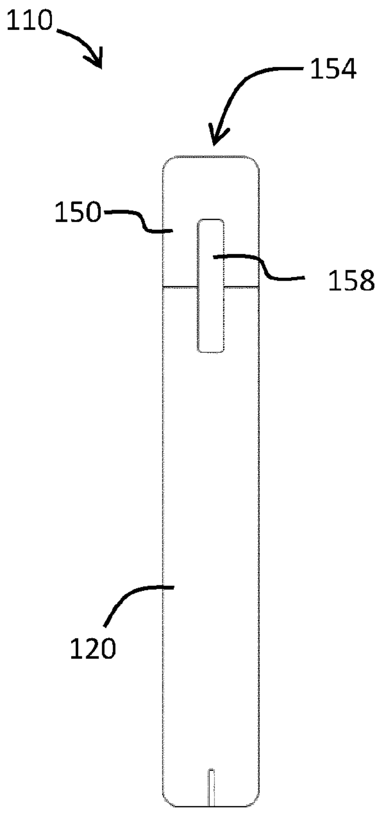
FIG. 17 is a schematic front view of a smoking substitute system, according to a first embodiment, in an engaged position.
Figure 18:
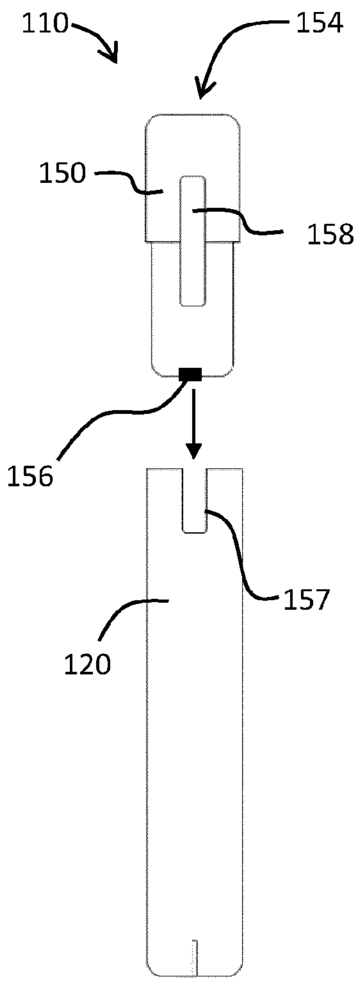
FIG. 18 is a schematic front view of the smoking substitute system of the first embodiment in a disengaged position.

FIGS. 17 and 18 illustrate a smoking substitute system in the form of an e-cigarette system 110. The system 110 comprises a main body 120 of the system 110, and a smoking substitute apparatus in the form of an e-cigarette consumable (or "pod") 150. In the illustrated embodiment the consumable 150 (sometimes referred to herein as a smoking substitute apparatus) is removable from the main body 120, so as to be a replaceable component of the system 110. The e-cigarette system 110 is a closed system in the sense that it is not intended that the consumable should be refillable with e-liquid by a user.

As is apparent from FIGS. 17 and 18, the consumable 150 is configured to engage the main body 120. FIG. 17 shows the main body 120 and the consumable 150 in an engaged state, whilst FIG. 18 shows the main body 120 and the consumable 150 in a disengaged state. When engaged, a portion of the consumable 150 is received in a cavity of corresponding shape in the main body 120 and is retained in the engaged position by way of a snap-engagement mechanism. In other embodiments, the main body 120 and consumable 150 may be engaged by screwing one into (or onto) the other, or through a bayonet fitting, or by way of an interference fit.

The system 110 is configured to vaporize an aerosol precursor, which in the illustrated embodiment is in the form of a nicotine-based e-liquid 160. The e-liquid 160 comprises nicotine and a base liquid including propylene glycol and/or vegetable glycerin. In the present embodiment, the e-liquid 160 is flavored by a flavorant. In other embodiments, the e-liquid 160 may be flavorless and thus may not include any added flavorant.

Figure 19:
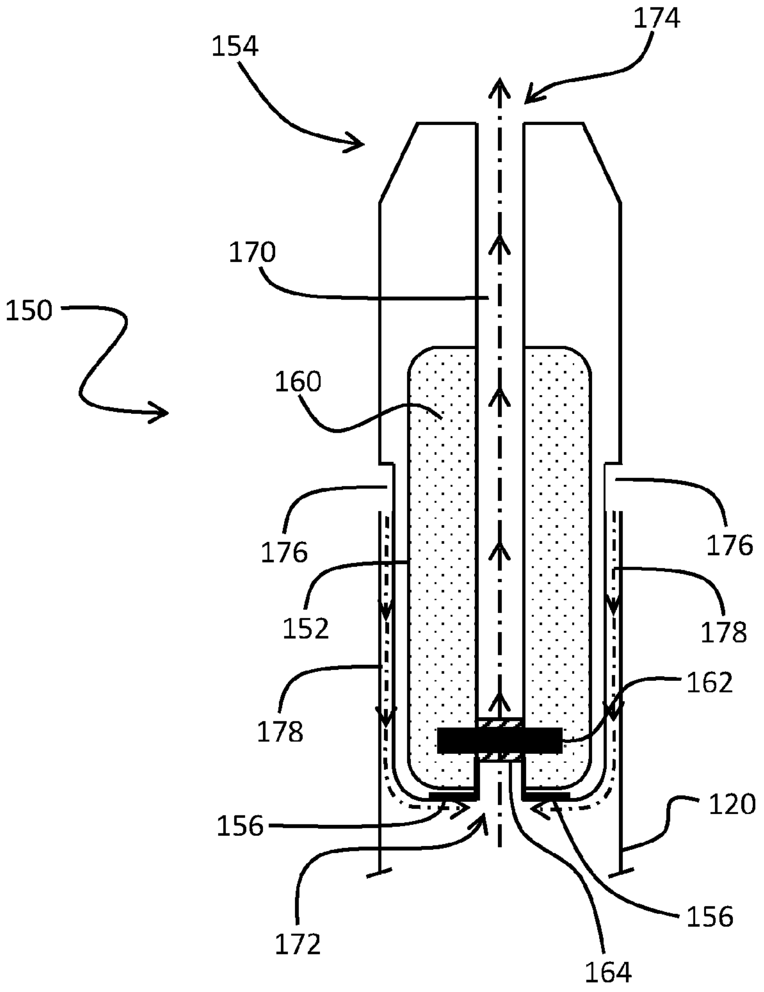
FIG. 19 is a schematic longitudinal cross sectional view of a smoking substitute apparatus of the first embodiment.

FIG. 19 shows a schematic longitudinal cross sectional view of the smoking substitute apparatus forming part of the smoking substitute system shown in FIGS. 17 and 18. In FIG. 18, the e-liquid 160 is stored within a reservoir in the form of a tank 152 that forms part of the consumable 150. In the illustrated embodiment, the consumable 150 is a "single-use" consumable 150. That is, upon exhausting the e-liquid 160 in the tank 152, the intention is that the user disposes of the entire consumable 150. The term "single-use" does not necessarily mean the consumable is designed to be disposed of after a single smoking session. Rather, it defines the consumable 150 is not arranged to be refilled after the e-liquid contained in the tank 152 is depleted. The tank may include a vent (not shown) to allow ingress of air to replace e-liquid that has been used from the tank. The consumable 150 preferably includes a window 158 (see FIGS. 17 and 18), so that the amount of e-liquid in the tank 152 can be visually assessed. The main body 120 includes a slot 157 so that the window 158 of the consumable 150 can be seen whilst the rest of the tank 152 is obscured from view when the consumable 150 is received in the cavity of the main body 120. The consumable 150 may be referred to as a "clearomizer" when it includes a window 158, or a "cartomizer" when it does not.

In other embodiments, the e-liquid (i.e., aerosol precursor) may be the only part of the system that is truly "single-use". That is, the tank may be refillable with e-liquid or the e-liquid may be stored in a non-consumable component of the system. For example, in such other embodiments, the e-liquid may be stored in a tank located in the main body or stored in another component that is itself not single-use (e.g., a refillable cartomizer).

The external wall of tank 152 is provided by a casing of the consumable 150. The tank 152 annularly surrounds, and thus defines a portion of, a passage 170 that extends between a vaporizer inlet 172 and an outlet 174 at opposing ends of the consumable 150. In this respect, the passage 170 comprises an upstream end at the end 151 of the consumable 150 that engages with the main body 120, and a downstream end at an opposing end of the consumable 150 that comprises a mouthpiece 154 of the system 110.

When the consumable 150 is received in the cavity of the main body 120 as shown in FIG. 19, a plurality of device air inlets 176 are formed at the boundary between the casing of the consumable and the casing of the main body. The device air inlets 176 are in fluid communication with the vaporizer inlet 172 through an inlet flow channel 178 formed in the cavity of the main body which is of corresponding shape to receive a part of the consumable 150. Air from outside of the system 110 can therefore be drawn into the passage 170 through the device air inlets 176 and the inlet flow channels 178.

When the consumable 150 is engaged with the main body 120, a user can inhale (i.e., take a puff) via the mouthpiece 154 so as to draw air through the passage 170, and so as to form an air flow (indicated by the dashed arrows in FIG. 19) in a direction from the vaporizer inlet 172 to the outlet 174. Although not illustrated, the passage 170 may be partially defined by a tube (e.g., a metal tube) extending through the consumable 150. In FIG. 19, for simplicity, the passage 170 is shown with a substantially circular cross-sectional profile with a constant diameter along its length. In other embodiments, the passage may have other cross-sectional profiles, such as oval shaped or polygonal shaped profiles. Further, in other embodiments, the cross sectional profile and the diameter (or hydraulic diameter) of the passage may vary along its longitudinal axis.

The smoking substitute system 110 is configured to vaporize the e-liquid 160 for inhalation by a user. To provide this operability, the consumable 150 comprises a heater having a porous wick 162 and a resistive heating element in the form of a heating filament 164 that is helically wound (in the form of a coil) around a portion of the porous wick 162. The porous wick 162 extends across the passage 170 (i.e., transverse to a longitudinal axis of the passage 170 and thus also transverse to the air flow along the passage 170 during use) and opposing ends of the wick 162 extend into the tank 152 (so as to be immersed in the e-liquid 160). In this way, e-liquid 160 contained in the tank 152 is conveyed from the opposing ends of the porous wick 162 to a central portion of the porous wick 162 so as to be exposed to the air flow in the passage 170.

The filament 164 and the exposed central portion of the porous wick 162 are positioned across the passage 170. More specifically, the part of passage that contains the filament 164 and the exposed portion of the porous wick 162 forms a vaporization chamber. In the illustrated example, the vaporization chamber has the same cross-sectional diameter as the passage 170. However, in other embodiments the vaporization chamber may have a different cross sectional profile as the passage 170. For example, the vaporization chamber may have a larger cross sectional diameter than at least some of the downstream part of the passage 170 so as to enable a longer residence time for the air inside the vaporization chamber.

Figure 20:
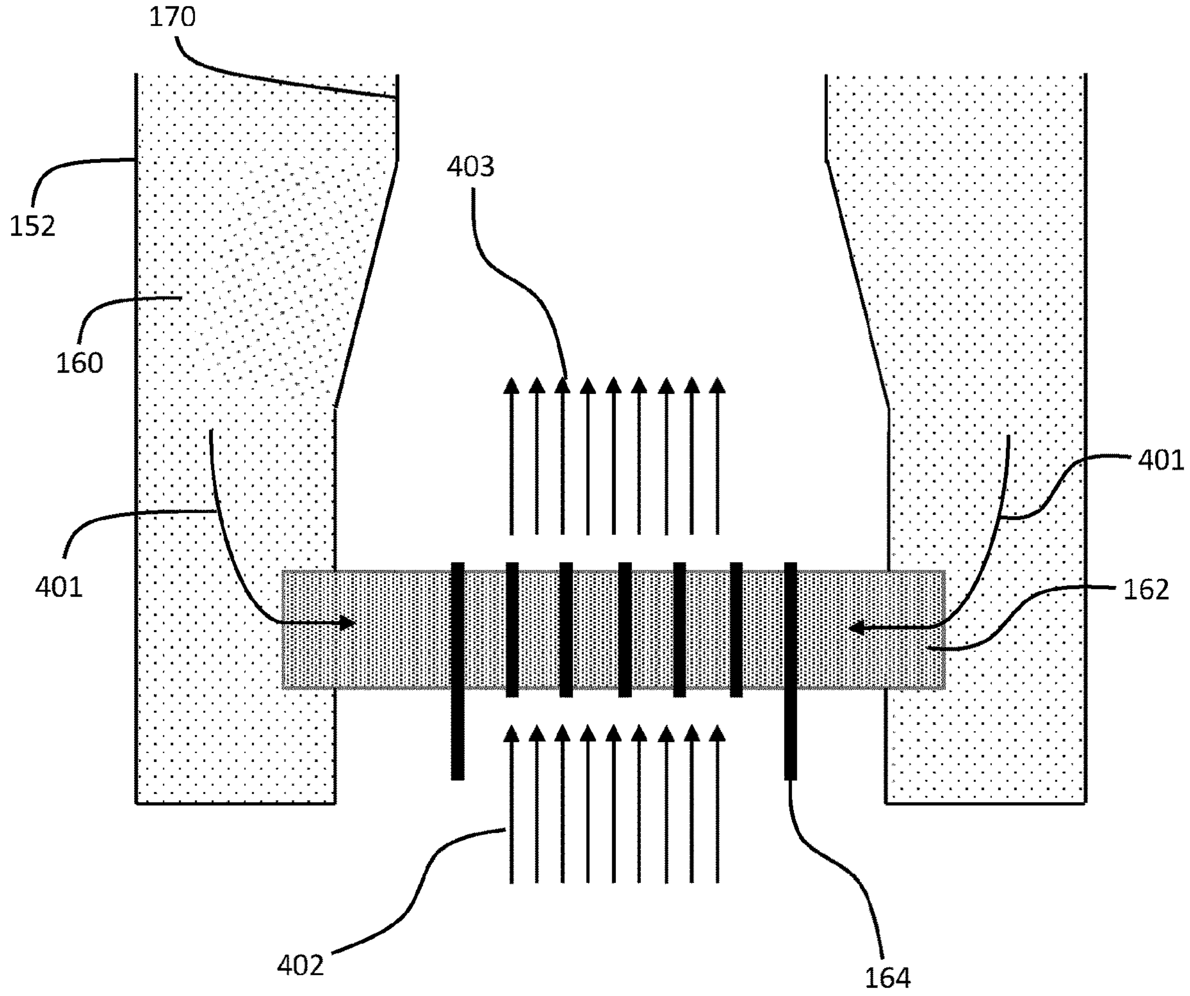
FIG. 20 is an enlarged schematic cross sectional view of part of the air passage and vaporization chamber of the first embodiment.

FIG. 20 illustrates in more detail the vaporization chamber and therefore the region of the consumable 150 around the wick 162 and filament 164. The helical filament 164 is wound around a central portion of the porous wick 162. The porous wick extends across passage 170. E-liquid 160 contained within the tank 152 is conveyed as illustrated schematically by arrows 401, i.e. from the tank and towards the central portion of the porous wick 162.

When the user inhales, air is drawn from through the inlets 176 shown in FIG. 19, along inlet flow channel 178 to vaporization chamber inlet 172 and into the vaporization chamber containing porous wick 162. The porous wick 162 extends substantially transverse to the air flow direction. The air flow passes around the porous wick, at least a portion of the air flow substantially following the surface of the porous wick 162. In examples where the porous wick has a cylindrical cross-sectional profile, the air flow may follow a curved path around an outer periphery of the porous wick 162.

At substantially the same time as the air flow passes around the porous wick 162, the filament 164 is heated so as to vaporize the e-liquid which has been wicked into the porous wick. The air flow passing around the porous wick 162 picks up this vaporized e-liquid, and the vapor-containing air flow is drawn in direction 403 further down passage 170.

Although not shown, the main body 120 and consumable 150 may comprise a further interface which may, for example, be in the form of an RFID reader, a barcode or QR code reader. This interface may be able to identify a characteristic (e.g., a type) of a consumable 150 engaged with the main body 120. In this respect, the consumable 150 may include any one or more of an RFID chip, a barcode or QR code, or memory within which is an identifier and which can be interrogated via the interface.

Development A

Figure 21:
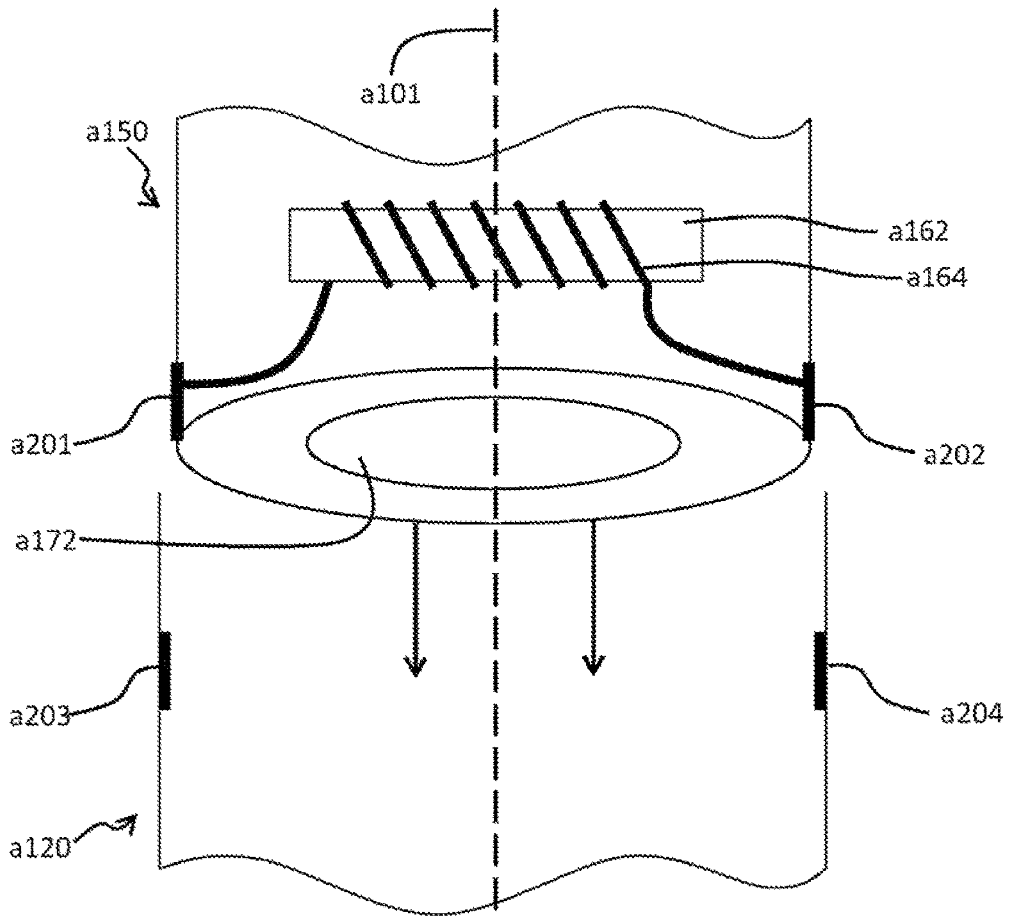
FIG. 21 is a more detailed schematic front view of electrical contacts between a main body and a consumable of the smoking substitute system in a disengaged position, according to the first embodiment of Development A.

FIG. 21 shows the consumable a150 and the main body a120 in a first position in which the consumable a150 and the main body a120 are disengaged from one another. FIG. A22 shows the consumable a150 and the main body a120 in a second position in which the consumable a150 and the main body a120 are engaged with one another. The heater a164 is wound about the exposed central portion of the porous wick a162 and is electrically connected to an electrical interface in the form of electrical contacts a201, a202 mounted on a sidewall of the consumable that is proximate the main body a120 (when the consumable and the main body are engaged). When the consumable a150 is engaged with the main body a120, the electrical contacts a201, a202 make physical contact with corresponding electrical contacts a203, a204 of the main body a120. The electrical contacts a203, a204 are located on a sidewall of the housing of the main body a120. The main body electrical contacts are electrically connectable to a power source (not shown) of the main body a120, such that (in the engaged position) the filament a164 is electrically connectable to the power source. In this way, power can be supplied by the main body a120 to the filament a164 in order to heat the filament a164. This heats the porous wick a162 which causes e-liquid a160 conveyed by the porous wick a162 to vaporize and thus to be released from the porous wick a162. The vaporized e-liquid becomes entrained in the air flow and, as it cools in the air flow (between the heated wick and the outlet a174 of the passage a170), condenses to form an aerosol. This aerosol is then inhaled, via the mouthpiece a154, by a user of the system a110. As e-liquid is lost from the heated portion of the wick, further e-liquid is drawn along the wick from the tank to replace the e-liquid lost from the heated portion of the wick.

Figure 22:
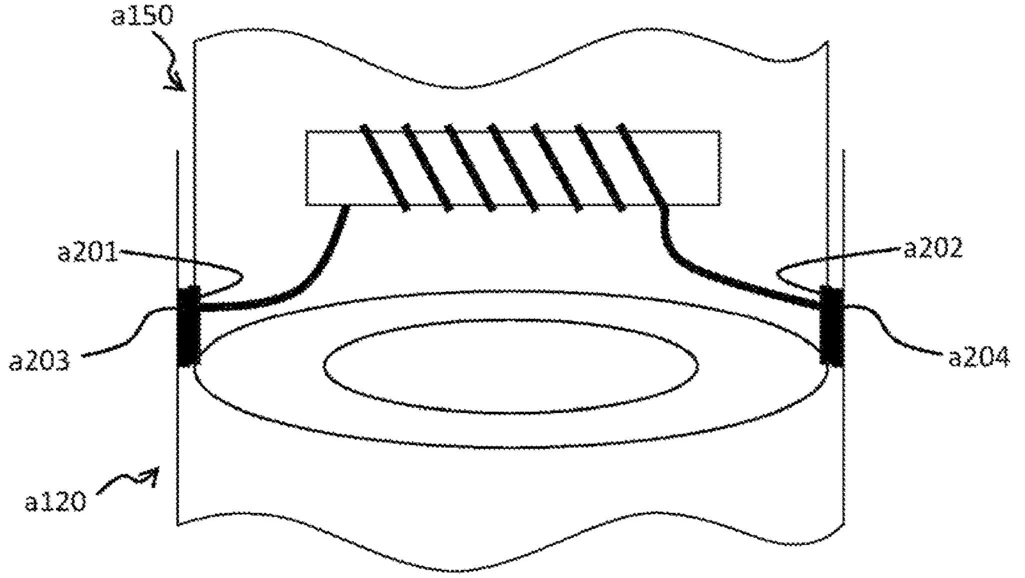
FIG. 22 is a more detailed schematic front view of electrical contacts between a main body and a consumable of the smoking substitute system in an engaged position, according to the first embodiment of Development A.

The power source of the main body a120 may be in the form of a battery (e.g., a rechargeable battery such as a lithium-ion battery). The main body a120 may comprise a connector in the form of, e.g., a USB port for recharging this battery. The main body a120 may also comprise a controller that controls the supply of power from the power source to the main body electrical contacts (and thus to the filament a164). That is, the controller may be configured to control a voltage applied across the main body electrical contacts, and thus the voltage applied across the filament a164. In this way, the filament a164 may only be heated under certain conditions (e.g., during a puff and/or only when the system is in an active state). In this respect, the main body a120 may include a puff sensor (not shown) that is configured to detect a puff (i.e., inhalation). The puff sensor may be operatively connected to the controller so as to be able to provide a signal, to the controller, which is indicative of a puff state (i.e., puffing or not puffing). The puff sensor may, for example, be in the form of a pressure sensor or an acoustic sensor. In FIGS. 21 and 22 the electrical contacts a201 and a202 have an electrically conductive surface which is parallel to the longitudinal axis 101 of the housing. The electrical contacts a203 and a204 have an electrically conductive surface which is parallel to the longitudinal axis of the main body a120. The electrical contacts a201 and a203 lie against one another in the engaged position. The electrical contacts a201 and a203 may physically slide against one another as the consumable a150 is moved into the engaged position. One, or both, of the contacts a201, a203 may be resiliently movable in the radial direction. If the contact a203 on the main body is movable then contact a203 exerts a force radially inwardly. As the consumable a150 is moved into the engaged position, contact a203 is movable radially outwardly, while continuing to exert a force against contact a201. The resilient movement may help to ensure a good electrical connection. The electrical contacts a202 and a204 have the same configuration as contacts a201, a203.

Figure 23:
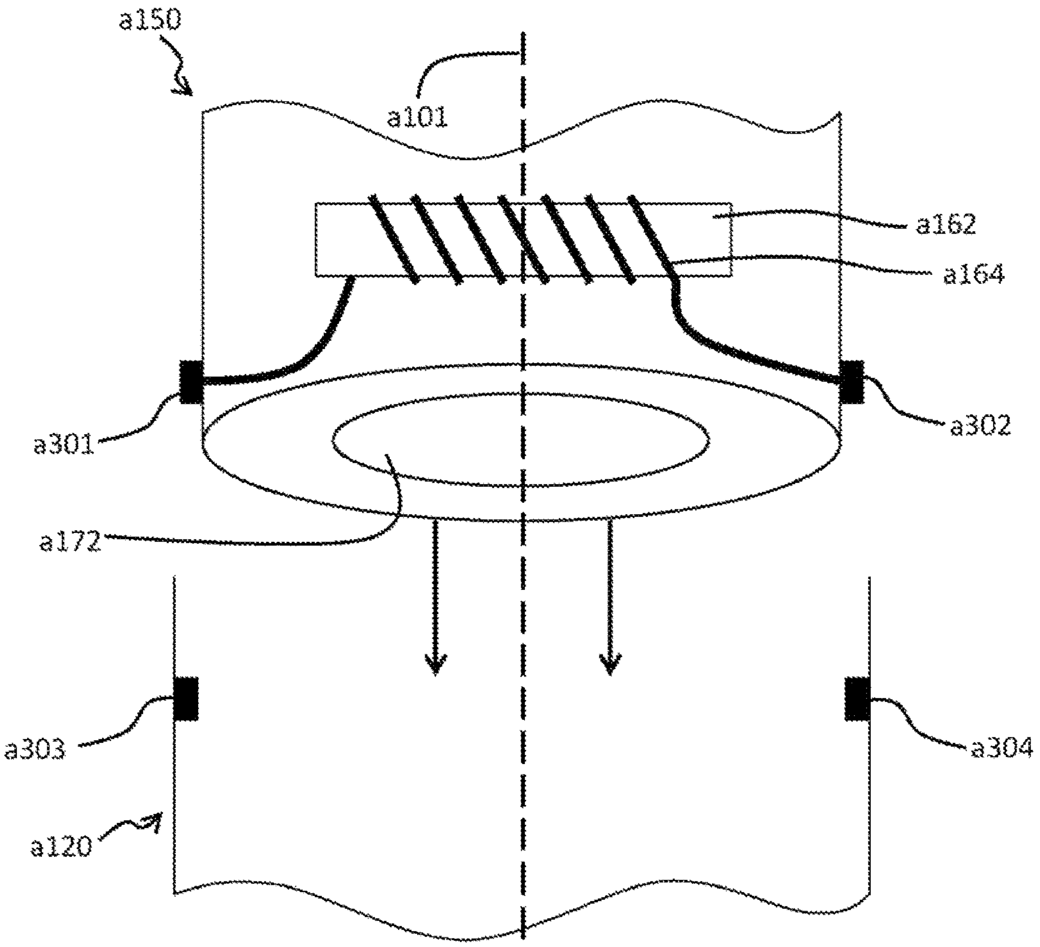
FIG. 23 is a more detailed schematic front view of electrical contacts between a main body and a consumable of the smoking substitute system in a disengaged position, according to a second embodiment of Development A.
Figure 24:
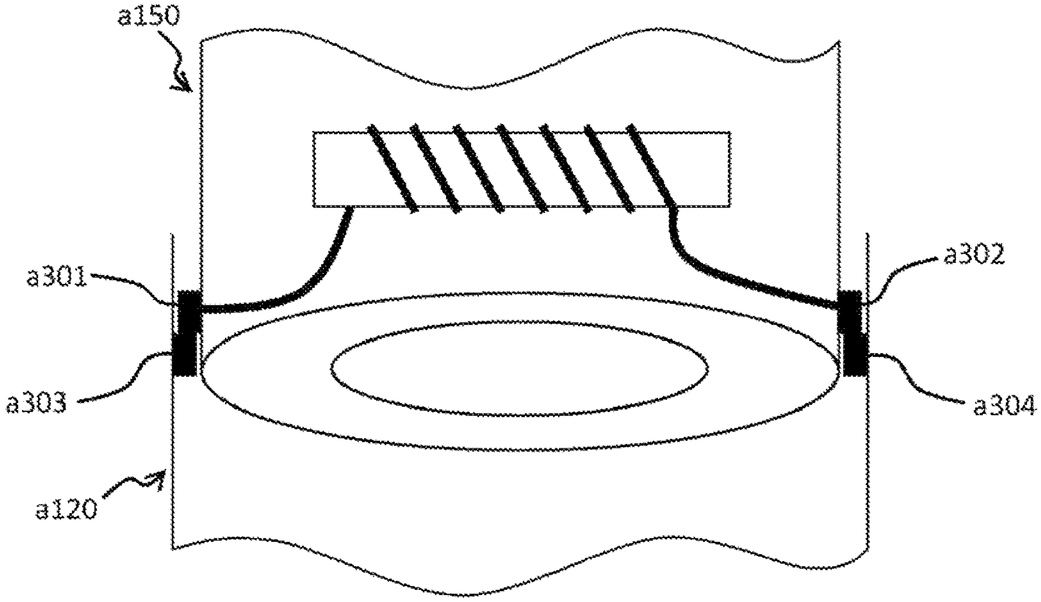
FIG. 24 is a more detailed schematic front view of electrical contacts between a main body and a consumable of the smoking substitute system in an engaged position, according to the second embodiment of Development A.

In FIGS. 23 and 24 the electrical contacts a301 and a303 press against one another in an axial direction (i.e., parallel to the longitudinal axis a101 of the housing or of the main body a120) in the engaged position. One, or both, of the contacts a301, a303 may be resiliently movable in the axial direction. If the contact a303 on the main body is movable then contact a303 exerts a force axially outwardly (i.e., upwardly in FIG. 23). As the consumable a150 is moved into the engaged position, contact a303 is movable axially inwardly, while continuing to exert a force against contact a301. The resilient movement may help to ensure a good electrical connection. The electrical contacts a302 and a304 have the same configuration as contacts a301, a303.

Location of the electrical contacts a201, a202, a301, a302 on the sidewall of the consumable a150 can allow the inlet a172 to have a larger area. This can improve air flow into (and through) the consumable. It can help to reduce jetting of the air flow. It can allow air flow to distribute more evenly across the inlet aperture a172 and across the heater a162. This can have an advantage of increasing a size of aerosol particles, which can increase the likelihood of particles delivering nicotine to the lungs.

The inlet aperture a172 shown in FIG. 21 is an example. The inlet aperture a172 may have an area which is larger than shown in FIG. 21. The inlet aperture a172 may have a maximum dimension which is substantially equal to the maximum dimension of the vaporization chamber located downstream of the inlet aperture a172. The maximum dimension may be expressed as a diameter of the inlet aperture a172. For inlet apertures which are non-circular when viewed in in cross-section (e.g., oval, elliptical or racetrack) it may be more convenient to express the width as some other dimension representing the dimension of the air flow channel a170 which is orthogonal to the longitudinal axis a101 of the channel, such as width or equivalent diameter.

The electrical contacts a201, a202 and a301, a302 are shown at diametrically opposite locations on the consumable a150. This provides maximum physical separation of the two contacts. In other embodiments the electrical contacts a201, a202 and a301, a302 may be located at other positions around the perimeter of the housing of the consumable a150 and around the perimeter of the main body a120.

The experimental data reported below is relevant to the embodiments disclosed above in particular in view of the possibility of making the inlet to the vaporization chamber of large size and thereby reducing the turbulence and local velocity of the airflow at the wick.

Development B

Figure 25:
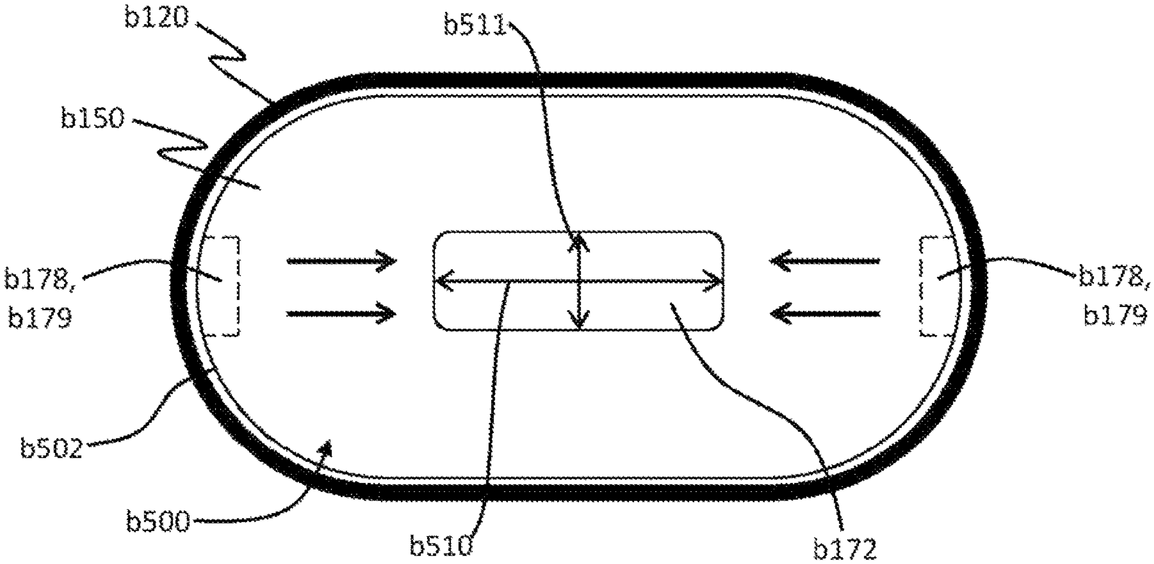
FIG. 25 is a plan view of a first end of a smoking substitute apparatus of the first embodiment of Development B.

FIG. 25 shows a plan view of a first end b151 of a consumable b150 according to an embodiment. The first end b151 is the end which locates inside a cavity of the main body b150 when the consumable b150 is engaged with the main body b120. The first end has an end face b500. The air inlet b172 is located in the end face b500. The air inlet b172 is centered about a longitudinal axis of the consumable b150. FIG. 25 shows the consumable b150 in an engaged state, with the main body b120 surrounding the consumable b150.

As previously described with reference to FIG. 19, and using the reference numbers of FIG. 19, when the consumable 150 is received in the cavity of the main body 120, an inlet flow channel 178 is formed between the main body 120 and the consumable 150. The end face b500 may include one or more recesses or notches b179. The recess(es) b179 form part of the inlet flow channel b178. FIG. 25 schematically shows two recesses b179 at opposite sides of the end face b500 of the consumable b150. The end face b500 may have a different number of recesses b179, or may not have any recesses. The recess(es) b179 may be a different shape to the one shown in the drawing. In use, air exits the inlet flow channel b178, via the recess(es) b179 (if present), and flows across the end face b500 to the air inlet b172. One or more channels (not shown) may be provided in the end face 500 to assist air flow between the inlet flow channel b178 and the air inlet b172. A channel may extend between the air inlet b172 and the notch b179, or perimeter of the end face b500. Alternatively, a channel may extend from the air inlet b172, but stop short of the notch b179 or perimeter of the end face b500.

The end face b500 of the consumable b150 has an outer perimeter b502. A cross-sectional area of the end face b500 is defined as the area within the outer perimeter b502. The consumable b150 may have a generally elliptical or racetrack shape, as shown in FIG. 25. Other possible shapes are circular, oval, polygonal, or a different shape. The air inlet b172 has a dimension b510 in a first direction and a dimension b511 in a second direction orthogonal to the first direction. In this example the air inlet b172 is generally rectangular in shape. The dimension b510 is longer than the dimension b511. Other possible shapes of the air inlet b172 are elliptical, racetrack, circular, oval, polygonal, or a different shape. The heater 164 (FIG. 20) is oriented parallel to the longest dimension of the air inlet b172, i.e., parallel to the first direction. This helps to form a more laminar flow of air across an area which is matched to the shape of the heater 164. The orientation of the heater across the longest lateral dimension of the vaporization chamber presents a suitable length of the heater to the airflow, allowing an efficient aerosol production.

Figure 26:
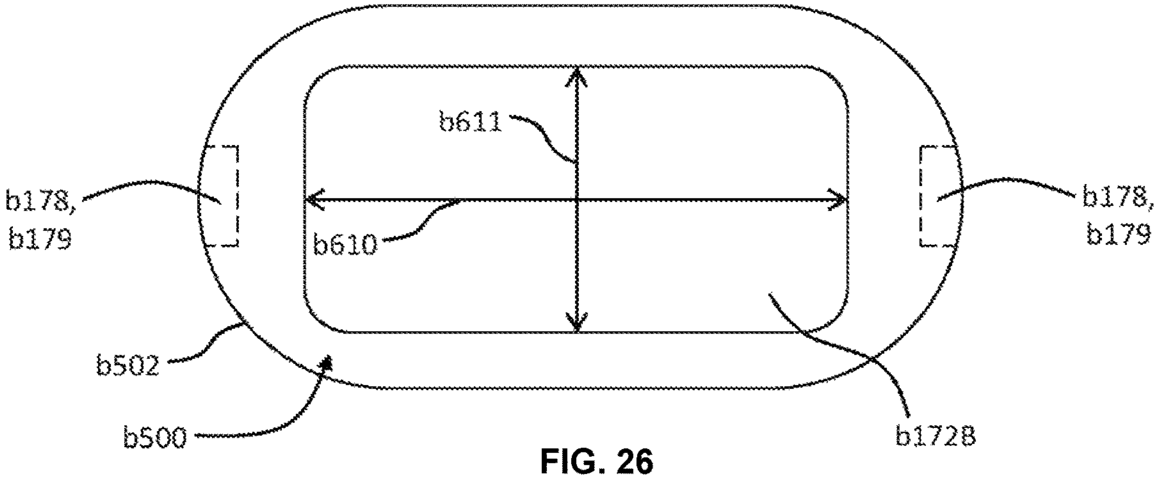
FIG. 26 is a plan view of a first end of a smoking substitute apparatus of another embodiment of Development B.
Figure 27:
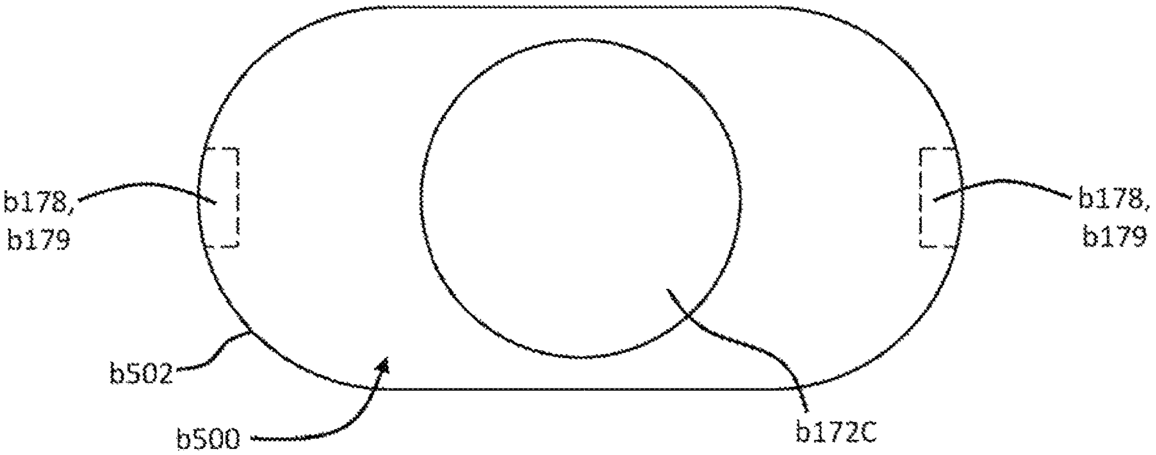
FIG. 27 is a plan view of a first end of a smoking substitute apparatus of another embodiment of Development B.

FIGS. 26 and 27 show consumables b150 according to other embodiments. FIGS. 26 and 27 each show a plan view of a first end of the consumable b150. In these examples, the air inlet is modified from the one shown in FIG. 25. In FIG. 26, the air inlet b172B has a larger cross-sectional area. The dimensions of the air inlet b172B are increased compared to the inlet b172 shown in FIG. 25. The inlet aperture b172B has a longer dimension b610 in the first direction (compared to FIG. 25) and a longer dimension b611 in the second direction (compared to FIG. 25). In other examples, the air inlet may have a different ratio of dimensions b610, b611. In general, a ratio of a cross-sectional area of the air inlet b172 to a cross-sectional area of the end face b500 of the consumable b150 can be expressed as a percentage. The percentage may have a value of at least 5%. The ratio may be at least 10%, optionally at least 20%, optionally at least 30%, optionally at least 40%, optionally at least 50%, optionally at least 60%, optionally at least 70%, optionally at least 80%, optionally at least 90%.

The percentage may have a value of less than 95%. In general, a larger cross-sectional area can help to reduce turbulence, or jetting, of air flow in the vaporization chamber, which can help to increase particle size of particles formed by the wick and heater in the vaporization chamber. One or more channels (not shown) may be provided in the end face b500 to assist air flow between the inlet flow channel b178 and the air inlet b172B. A channel may extend between the air inlet b172 and the notch b179, or perimeter of the end face b500. Alternatively, a channel may extend from the air inlet b172B, but stop short of the notch b179 or perimeter of the end face b500.

FIG. 27 shows an air inlet b172C with a larger cross-sectional area (compared to FIG. 25). The air inlet b172C has a circular shape. A channel (not shown) may be provided in the end face b500 to assist flow between the inlet flow channel b178 and the air inlet b172C.

Figure 28:
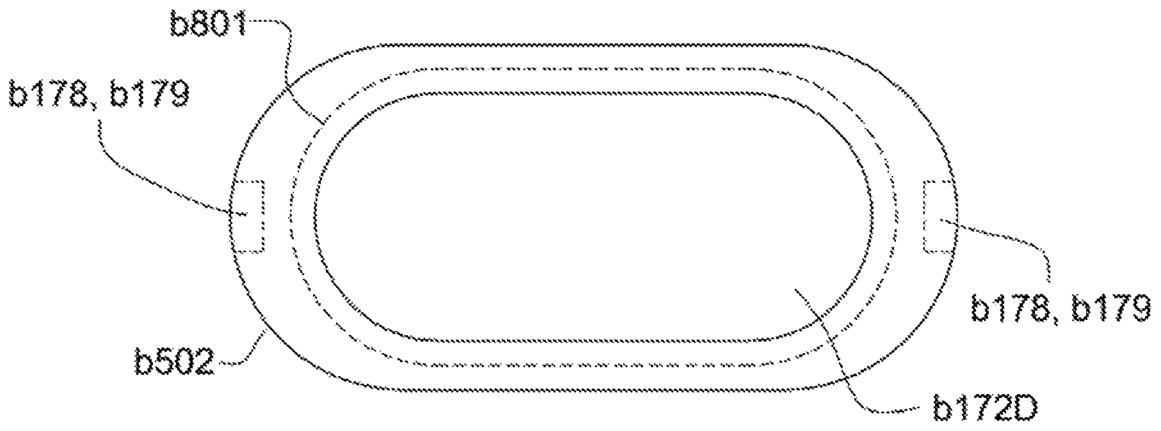
FIG. 28 is a plan view of a first end of a smoking substitute apparatus of another embodiment of Development B.

FIG. 28 shows a plan view of a first end of the consumable b150. In this example, a perimeter b801 of the vaporization chamber 180 (FIG. 20) is shown in dashed form. The vaporization chamber b180 is located downstream of the air inlet b172D. In this example the air inlet b172D has a cross-sectional area which is smaller than the perimeter of the vaporization chamber b180. In general, a ratio of a cross-sectional area of the air inlet b172D to a cross-sectional area of the vaporization chamber b180 can be expressed as a percentage. The ratio may be at least 10%, optionally at least 20%, optionally at least 30%, optionally at least 40%, optionally at least 50%, optionally at least 60%, optionally at least 70%, optionally at least 80%, optionally at least 90%.

FIGS. 29A-29D show four examples of a part b901 of the consumable b150, located at the first end b151 of the consumable b150. Part b901 is located within the consumable b150 and defines a perimeter of the vaporization chamber b180. Notches b902 support the wick b162 across the vaporization chamber b180.

Figure 29A:
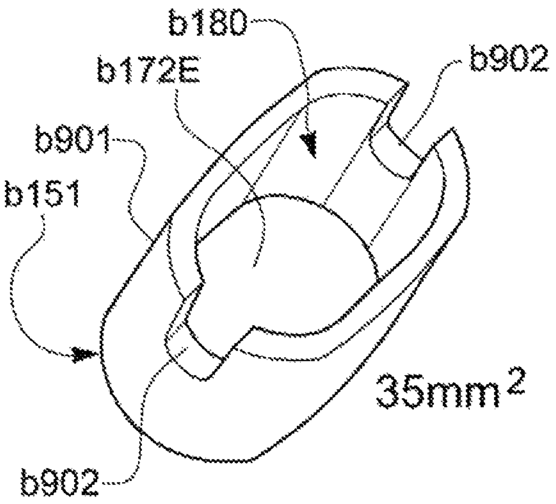
FIGS. 29A-29D are views of a part of a smoking substitute apparatus of further embodiments of Development B, showing a vaporization chamber and an air inlet.

In FIG. 29A the air inlet b172E has the same cross-sectional area as the vaporization chamber b180. The distal end of the part b901 defines the air inlet b172E. In this example the cross-sectional area is 35 $mm^2$. It will be understood that the vaporization chamber could be larger, or smaller, than shown here, and that the vaporization chamber could have a different cross-sectional shape to the one shown here.

Figure 29B:
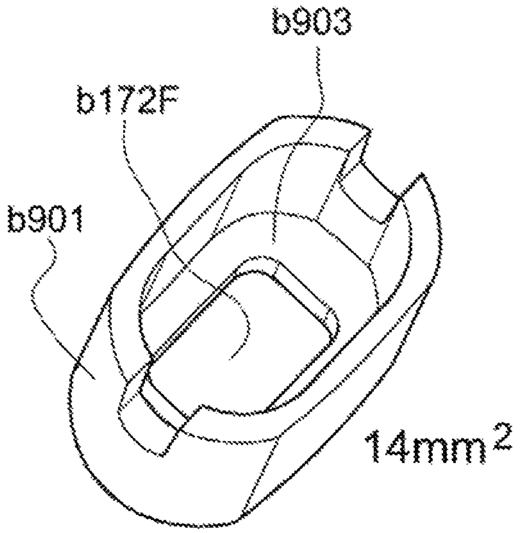

In FIG. 29B the air inlet b172F has a smaller cross-sectional area than the vaporization chamber b180. A radially-extending wall b903 extends across the distal end of part b901. The air inlet b172F is defined in the wall b903. In this example the cross-sectional area of the air inlet b172F is 14 $mm^2$. The ratio of the cross-sectional area of the air inlet b172F to the cross-sectional area of the vaporization chamber b180 is 14/35×100=40%.

Figure 29C:
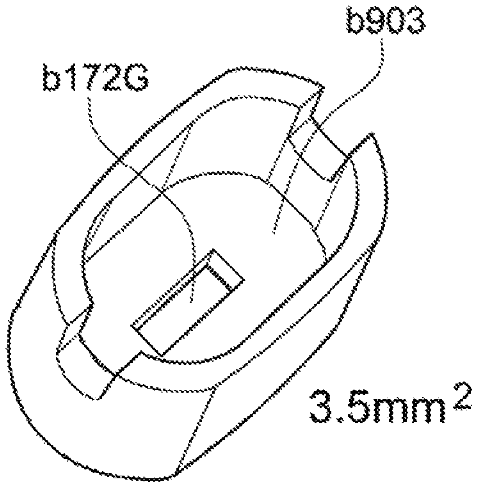

In FIG. 29C the cross-sectional area of the air inlet b172G is 3.2 $mm^2$. The ratio of the cross-sectional area of the air inlet b172G to the cross-sectional area of the vaporization chamber 180 is 3.2/35×100=9.1%.

Figure 29D:
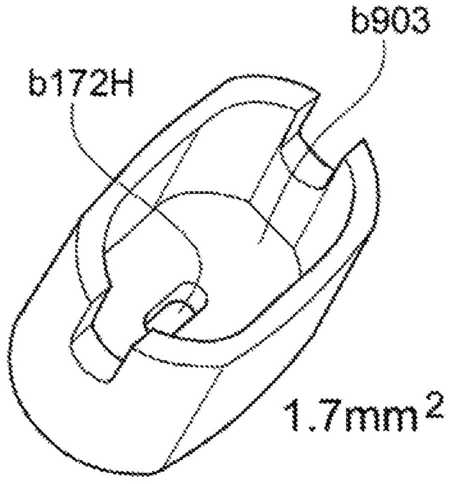

For comparison, FIG. 29D shows a conventional air inlet b172H with a cross-sectional area of 1.7 $mm^2$. The ratio of the cross-sectional area of the air inlet b172H to the cross-sectional area of the vaporization chamber b180 is 1.7/35×100=4.9%.

In each of FIGS. 29A-29D the longest dimension of the air inlet is oriented in a direction which is parallel to the heater. The heater b164 is wound around a wick b162. The wick b162 extends across the vaporization chamber between notches 902.

FIGS. 29A-29D show a vaporization chamber defined by a straight-walled part b901. In other examples, the vaporization chamber may have a tapered shape, with a varying cross-sectional area. Where there is a tapering vaporization chamber, the relationship between the cross-sectional area of the air inlet and the cross-sectional area of the vaporization chamber may be considered with respect to the cross-sectional area of the vaporization chamber at a position immediately downstream of the air inlet.

In the embodiments shown in FIGS. 25 to 29 electrical contacts may be present on the end face b500 of the consumable. They have not been shown for clarity. In the embodiments shown in FIGS. 30A-30D, electrical contacts are shown.

Figure 30A:
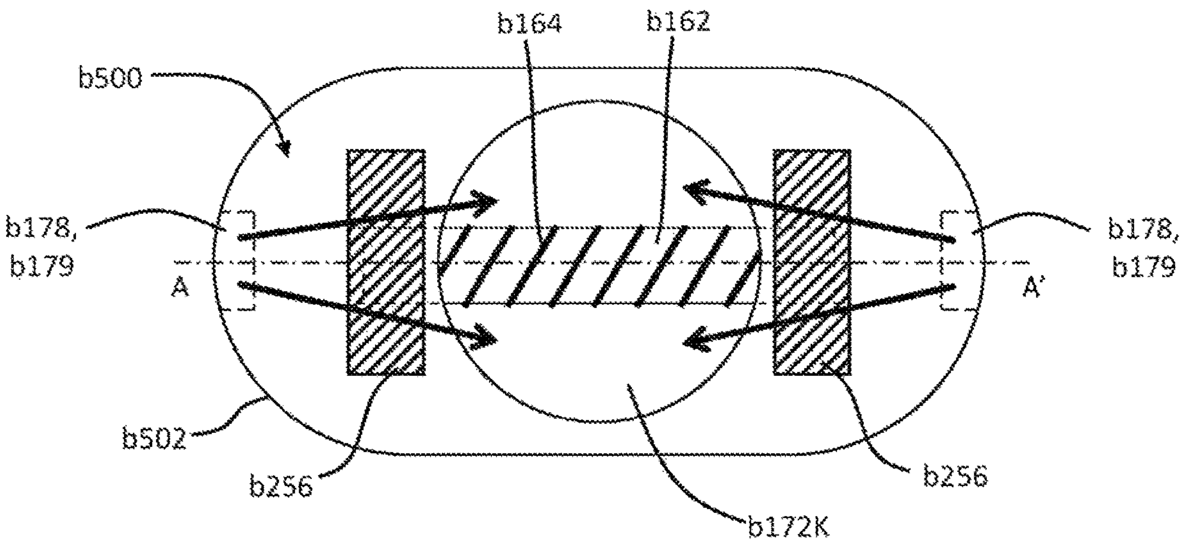
FIG. 30A is a plan view of a first end of a smoking substitute apparatus of another embodiment of Development B.

FIGS. 30A-30D show another embodiment of a consumable b150. FIG. 30A shows a plan view of a first end of the consumable b150. In this example, a pair of electrical contacts b256 are provided at the first end. The electrical contacts b256 function in the same manner as described above in respect of electrical contacts b156. The electrical contacts b256 connect to contacts on the main body b120 when the consumable b150 is engaged with the main body b120. The electrical contacts connect to wiring which electrically connect to the heater b164 of the consumable. A first electrical contact is provided on a first side of the air inlet b172K. A second electrical contact is provided on a second, opposite, side of the air inlet b172K. Each electrical contact b256 lies fully beyond the perimeter of the air inlet b172K. Stated another way, when viewed in plan (as in FIG. 30A), the electrical contacts b256 do not overlap the air inlet b172K. FIG. 30A also shows the wick b162 and the heater b164, which are visible through the air inlet b172K. The wick b162 and the heater b164 are located in the vaporization chamber, downstream of the air inlet b172K.

Figure 30B:
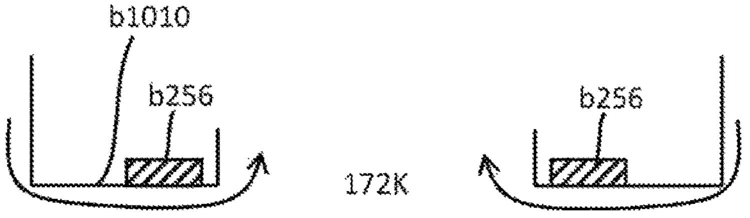
FIGS. 30B-30D are cross sectional views along A-A' of FIG. 30A showing possible arrangements of electrical contacts.

FIG. 30B shows a first example of a cross-section along line A-A' of FIG. 30A. In this example, the electrical contacts b256 are recessed into an end face b1010 of the consumable b150. Air can flow over the contacts b256 to reach the air inlet b172K.

Figure 30C:
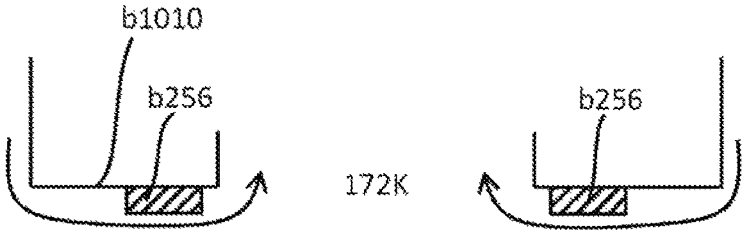

FIG. 30C shows a second example of a cross-section along line A-A' of FIG. 30A. In this example, the electrical contacts b256 lie in an exposed position on the end face b1010 of the consumable b150. Air can flow over the contacts b256 to reach the air inlet b172K. It will be understood that the electrical contacts b256 may be partially recessed, leaving a portion of the electrical contacts lying beyond the end face b500, i.e., exposed.

Figure 30D:
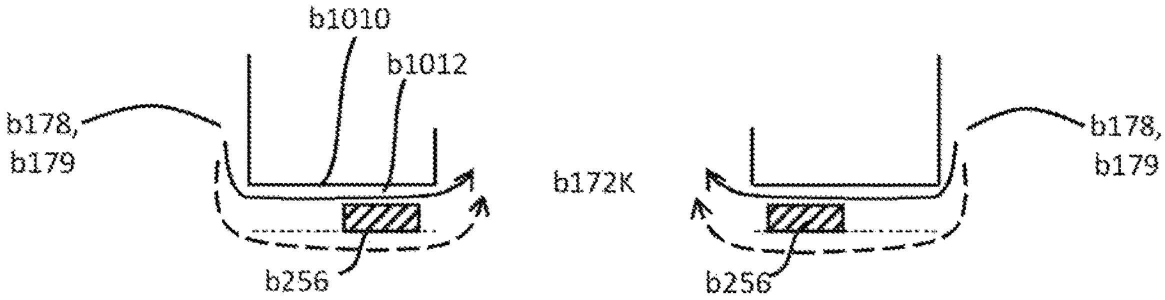

FIG. 30D shows a third example of a cross-section along line A-A' of FIG. 30A. In this example, there is a channel b1012 between the electrical contacts b256 and the end face b1010 of the consumable b150. Air can flow along the channel b1012, under the contacts b256, to reach the air inlet b172K. Air may also flow over the contacts b256, to reach the air inlet b172K. It will be understood that FIG. 30D shows a cross-section of FIG. 30A where the channel is present. The channel b1012 may only be present under a portion of the electrical contact b256. Therefore, at other cross-sections taken at positions parallel to the cross-section of FIG. 30D the channel may not be present. The electrical contacts b256 may lie flush with an end face of the consumable, shown by the dashed line in FIG. 30D.

Figure 31A:
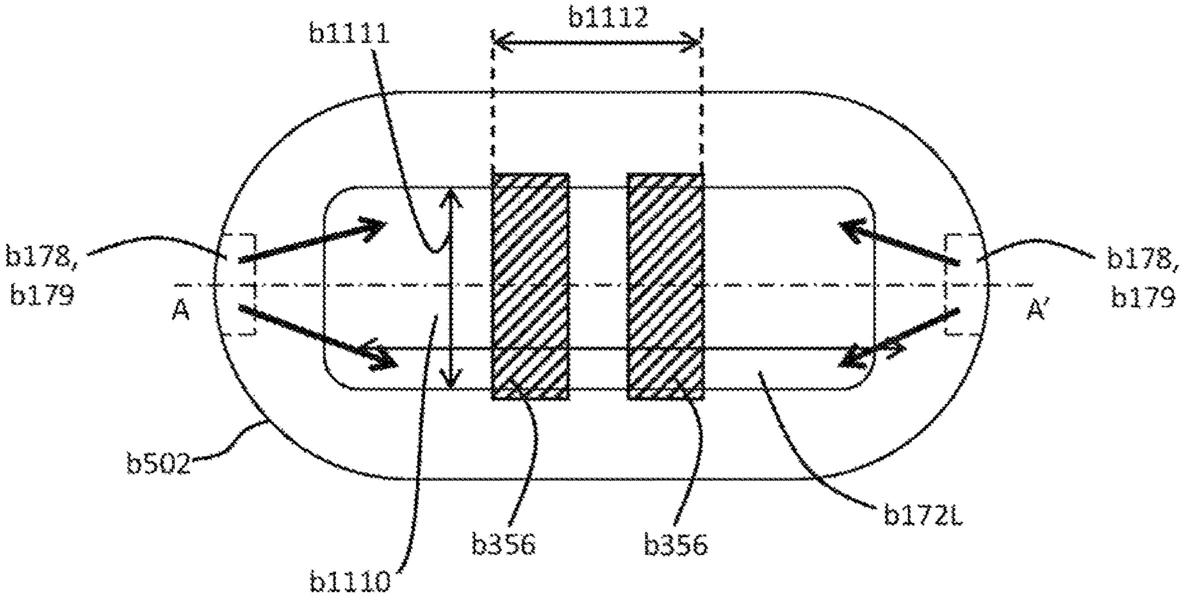
FIG. 31A is a plan view of a first end of a smoking substitute apparatus of another embodiment of Development B.
Figure 31B:
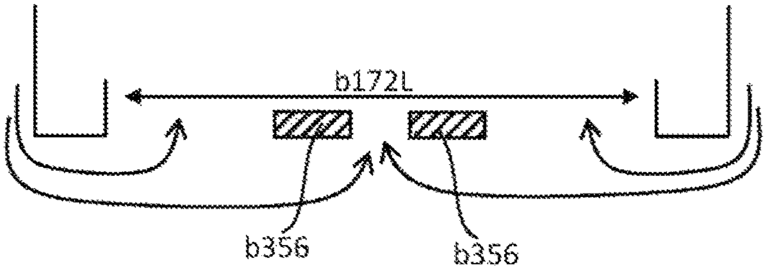
FIG. 31B is a cross sectional view along A-A' of FIG. 31A.

FIGS. 31A and 31B show another embodiment of a consumable b150. FIG. 31A shows a plan view of a first end of the consumable b150. In this example, a pair of electrical contacts b356 are provided at the first end. The electrical contacts b256 function in the same manner as described above in respect of electrical contacts b156 and b256. The electrical contacts b356 connect to contacts on the main body b120 when the consumable b150 is engaged with the main body b120. The electrical contacts b356 connect to wiring which carries a current to the heater b164 of the consumable. The wick and the heater are not shown in FIG. 31 for clarity, but they are present.

The air inlet b172L has a dimension b1110 in a first direction and a dimension b1111 in a second direction orthogonal to the first direction. In this example the air inlet b172L is generally rectangular in shape. The dimension b1110 is longer than the dimension b1111. Other possible shapes of the air inlet b172L are elliptical, racetrack, circular, oval, polygonal, or a different shape. The heater b164 is oriented parallel to the longest dimension of the air inlet b172L, i.e., parallel to the first direction.

The electrical contacts b356 are located across the air inlet b172L. The electrical contacts b356 are longer than dimension b1111 of the air inlet b172L. The air inlet b172L extends beyond the electrical contacts b356. Dimension b1110 of the air inlet b172L is longer than the distance b1112 between the outer edges of the electrical contacts b356. This provides a flow path between a perimeter of the end face b500 and a portion of the air inlet b172L which is not obstructed by the electrical contacts b356.

FIG. 31B shows an example of a cross-section along line A-A' of FIG. 31A. Air can flow directly into the air inlet b172L without having to pass over the contacts b356. Also, air can flow over the contacts b356 to reach the air inlet b172L.

The air inlet b172K shown in FIGS. 30A-30D and the air inlet b172L shown in FIGS. 31A and 31B can have a ratio of the cross-sectional area of the air inlet to the cross-sectional area of the end face of the consumable, or a ratio of the cross-sectional area of the air inlet to the cross-sectional area of the vaporization chamber b180, as described above for other examples or embodiments.

EXAMPLES

There now follows a disclosure of certain examples of experimental work undertaken to determine the effects of certain conditions in the smoking substitute apparatus on the particle size of the generated aerosol. However, the present disclosure is to be understood to not be limited in its application to the specific experimentation, results, and laboratory procedures disclosed herein after. Rather, the Examples are simply provided as one of various embodiments and are meant to be exemplary, not exhaustive.

The experimental work described in these examples is relevant to the embodiments disclosed above in view of the effect of using a large inlet area on the flow conditions at the wick. The experimental results show that control over the flow conditions at the wick has a significant effect on the particle size of the generated aerosol.

Introduction

Aerosol droplet size is a considered to be an important characteristic for smoking substitution devices. Droplets in the range of 2-5 μm are preferred in order to achieve improved nicotine delivery efficiency and to minimize the hazard of second-hand smoking. However, at the time of writing (September 2019), commercial EVP devices typically deliver aerosols with droplet size averaged around 0.5 μm, and to the knowledge of the inventors not a single commercially available device can deliver an aerosol with an average particle size exceeding 1 μm.

The present inventors speculate, without themselves wishing to be bound by theory, that there has to date been a lack of understanding in the mechanisms of e-liquid evaporation, nucleation and droplet growth in the context of aerosol generation in smoking substitute devices. The present inventors have therefore studied these issues in order to provide insight into mechanisms for the generation of aerosols with larger particles. The present inventors have carried out experimental and modelling work alongside theoretical investigations, leading to significant achievements as now reported.

This disclosure considers the roles of air velocity, air turbulence and vapor cooling rate in affecting aerosol particle size.

Experiments

In the following examples, a Malvern PANalytical Spraytec laser diffraction system was employed for the particle size measurement. In order to limit the number of variables, the same coil and wick (1.5 ohms Ni—Cr coil, 1.8 mm Y07 cotton wick), the same e-liquid (1.6% freebase nicotine, 65:35 propylene glycol (PG)/vegetable glycerin (VG) ratio, no added flavor) and the same input power (10 W) were used in all experiments. Y07 represents the grade of cotton wick, meaning that the cotton has a linear density of 0.7 grams per meter.

Particle sizes were measured in accordance with ISO 13320:2009(E), which is an international standard on laser diffraction methods for particle size analysis. This is particularly well suited to aerosols, because there is an assumption in this standard that the particles are spherical (which is a good assumption for liquid-based aerosols). The standard is stated to be suitable for particle sizes in the range 0.1 micron to 3 mm.

The results presented here concentrate on the volume-based median particle size Dv50. This is to be taken to be the same as the parameter $d_{50}$ used above.

First Example: Rectangular Tube Testing

Figure 1:
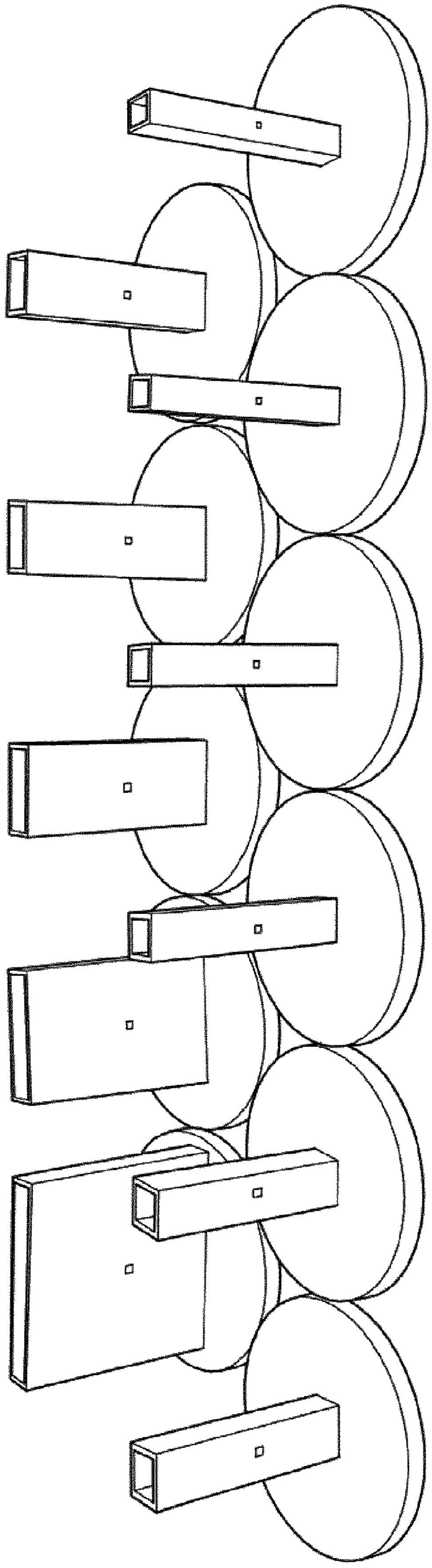
FIG. 1 illustrates a set of rectangular tubes for use in experiments to assess the effect of flow and cooling conditions at the wick on aerosol properties. Each tube has the same depth and length but different width.

The work of a first example reported here based on the inventors' insight that aerosol particle size might be related to: 1) air velocity; 2) flow rate; and 3) Reynolds number. In a given EVP device, these three parameters are inter-linked to each other, making it difficult to draw conclusions on the roles of each individual factor. In order to decouple these factors, experiments of a first example were carried out using a set of rectangular tubes having different dimensions. These were manufactured by 3D printing. The rectangular tubes were 3D printed in an MJP 2500 3D printer. FIG. 1 illustrates the set of rectangular tubes. Each tube has the same depth and length but different width. Each tube has an integral end plate in order to provide a seal against air flow outside the tube. Each tube also has holes formed in opposing side walls in order to accommodate a wick.

Figure 2:
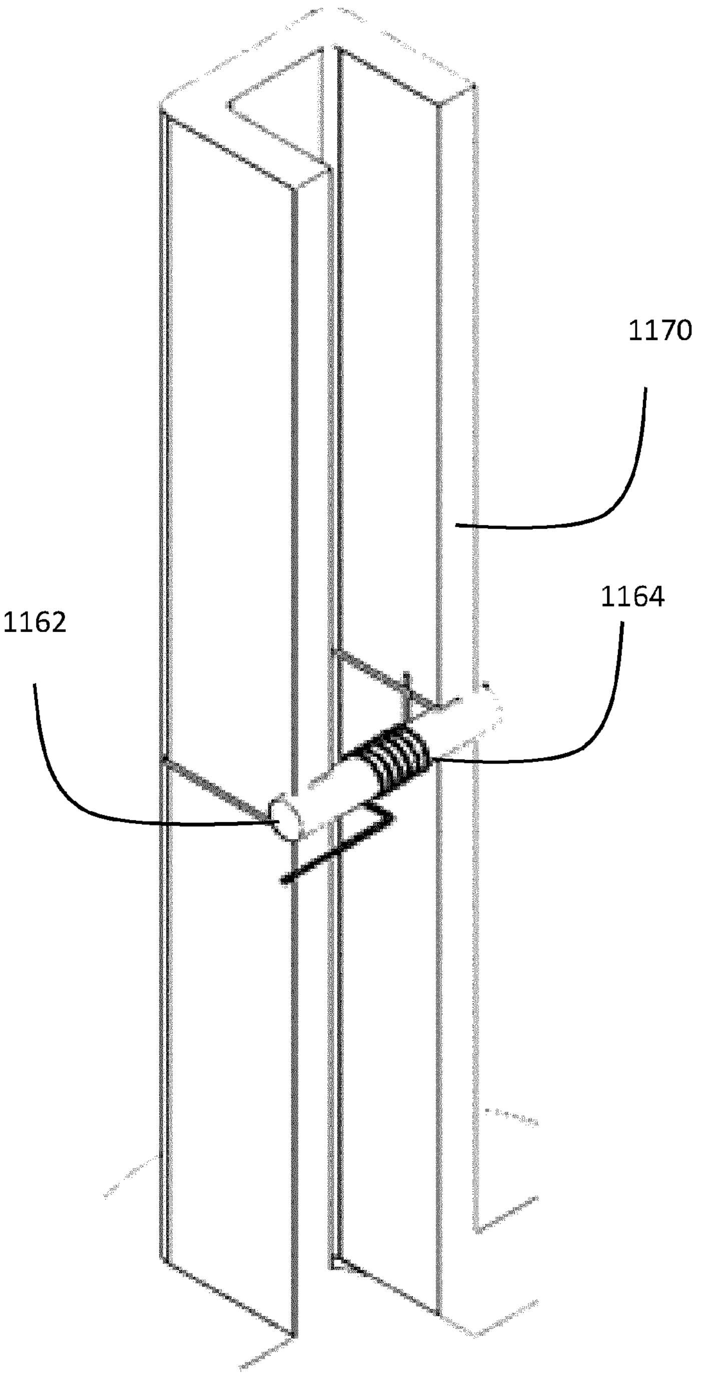
FIG. 2 shows a schematic perspective longitudinal cross sectional view of an example rectangular tube with a wick and heater coil installed.

FIG. 2 shows a schematic perspective longitudinal cross sectional view of an example rectangular tube 1170 with a wick 1162 and heater coil 1164 installed. The location of the wick is about half way along the length of the tube. This is intended to allow the flow of air along the tube to settle before reaching the wick.

Figure 3:
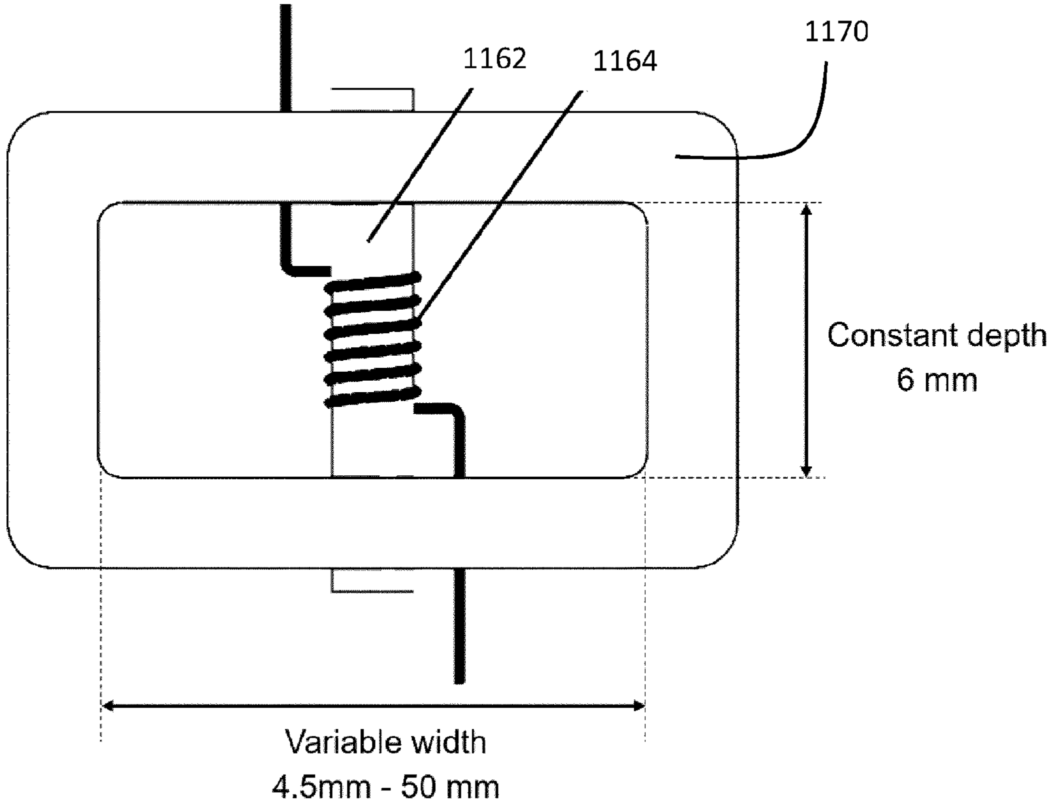
FIG. 3 shows a schematic transverse cross sectional view an example rectangular tube with a wick and heater coil installed. In this example, the internal width of the tube is 12 mm.

FIG. 3 shows a schematic transverse cross sectional view an example rectangular tube 1170 with a wick 1162 and heater coil 1164 installed. In this example, the internal width of the tube is 12 mm.

The rectangular tubes were manufactured to have same internal depth of 6 mm in order to accommodate the standardized coil and wick, however the tube internal width varied from 4.5 mm to 50 mm. In this disclosure, the "tube size" is referred to as the internal width of rectangular tubes.

The rectangular tubes with different dimensions were used to generate aerosols that were tested for particle size in a Malvern PANalytical Spraytec laser diffraction system. An external digital power supply was dialed to 2.6 A constant current to supply 10 W power to the heater coil in all experiments. Between two runs, the wick was saturated manually by applying one drop of e-liquid on each side of the wick.

Three groups of experiments were carried out in this study of a first example:

1. 1.3 lpm (liters per minute, L $min^{-1}$ or LPM) constant flow rate on different size tubes
2. 2.0 lpm constant flow rate on different size tubes
3. 1 m/s constant air velocity on 3 tubes: i) 5 mm tube at 1.4 lpm flow rate; ii) 8 mm tube at 2.8 lpm flow rate; and iii) 20 mm tube at 8.6 lpm flow rate.

Table 1 shows a list of experiments of a first example. The values in "calculated air velocity" column were obtained by simply dividing the flow rate by the intersection area at the center plane of wick. Reynolds numbers (Re) were calculated through the following equation:

$$Re = \frac{\rho v L}{\mu},$$

where: ρ is the density of air (1.225 $kg/m^3$); v is the calculated air velocity in table 1; μ is the viscosity of air ($1.48\times10^{-5}$ $m^2/s$); L is the characteristic length calculated by:

$$L = \frac{4P}{A},$$

where: P is the perimeter of the flow path's intersection, and A is the area of the flow path's intersection.

TABLE 1

| List of experiments in the rectangular tube study | Tube size [mm] | Flow rate [lpm] | Reynolds number | Calculated air velocity [m/s] |
|---|---|---|---|---|
| 1.3 lpm | 4.5 | 1.3 | 153 | 1.17 |
| constant | 6 | 1.3 | 142 | 0.71 |
| flow rate | 7 | 1.3 | 136 | 0.56 |
| | 8 | 1.3 | 130 | 0.47 |
| | 10 | 1.3 | 120 | 0.35 |
| | 12 | 1.3 | 111 | 0.28 |
| | 20 | 1.3 | 86 | 0.15 |
| | 50 | 1.3 | 47 | 0.06 |
| 2.0 lpm | 4.5 | 2.0 | 236 | 1.81 |
| constant | 5 | 2.0 | 230 | 1.48 |
| flow rate | 6 | 2.0 | 219 | 1.09 |
| | 8 | 2.0 | 200 | 0.72 |
| | 12 | 2.0 | 171 | 0.42 |
| | 20 | 2.0 | 132 | 0.23 |
| | 50 | 2.0 | 72 | 0.09 |
| 1.0 m/s | 5.0 | 1.4 | 155 | 1.00 |
| constant | 8 | 2.8 | 279 | 1.00 |
| air velocity | 20 | 8.6 | 566 | 1.00 |

Five repetition runs were carried out for each tube size and flow rate combination. Between adjacent runs there were at least 5 minutes wait time for the Spraytec system to be purged. In each run, real time particle size distributions were measured in the Spraytec laser diffraction system at a sampling rate of 2500 per second, the volume distribution median (Dv50) was averaged over a puff duration of 4 seconds. Measurement results were averaged and the standard deviations were calculated to indicate errors as shown in section 4 below.

Second Example: Turbulence Tube Testing

The Reynolds numbers in Table 1 are all well below 1000, therefore, it is considered fair to assume all the experiments of a first example would be under conditions of laminar flow. Further experiments (of a second example) were carried out and reported in this section to investigate the role of turbulence.

Turbulence intensity was introduced as a quantitative parameter to assess the level of turbulence. The definition and simulation of turbulence intensity is discussed below.

Different device designs were considered in order to introduce turbulence. In the experiments of the second example reported here, jetting panels were added in the existing 12 mm rectangular tubes upstream of the wick. This approach enables direct comparison between different devices as they all have highly similar geometry, with turbulence intensity being the only variable.

Figure 4A:
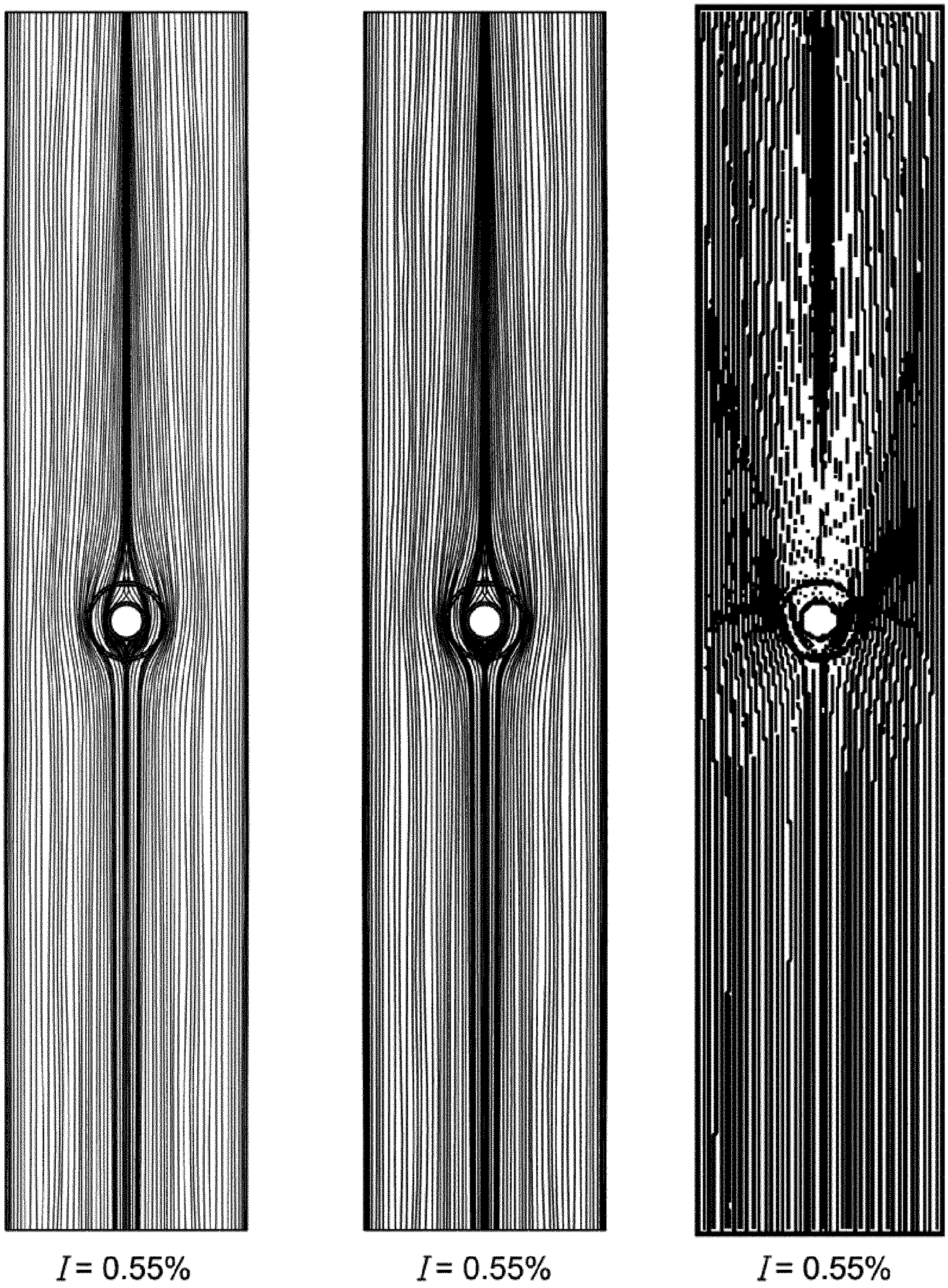
FIGS. 4A-4D show air flow streamlines in the four devices used in a turbulence study.
Figure 4B:
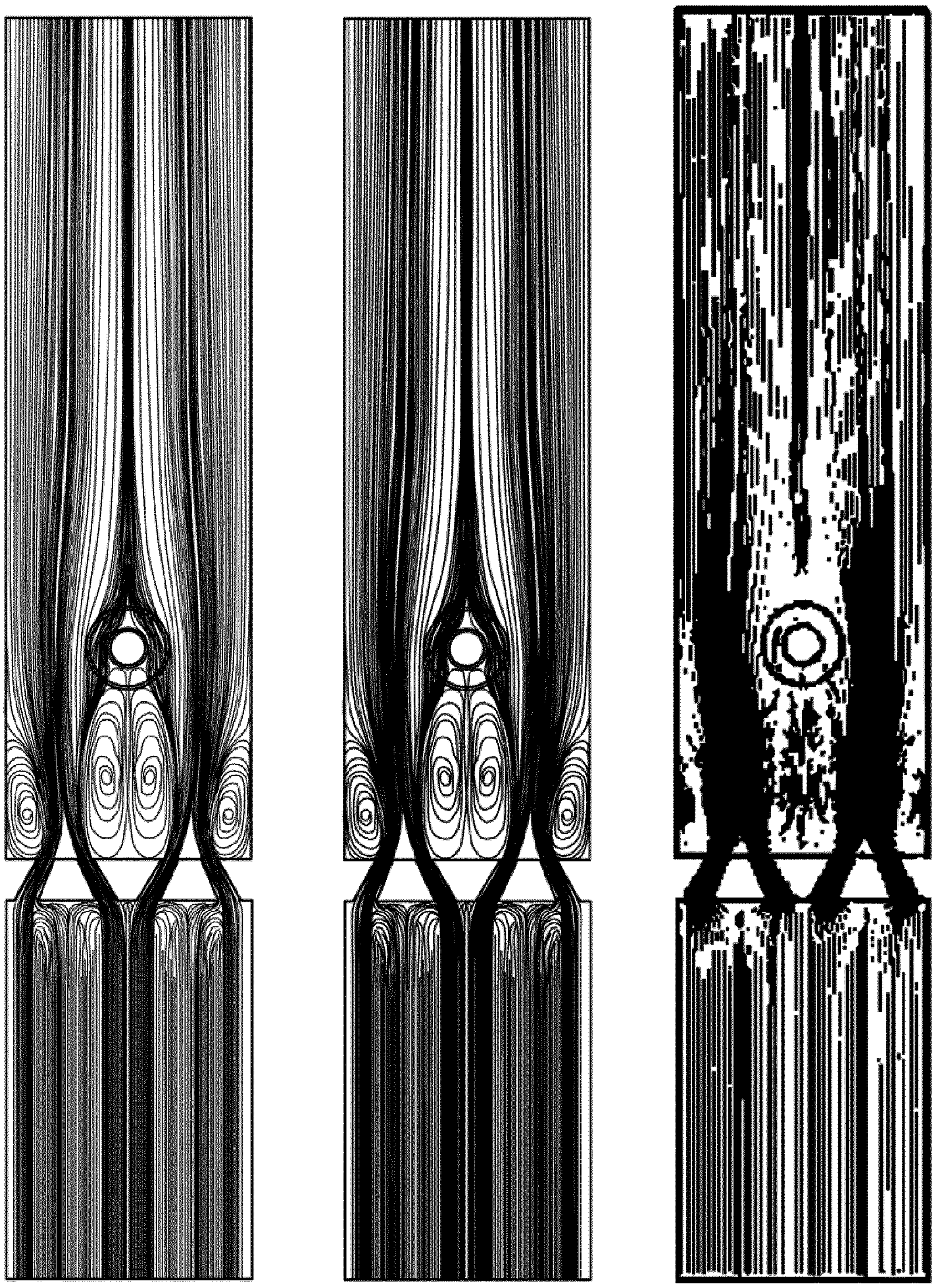
Figure 4C:
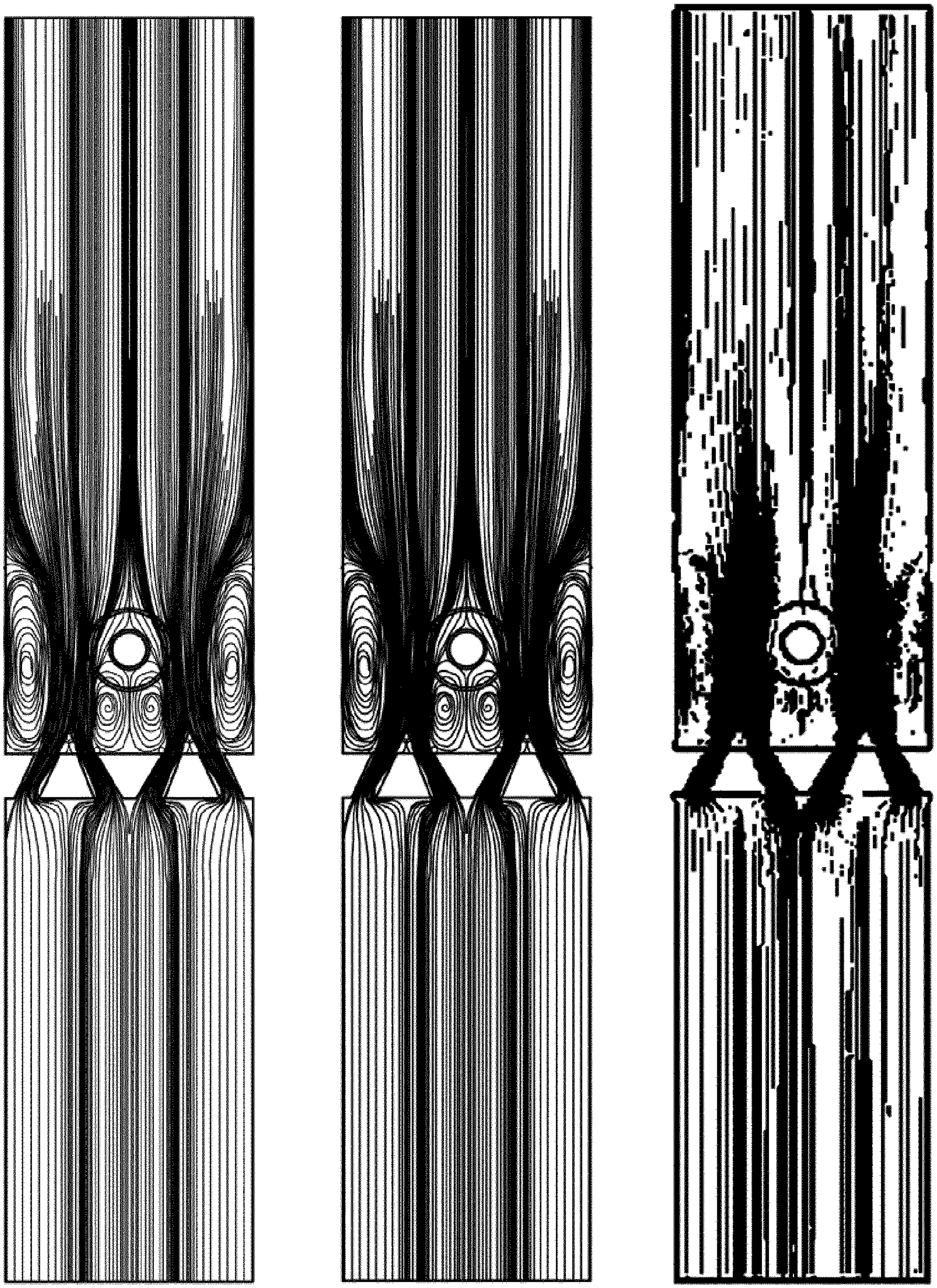
Figure 4D:
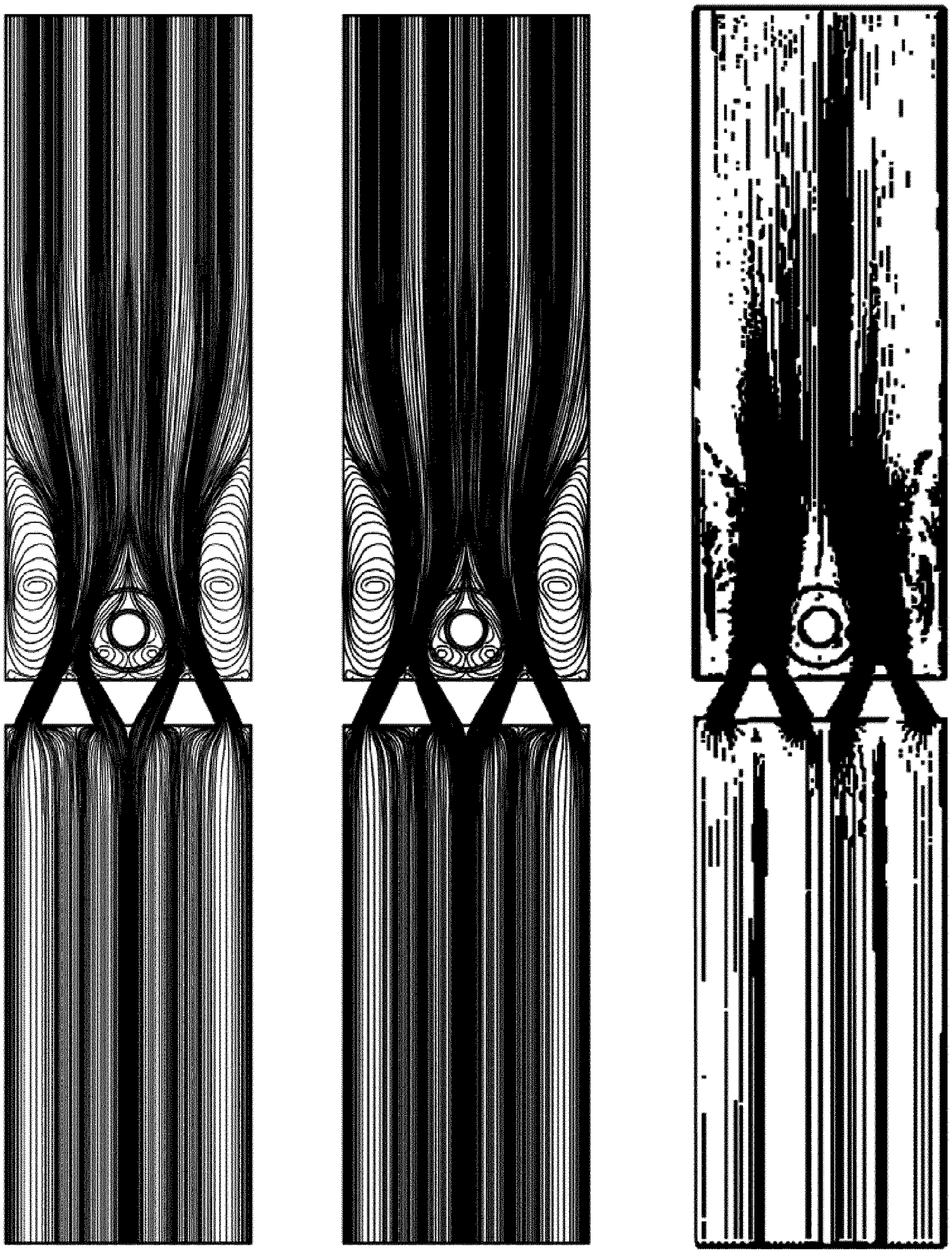

FIGS. 4A-4D show air flow streamlines in the four devices used in this turbulence study of the second example. FIG. 4A is a standard 12 mm rectangular tube with wick and coil installed as explained previously, with no jetting panel. FIG. 4B has a jetting panel located 10 mm below (upstream from) the wick. FIG. 4C has the same jetting panel 5 mm below the wick. FIG. 4D has the same jetting panel 2.5 mm below the wick. As can be seen from FIGS. 4B-4D, the jetting panel has an arrangement of apertures shaped and directed in order to promote jetting from the downstream face of the panel and therefore to promote turbulent flow. Accordingly, the jetting panel can introduce turbulence downstream, and the panel causes higher level of turbulence near the wick when it is positioned closer to the wick. As shown in FIGS. 4A-4D, the four geometries gave turbulence intensities of 0.55%, 0.77%, 1.06% and 1.34%, respectively, with FIG. 4A being the least turbulent, and FIG. 4D being the most turbulent.

For each of FIGS. 4A-4D, there are shown three modelling images. The image on the left shows the original image (color in the original), the central image shows a greyscale version of the image and the right hand image shows a black and white version of the image. As will be appreciated, each version of the image highlights slightly different features of the flow. Together, they give a reasonable picture of the flow conditions at the wick.

These four devices were operated to generate aerosols following the procedure explained above (the first example) using a flow rate of 1.3 lpm and the generated aerosols were tested for particle size in the Spraytec laser diffraction system.

Third Example: High Temperature Testing

This experiment of a third example aimed to investigate the influence of inflow air temperature on aerosol particle size, in order to investigate the effect of vapor cooling rate on aerosol generation.

Figure 5:
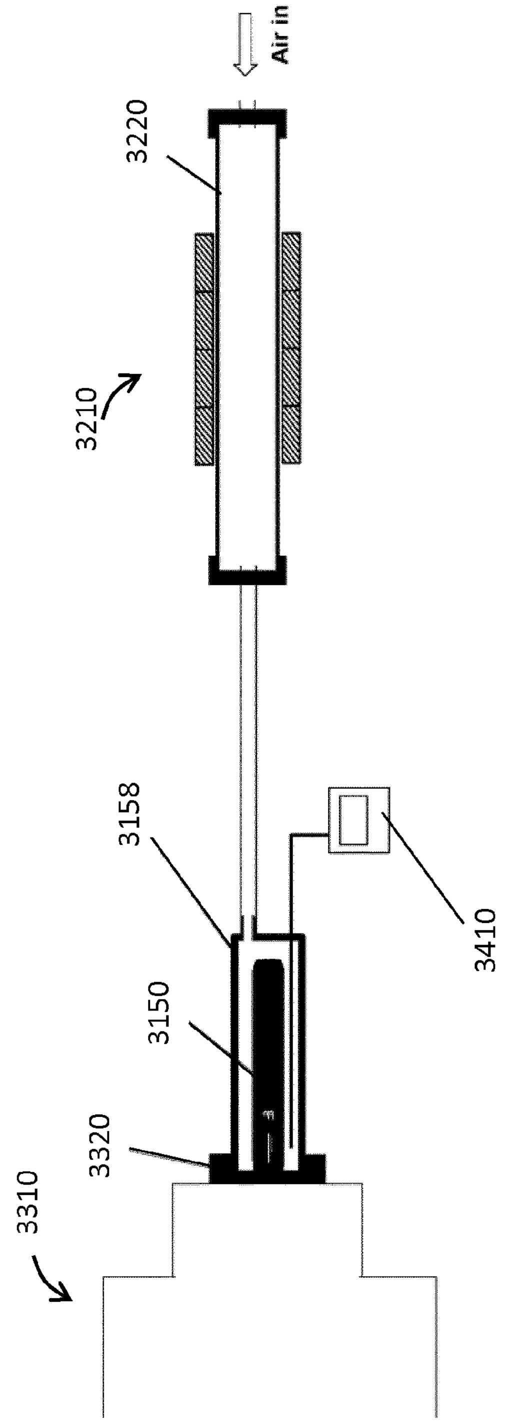
FIG. 5 shows the experimental set up to investigate the influence of inflow air temperature on aerosol particle size, in order to investigate the effect of vapor cooling rate on aerosol generation.

The experimental set up of the third example is shown in FIG. 5. The testing used a Carbolite Gero EHA 12300B tube furnace 3210 with a quartz tube 3220 to heat up the air. Hot air in the tube furnace was then led into a transparent housing 3158 that contains the EVP device 3150 to be tested. A thermocouple meter 3410 was used to assess the temperature of the air pulled into the EVP device. Once the EVP device was activated, the aerosol was pulled into the Spraytec laser diffraction system 3310 via a silicone connector 3320 for particle size measurement.

Figure 7:
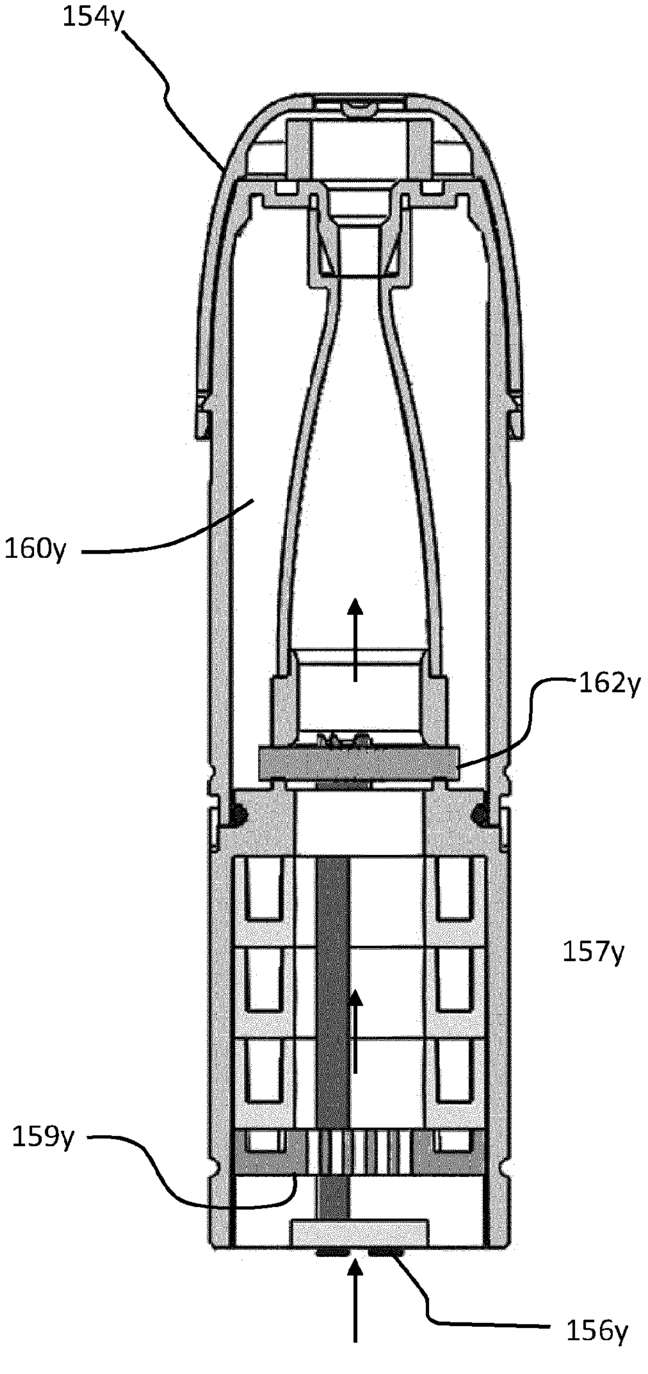
FIG. 7 shows a schematic longitudinal cross sectional view of a second smoking substitute apparatus (pod 2) used to assess influence of inflow air temperature on aerosol particle size.
Figures 8A, 8B:
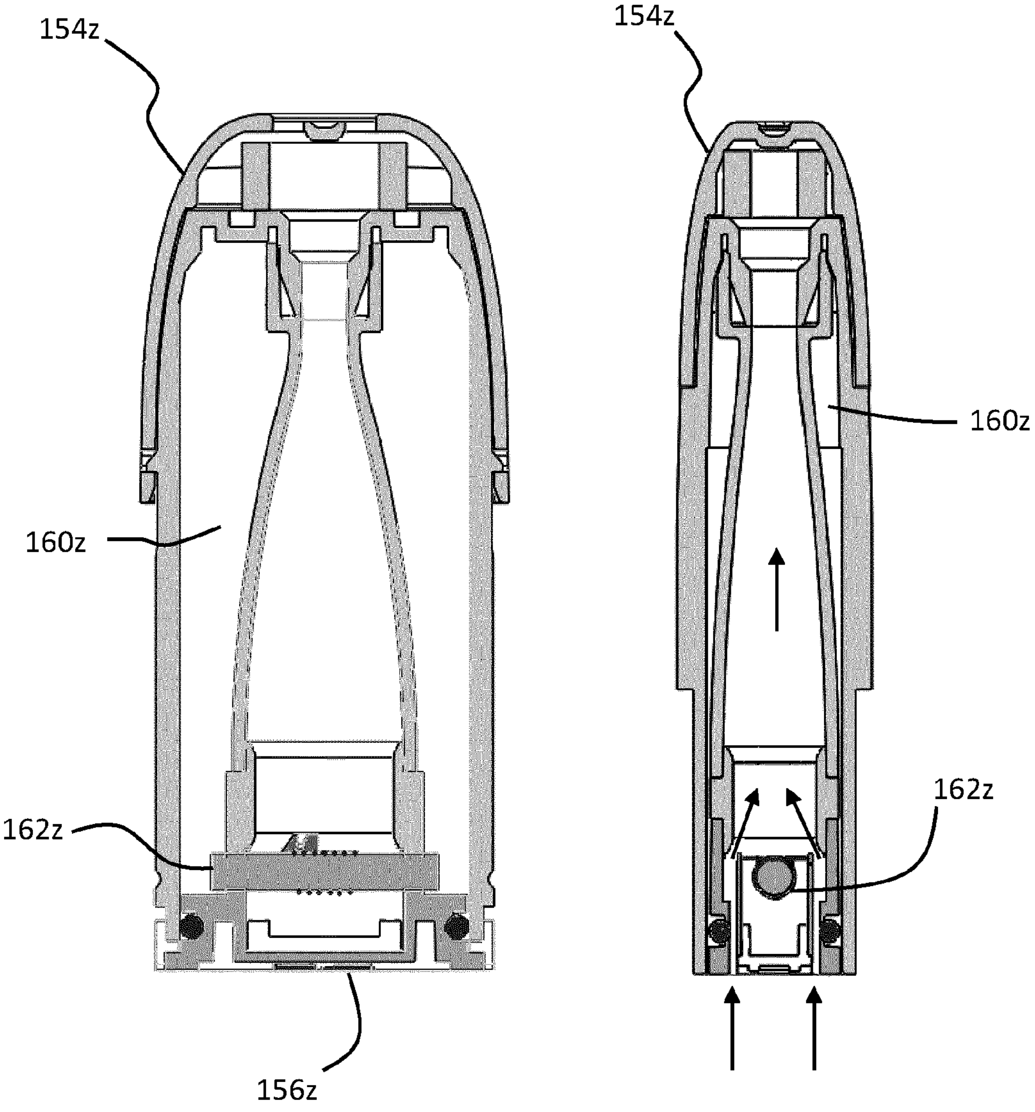
FIG. 8A shows a schematic longitudinal cross sectional view of a third smoking substitute apparatus (pod 3) used to assess influence of inflow air temperature on aerosol particle size.
FIG. 8B shows a schematic longitudinal cross sectional view of the same third smoking substitute apparatus (pod 3) in a direction orthogonal to the view taken in FIG. 8A.

Three smoking substitute apparatuses (referred to as "pods") were tested in the study: pod 1 is the commercially available "myblu optimised" pod (FIG. 6); pod 2 is a pod featuring an extended inflow path upstream of the wick (FIG. 7); and pod 3 is pod with the wick located in a stagnant vaporization chamber and the inlet air bypassing the vaporization chamber but entraining the vapor from an outlet of the vaporization chamber (FIGS. 8A and 8B).

Figure 6:
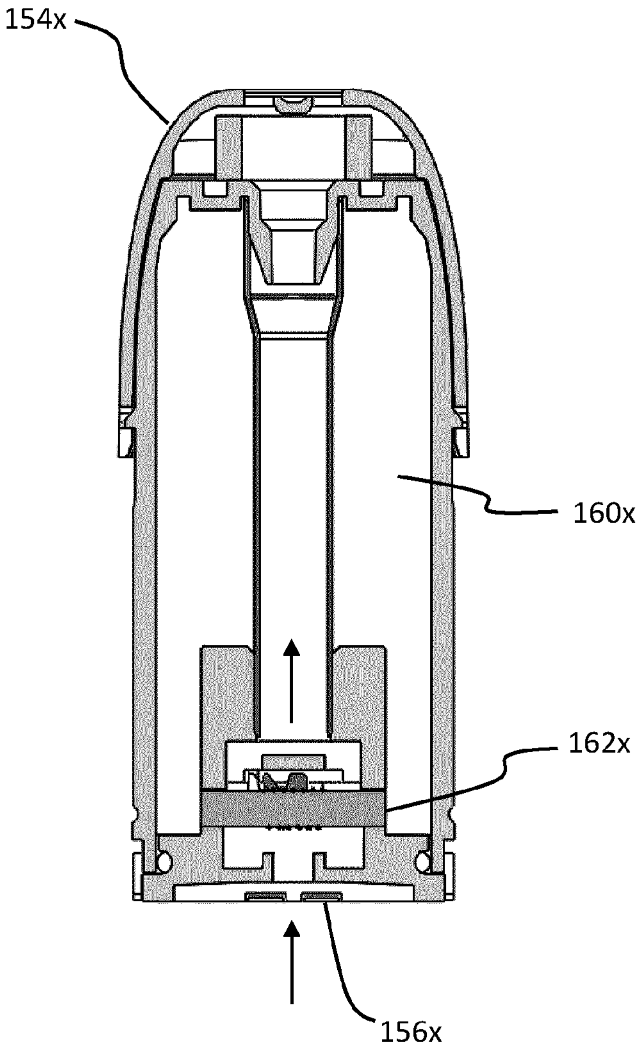
FIG. 6 shows a schematic longitudinal cross sectional view of a first smoking substitute apparatus (pod 1) used to assess influence of inflow air temperature on aerosol particle size.

Pod 1, shown in longitudinal cross sectional view (in the width plane) in FIG. 6, has a main housing that defines a tank 160*x* holding an e-liquid aerosol precursor. Mouthpiece 154*x* is formed at the upper part of the pod. Electrical contacts 156*x* are formed at the lower end of the pod. Wick 162*x* is held in a vaporization chamber. The air flow direction is shown using arrows.

Pod 2, shown in longitudinal cross sectional view (in the width plane) in FIG. 7, has a main housing that defines a tank 160*y* holding an e-liquid aerosol precursor. Mouthpiece 154*y* is formed at the upper part of the pod. Electrical contacts 156*y* are formed at the lower end of the pod. Wick 162*y* is held in a vaporization chamber. The air flow direction is shown using arrows. Pod 2 has an extended inflow path (plenum chamber 157*y*) with a flow conditioning element 159*y*, configured to promote reduced turbulence at the wick 162*y*.

FIG. 8A shows a schematic longitudinal cross sectional view of pod 3. FIG. 8B shows a schematic longitudinal cross sectional view of the same pod 3 in a direction orthogonal to the view taken in FIG. 8A. Pod 3 has a main housing that defines a tank 160*z* holding an e-liquid aerosol precursor. Mouthpiece 154*z* is formed at the upper part of the pod. Electrical contacts 156*z* are formed at the lower end of the pod. Wick 162*z* is held in a vaporization chamber. The air flow direction is shown using arrows. Pod 3 uses a stagnant vaporizer chamber, with the air inlets bypassing the wick and picking up the vapor/aerosol downstream of the wick.

All three pods were filled with the same e-liquid (1.6% freebase nicotine, 65:35 PG/VG ratio, no added flavor). Three experiments of the third example were carried out for each pod: 1) standard measurement in ambient temperature; 2) only the inlet air was heated to 50° C.; and 3) both the inlet air and the pods were heated to 50° C. Five repetition runs were carried out for each experiment and the Dv50 results were taken and averaged.

Modelling Work

In the following examples, modelling work was performed using COMSOL Multiphysics 5.4, engaged physics include: 1) laminar single-phase flow; 2) turbulent single-phase flow; 3) laminar two-phase flow; 4) heat transfer in fluids; and (5) particle tracing. Data analysis and data visualization were mostly completed in MATLAB R2019a.

Fourth Example: Velocity Modelling

Air velocity in the vicinity of the wick is believed to play an important role in affecting particle size. In the first example, the air velocity was calculated by dividing the flow rate by the intersection area, which is referred to as "calculated velocity" in a fourth example. This involves a very crude simplification that assumes velocity distribution to be homogeneous across the intersection area.

In order to increase reliability of the fourth example, computational fluid dynamics (CFD) modelling was performed to obtain more accurate velocity values:

1) The average velocity in the vicinity of the wick (defined as a volume from the wick surface to 1 mm away from the wick surface)
2) The maximum velocity in the vicinity of the wick (defined as a volume from the wick surface to 1 mm away from the wick surface)

TABLE 2

Average and maximum velocity in the vicinity of wick surface obtained from CFD modelling.

| | Tube size [mm] | Flow rate [lpm] | Calculated velocity* [m/s] | Average velocity** [m/s] | Maximum Velocity** [m/s] |
|---|---|---|---|---|---|
| 1.3 lpm | 4.5 | 1.3 | 1.17 | 0.99 | 1.80 |
| constant | 6 | 1.3 | 0.71 | 0.66 | 1.22 |
| flow rate | 7 | 1.3 | 0.56 | 0.54 | 1.01 |
| | 8 | 1.3 | 0.47 | 0.46 | 0.86 |
| | 10 | 1.3 | 0.35 | 0.35 | 0.66 |
| | 12 | 1.3 | 0.28 | 0.27 | 0.54 |
| | 20 | 1.3 | 0.15 | 0.15 | 0.32 |
| | 50 | 1.3 | 0.06 | 0.05 | 0.12 |
| 2.0 lpm | 4.5 | 2.0 | 1.81 | 1.52 | 2.73 |
| constant | 5 | 2.0 | 1.48 | 1.31 | 2.39 |
| flow rate | 6 | 2.0 | 1.09 | 1.02 | 1.87 |
| | 8 | 2.0 | 0.72 | 0.71 | 1.31 |
| | 12 | 2.0 | 0.42 | 0.44 | 0.83 |
| | 20 | 2.0 | 0.23 | 0.24 | 0.49 |
| | 50 | 2.0 | 0.09 | 0.08 | 0.19 |

*Calculated by dividing flow rate with intersection area

**Obtained from CFD modelling

The CFD model uses a laminar single-phase flow setup. For each experiment, the outlet was configured to a corresponding flowrate, the inlet was configured to be pressure-controlled, the wall conditions were set as "no slip". A 1 mm wide ring-shaped domain (wick vicinity) was created around the wick surface, and domain probes were implemented to assess the average and maximum magnitudes of velocity in this ring-shaped wick vicinity domain.

The CFD model of the fourth example outputs the average velocity and maximum velocity in the vicinity of the wick for each set of experiments carried out in the first example. The outcomes are reported in Table 2.

Fifth Example: Turbulence Modelling

Turbulence intensity (I) is a quantitative value that represents the level of turbulence in a fluid flow system. It is defined as the ratio between the root-mean-square of velocity fluctuations, u', and the Reynolds-averaged mean flow velocity, U:

$$I = \frac{u'}{U} = \frac{\sqrt{\frac{1}{3}\left(u_x'^2 + u_y'^2 + u_z'^2\right)}}{\sqrt{\overline{u_x}^2 + \overline{u_y}^2 + \overline{u_z}^2}} = \frac{\sqrt{\frac{1}{3}\left[(u_x - \overline{u_x})^2 + (u_y - \overline{u_y})^2 + + (u_z - \overline{u_z})^2\right]}}{\sqrt{\overline{u_x}^2 + \overline{u_y}^2 + \overline{u_z}^2}},$$

where $u_x$, $u_y$ and $u_z$ are the x-, y- and z-components of the velocity vector, $\overline{u_x}$, $\overline{u_y}$, and $\overline{u_z}$ represent the average velocities along three directions.

Higher turbulence intensity values represent higher levels of turbulence. As a rule of thumb, turbulence intensity below 1% represents a low-turbulence case, turbulence intensity between 1% and 5% represents a medium-turbulence case, and turbulence intensity above 5% represents a high-turbulence case.

In a fifth example, turbulence intensity was obtained from CFD simulation using turbulent single-phase setup in COMSOL Multiphysics. For each of the four experiments explained in the second example, above, the outlet was set to 1.3 lpm, the inlet was set to be pressure-controlled, and all wall conditions were set to be "no slip".

Turbulence intensity of the fifth example was assessed within the volume up to 1 mm away from the wick surface (defined as the wick vicinity domain). For the four experiments explained in the second example, the turbulence intensities are 0.55%, 0.77%, 1.06% and 1.34%, respectively, as also shown in FIGS. 4A-4D.

Sixth Example: Cooling Rate Modelling

The cooling rate modelling of the sixth example involves three coupling models in COMSOL Multiphysics: 1) laminar two-phase flow; 2) heat transfer in fluids, and 3) particle tracing. The model is setup in three steps:

(1) Set Up Two Phase Flow Model

Laminar mixture flow physics was selected for the sixth example. The outlet was configured in the same way as in the fourth example. However, this model of the sixth example includes two fluid phases released from two separate inlets: the first one is the vapor released from wick surface, at an initial velocity of 2.84 cm/s (calculated based on 5 mg total particulate mass over 3 seconds puff duration) with initial velocity direction normal to the wick surface; the second inlet is air influx from the base of tube, the rate of which is pressure-controlled.

(2) Set Up Two-Way Coupling with Heat Transfer Physics

The inflow and outflow settings in heat transfer physics was configured in the same way as in the two-phase flow model. The air inflow was set to 25° C., and the vapor inflow was set to 209° C. (boiling temperature of the e-liquid formulation). In the end, the heat transfer physics is configured to be two-way coupled with the laminar mixture flow physics. The above model reaches steady state after approximately 0.2 second with a step size of 0.001 second.

(3) Set Up Particle Tracing

A wave of 2000 particles were release from wick surface at t=0.3 second after the two-phase flow and heat transfer model has stabilized. The particle tracing physics has one-way coupling with the previous model, which means the fluid flow exerts dragging force on the particles, whereas the particles do not exert counterforce on the fluid flow. Therefore, the particles function as moving probes to output vapor temperature at each timestep.

The model of the sixth example outputs average vapor temperature at each time steps. A MATLAB script was then created to find the time step when the vapor cools to a target temperature (50° C. or 75° C.), based on which the vapor cooling rates were obtained (Table 3).

TABLE 3

Average vapor cooling rate obtained from Multiphysics modelling.

| | Tube size [mm] | Flow rate [lpm] | Cooling rate to 50° C. [° C./ms] | Cooling rate to 75° C. [° C./ms] |
|---|---|---|---|---|
| 1.3 lpm | 4.5 | 1.3 | 11.4 | 44.7 |
| constant | 6 | 1.3 | 5.48 | 14.9 |
| flow rate | 7 | 1.3 | 3.46 | 7.88 |
| | 8 | 1.3 | 2.24 | 5.15 |
| | 10 | 1.3 | 1.31 | 2.85 |
| | 12 | 1.3 | 0.841 | 1.81 |
| | 20 | 1.3 | 0* | 0.536 |
| | 50 | 1.3 | 0 | 0 |
| 2.0 lpm | 4.5 | 2.0 | 19.9 | 670 |
| constant | 5 | 2.0 | 13.3 | 67 |
| flow rate | 6 | 2.0 | 8.83 | 26.8 |
| | 8 | 2.0 | 3.61 | 8.93 |
| | 12 | 2.0 | 1.45 | 3.19 |
| | 20 | 2.0 | 0.395 | 0.761 |
| | 50 | 2.0 | 0 | 0 |

*Zero cooling rate when the average vapor temperature is still above target temperature after 0.5 second Results and Discussions Particle size measurement results for the rectangular tube testing example above (the first example) are shown in Table 4. For every tube size and flow rate combination, five repetition runs were carried out in the Spraytec laser diffraction system. The Dv50 values from five repetition runs were averaged, and the standard deviations were calculated to indicate errors, as shown in Table 4.

In this section, the roles of different factors affecting aerosol particle size will be discussed based on experimental and modelling results.

TABLE 4

Particle size measurement results for the rectangular tube testing.

| | Tube size [mm] | Flow rate [lpm] | Dv50 average [μm] | Dv50 standard deviation [μm] |
|---|---|---|---|---|
| 1.3 lpm | 4.5 | 1.3 | 0.971 | 0.125 |
| constant | 6 | 1.3 | 1.697 | 0.341 |
| flow rate | 7 | 1.3 | 2.570 | 0.237 |
| | 8 | 1.3 | 2.705 | 0.207 |
| | 10 | 1.3 | 2.783 | 0.184 |
| | 12 | 1.3 | 3.051 | 0.325 |

TABLE 4-continued

Particle size measurement results for the rectangular tube testing.

| | Tube size [mm] | Flow rate [lpm] | Dv50 average [μm] | Dv50 standard deviation [μm] |
|---|---|---|---|---|
| | 20 | 1.3 | 3.116 | 0.354 |
| | 50 | 1.3 | 3.161 | 0.157 |
| 2.0 lpm | 4.5 | 2.0 | 0.568 | 0.039 |
| constant | 5 | 2.0 | 0.967 | 0.315 |
| flow rate | 6 | 2.0 | 1.541 | 0.272 |
| | 8 | 2.0 | 1.646 | 0.363 |
| | 12 | 2.0 | 3.062 | 0.153 |
| | 20 | 2.0 | 3.566 | 0.260 |
| | 50 | 2.0 | 3.082 | 0.440 |
| 1.0 m/s | 5.0 | 1.4 | 1.302 | 0.187 |
| constant | 8 | 2.8 | 1.303 | 0.468 |
| air velocity | 20 | 8.6 | 1.463 | 0.413 |

Seventh Example: Decouple the Factors Affecting Particle Size

Figure 9:
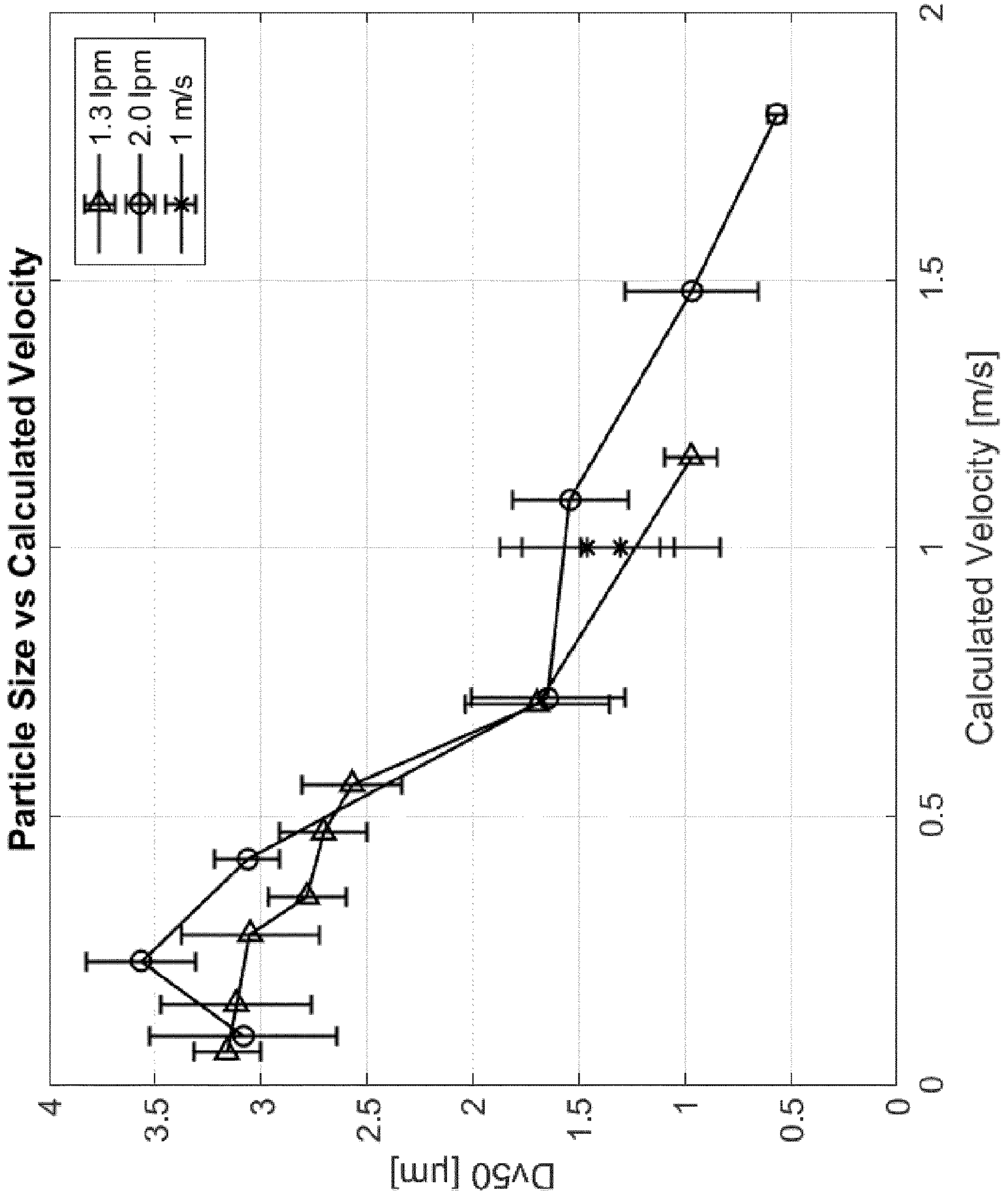
FIG. 9 shows a plot of aerosol particle size (Dv50) experimental results against calculated air velocity.

The particle size (Dv50) experimental results of a seventh example are plotted against calculated air velocity in FIG. 9. The graph shows a strong correlation between particle size and air velocity.

Different size tubes were tested at two flow rates: 1.3 lpm and 2.0 lpm. Both groups of data show the same trend that slower air velocity leads to larger particle size. The conclusion was made more convincing by the fact that these two groups of data overlap well in FIG. 9: for example, the 6 mm tube delivered an average Dv50 of 1.697 μm when tested at 1.3 lpm flow rate, and the 8 mm tube delivered a highly similar average Dv50 of 1.646 μm when tested at 2.0 lpm flow rate, as they have similar air velocity of 0.71 and 0.72 m/s, respectively.

Figure 10:
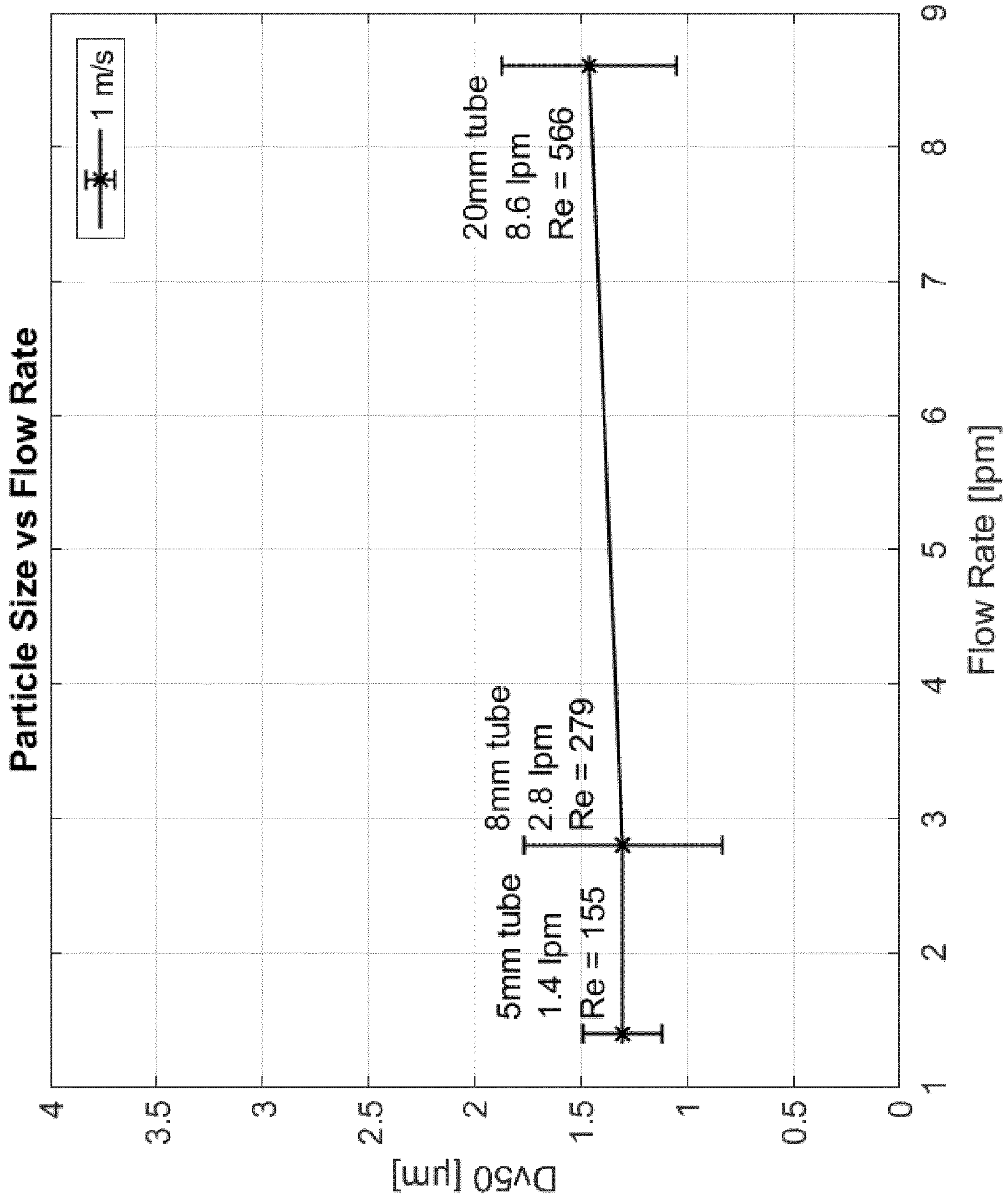
FIG. 10 shows a plot of aerosol particle size (Dv50) experimental results against the flow rate through the apparatus for a calculated air velocity of 1 m/s.

In addition, FIG. 10 shows the results of three experiments of the seventh example, with highly different setup arrangements: 1) 5 mm tube measured at 1.4 lpm flow rate with Reynolds number of 155; 2) 8 mm tube measured at 2.8 lpm flow rate with Reynolds number of 279; and 3) 20 mm tube measured at 8.6 lpm flow rate with Reynolds number of 566. It is relevant that these setup arrangements have one similarity: the air velocities are all calculated to be 1 m/s. FIG. 10 shows that, although these three sets of experiments have different tube sizes, flow rates and Reynolds numbers, they all delivered similar particle sizes, as the air velocity was kept constant. These three data points were also plotted out in FIG. 9 (1 m/s data with star marks) and they tie in nicely into particle size-air velocity trendline.

The above results of the seventh example lead to a strong conclusion that air velocity is an important factor affecting the particle size of EVP devices. Relatively large particles are generated when the air travels with slower velocity around the wick. It can also be concluded that flow rate, tube size and Reynolds number are not necessarily independently relevant to particle size, providing the air velocity is controlled in the vicinity of the wick.

Eighth Example: Further Consideration of Velocity

In FIG. 9 the "calculated velocity" was obtained by dividing the flow rate by the intersection area, which is a crude simplification that assumes a uniform velocity field. In order to increase reliability of the work, CFD modelling has been performed to assess the average and maximum velocities in the vicinity of the wick. In an eighth example, the "vicinity" was defined as a volume from the wick surface up to 1 mm away from the wick surface.

Figure 11:
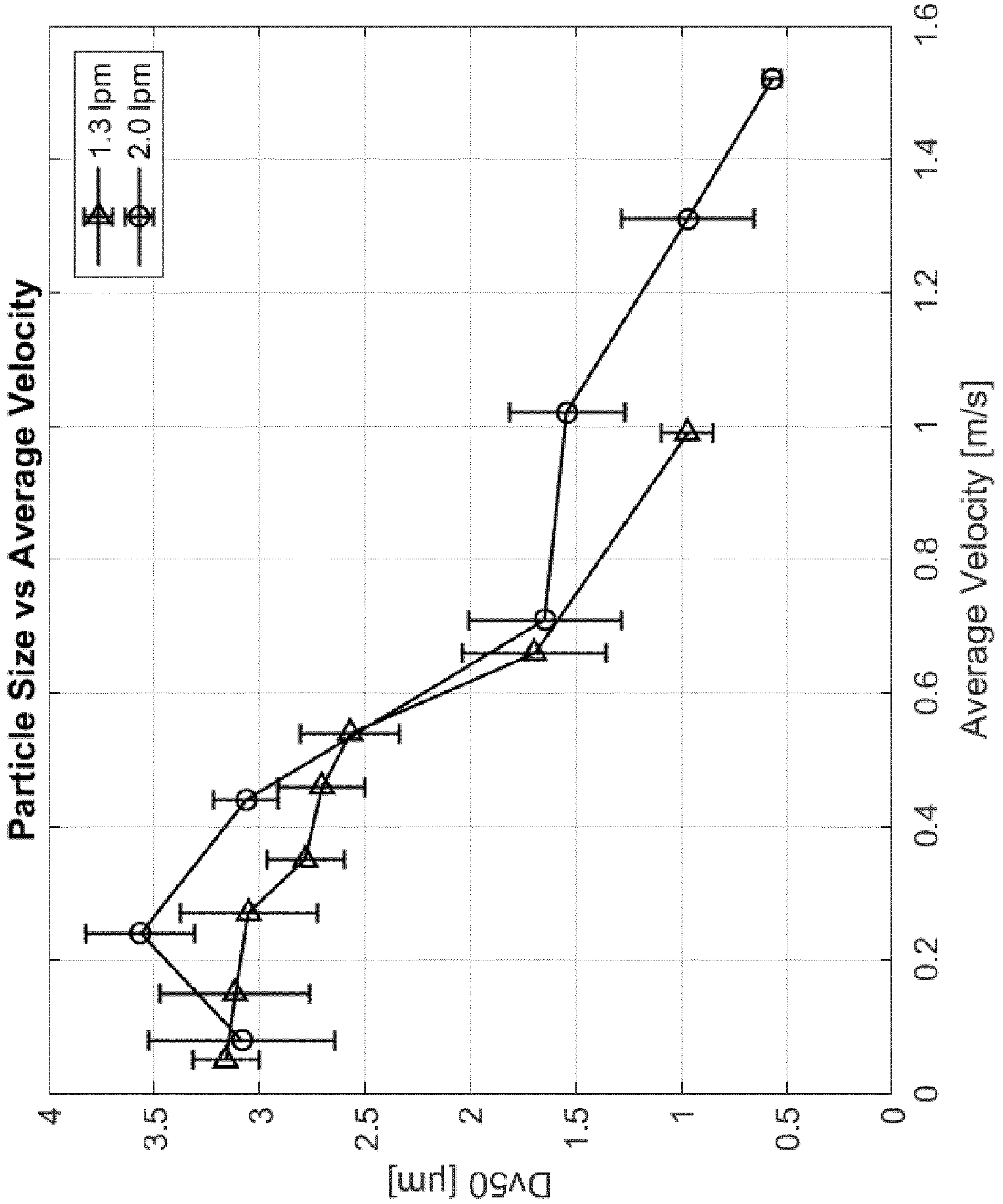
FIG. 11 shows a plot of aerosol particle size (Dv50) experimental results against the average magnitude of the velocity in the vaporizer surface region, as obtained from CFD modelling.
Figure 12:
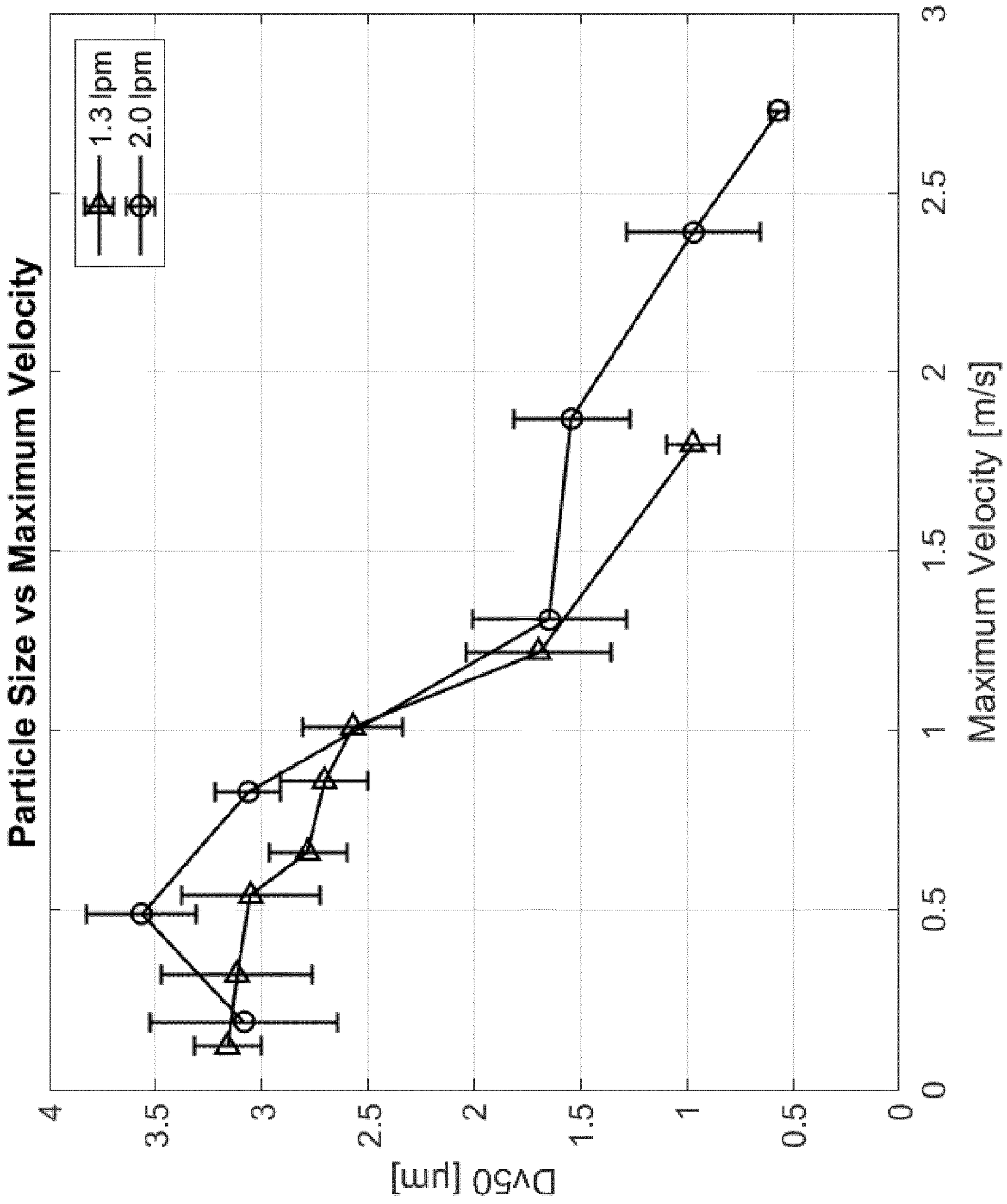
FIG. 12 shows a plot of aerosol particle size (Dv50) experimental results against the maximum magnitude of the velocity in the vaporizer surface region, as obtained from CFD modelling.

The particle size measurement data of the eighth example were plotted against the average velocity (FIG. 11) and maximum velocity (FIG. 12) in the vicinity of the wick, as obtained from CFD modelling.

The data in these two graphs indicates that in order to obtain an aerosol with Dv50 larger than 1 μm, the average velocity should be less than or equal to 1.2 m/s in the vicinity of the wick and the maximum velocity should be less than or equal to 2.0 m/s in the vicinity of the wick.

Furthermore, in order to obtain an aerosol with Dv50 of 2 μm or larger, the average velocity should be less than or equal to 0.6 m/s in the vicinity of the wick and the maximum velocity should be less than or equal to 1.2 m/s in the vicinity of the wick.

It is considered that typical commercial EVP devices deliver aerosols with Dv50 around 0.5 μm, and there is no commercially available device that can deliver aerosol with Dv50 exceeding 1 μm. It is considered that typical commercial EVP devices have average velocity of 1.5-2.0 m/s in the vicinity of the wick.

Ninth Example: The Role of Turbulence

The role of turbulence has been investigated in terms of turbulence intensity in a ninth example, which is a quantitative characteristic that indicates the level of turbulence. In the ninth example, four tubes of different turbulence intensities were used to general aerosols which were measured in the Spraytec laser diffraction system. The particle size (Dv50) experimental results of the ninth example are plotted against turbulence intensity in FIG. 13.

Figure 13:
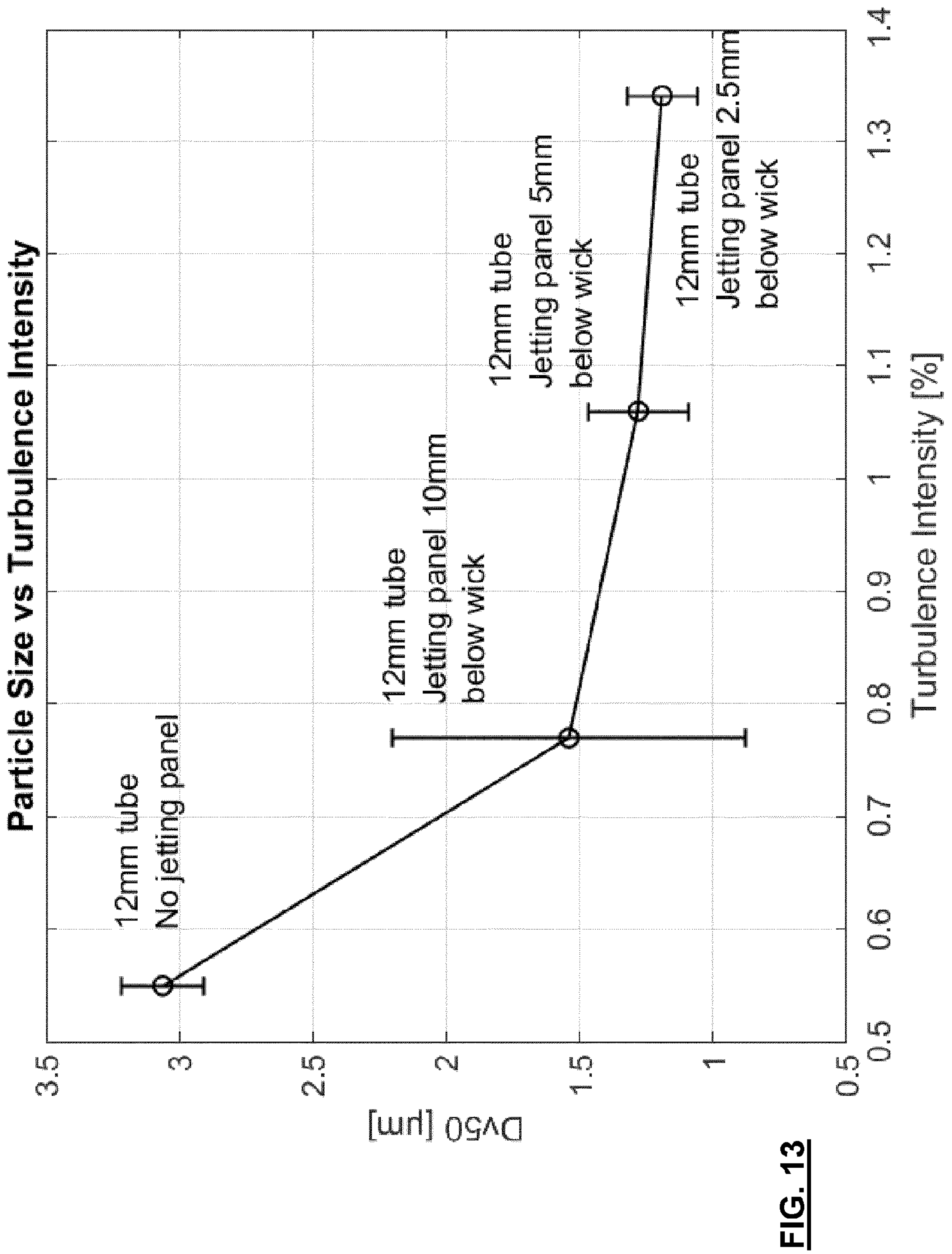
FIG. 13 shows a plot of aerosol particle size (Dv50) experimental results against the turbulence intensity.

The graph suggests a correlation between particle size and turbulence intensity, that lower turbulence intensity is beneficial for obtaining larger particle size. It is noted that when turbulence intensity is above 1% (medium-turbulence case), there are relatively large measurement fluctuations. In FIG. 13, the tube with a jetting panel 10 mm below the wick has the largest error bar, because air jets become unpredictable near the wick after traveling through a long distance.

The results of the ninth example clearly indicate that laminar air flow is favorable for the generation of aerosols with larger particles, and that the generation of large particle sizes is jeopardized by introducing turbulence. In FIG. 13, the 12 mm standard rectangular tube (without jetting panel) delivers above 3 μm particle size (Dv50). The particle size values reduced by at least a half when jetting panels were added to introduce turbulence.

Tenth Example: Vapor Cooling Rate

Figure 14:
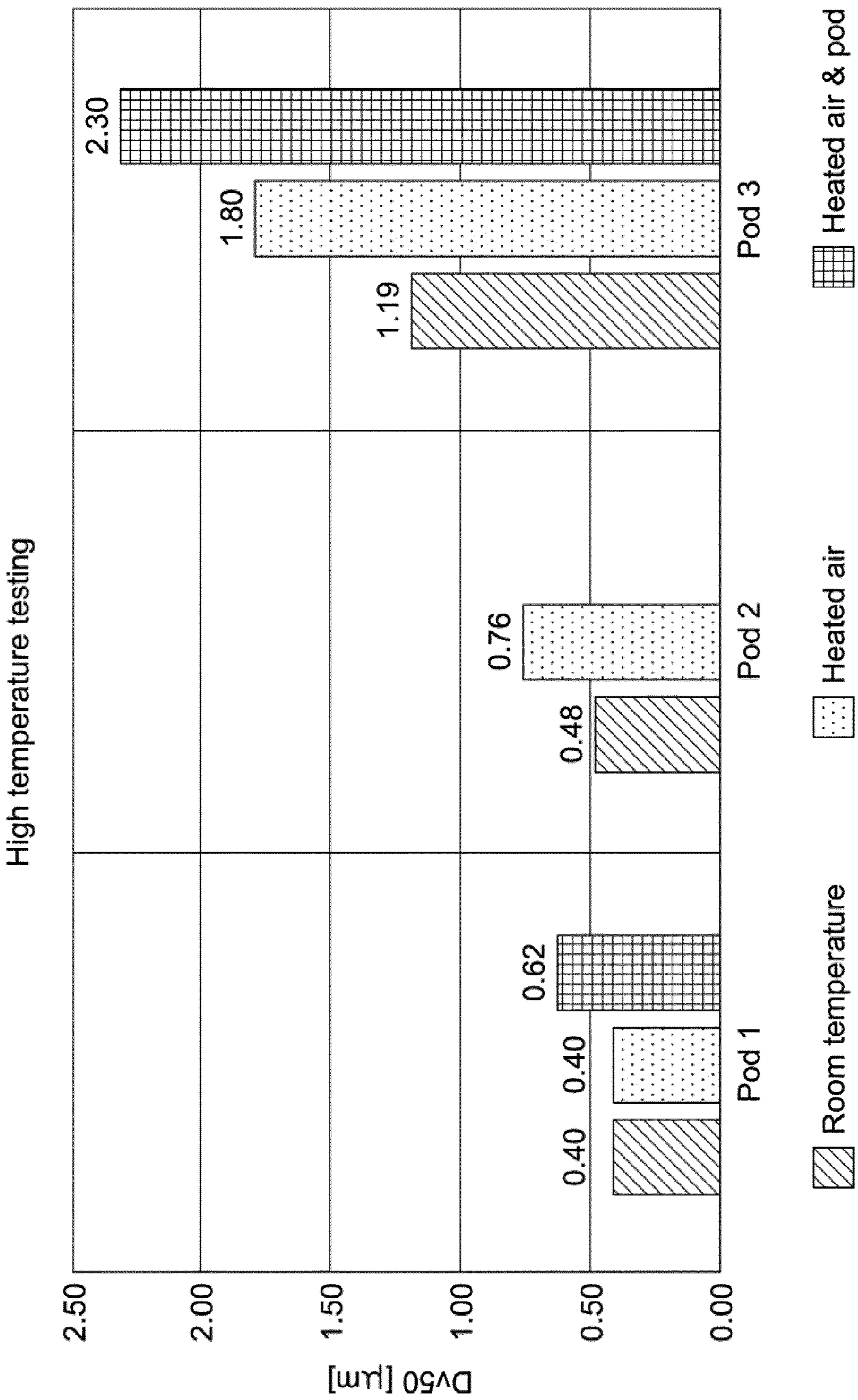
FIG. 14 shows a plot of aerosol particle size (Dv50) experimental results dependent on the temperature of the air and the heating state of the apparatus.

FIG. 14 shows the high temperature testing results of a tenth example. Larger particle sizes were observed from all 3 pods when the temperature of inlet air increased from room temperature (23° C.) to 50° C. When the pods were heated as well, two of the three pods saw even larger particle size measurement results, while pod 2 was unable to be measured due to significant amount of leakage.

Without wishing to be bound by theory, the results of the tenth example are in line with the inventors' insight that control over the vapor cooling rate provides an important degree of control over the particle size of the aerosol. As reported above, the use of a slow air velocity can have the result of the formation of an aerosol with large Dv50. It is considered that this is due to slower air velocity allowing a slower cooling rate of the vapor.

Another conclusion related to laminar flow can also be explained by a cooling rate theory of the tenth example: laminar flow allows slow and gradual mixing between cold air and hot vapor, which means the vapor can cool down in slower rate when the airflow is laminar, resulting in larger particle size.

The results in FIG. 14 further validate this cooling rate theory of the tenth example: when the inlet air has higher temperature, the temperature difference between hot vapor and cold air becomes smaller, which allows the vapor to cool down at a slower rate, resulting in larger particle size; when the pods were heated as well, this mechanism was exaggerated even more, leading to an even slower cooling rate and an even larger particle size.

Eleventh Example: Further Consideration of Vapor Cooling Rate

Figure 15:
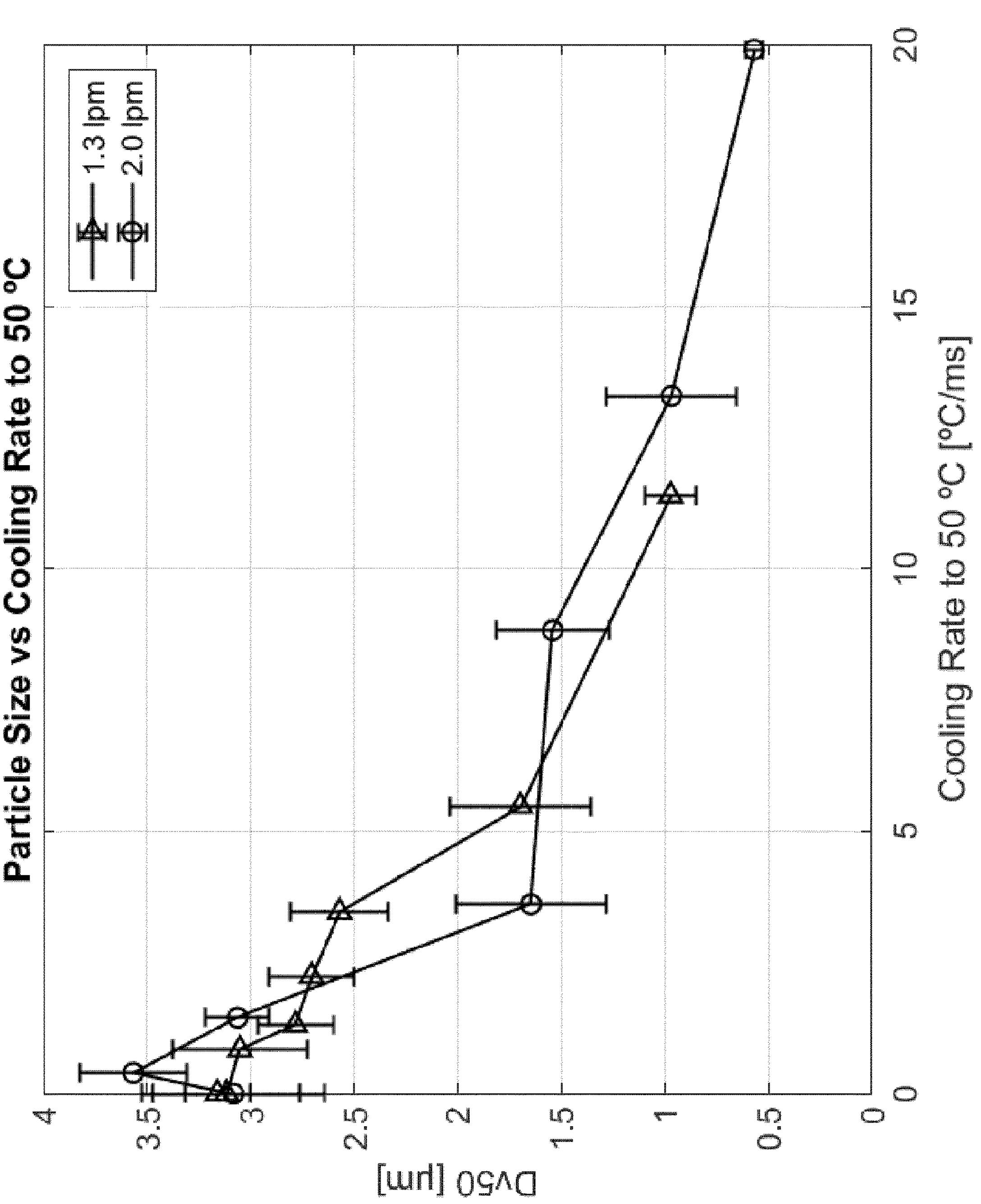
FIG. 15 shows a plot of aerosol particle size (Dv50) experimental results against vapor cooling rate to 50° C.
Figure 16:
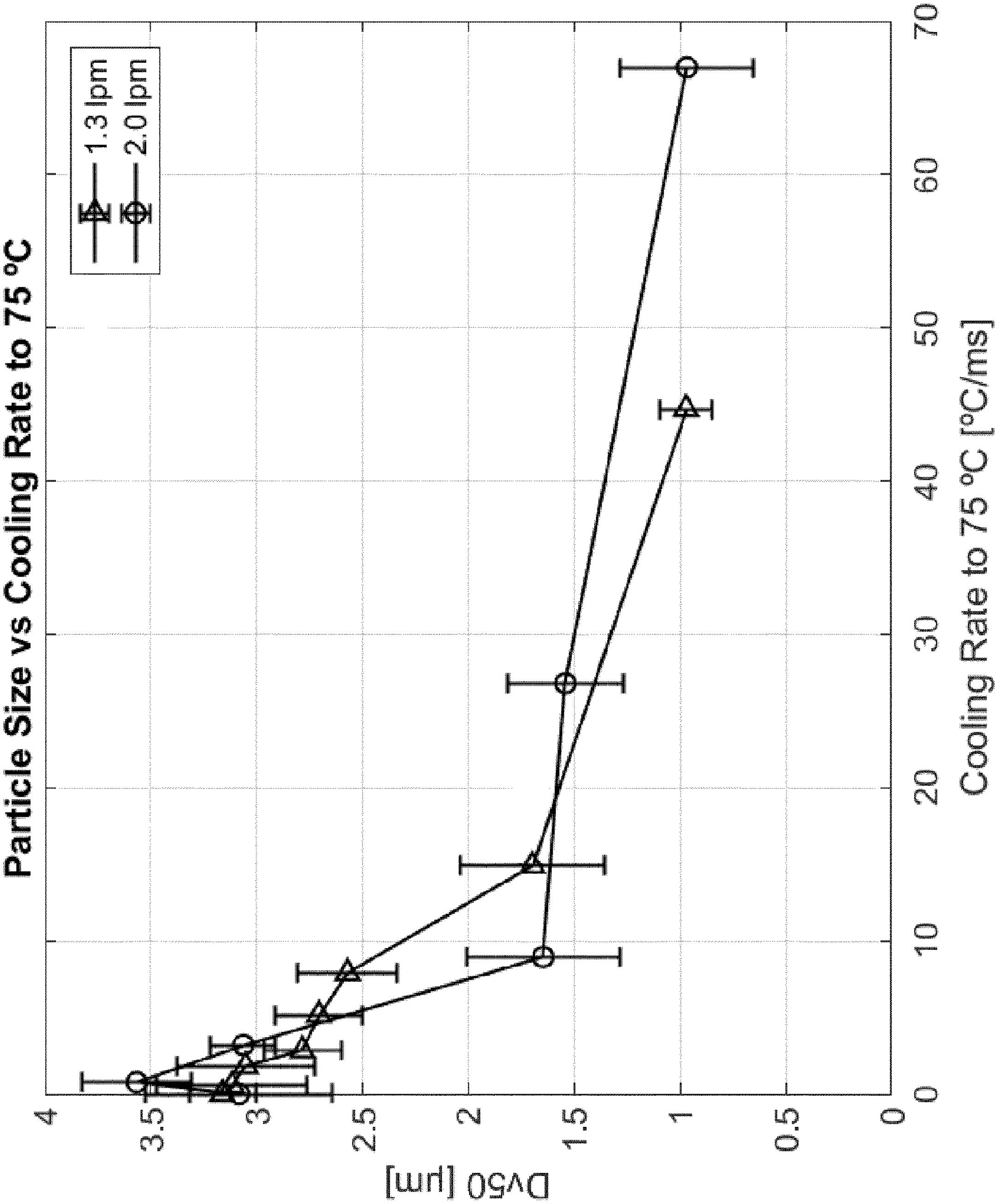
FIG. 16 shows a plot of aerosol particle size (Dv50) experimental results against vapor cooling rate to 75° C.

In the sixth example, the vapor cooling rates for each tube size and flow rate combination were obtained via multiphysics simulation. In FIG. 15 and FIG. 16, the particle size measurement results were plotted against vapor cooling rate to 50° C. and 75° C., respectively.

The data in these graphs indicates that in order to obtain an aerosol with Dv50 larger than 1 μm, the apparatus should be operable to require more than 16 ms for the vapor to cool to 50° C., or an equivalent (simplified to an assumed linear) cooling rate being slower than 10° C./ms. From an alternative viewpoint, in order to obtain an aerosol with Dv50 larger than 1 μm, the apparatus should be operable to require more than 4.5 ms for the vapor to cool to 75° C., or an equivalent (simplified to an assumed linear) cooling rate slower than 30° C./ms.

Furthermore, in order to obtain an aerosol with Dv50 of 2 μm or larger, the apparatus should be operable to require more than 32 ms for the vapor to cool to 50° C., or an equivalent (simplified to an assumed linear) cooling rate being slower than 5° C./ms. From an alternative viewpoint, in order to obtain an aerosol with Dv50 of 2 μm or larger, the apparatus should be operable to require more than 13 ms for the vapor to cool to 75° C., or an equivalent (simplified to an assumed linear) cooling rate slower than 10° C./ms.

Conclusions of Particle Size Experimental Work

In the above example, particle size (Dv50) of aerosols generated in a set of rectangular tubes was studied in order to decouple different factors (flow rate, air velocity, Reynolds number, tube size) affecting aerosol particle size. It is considered that air velocity is an important factor affecting particle size—slower air velocity leads to larger particle size. When air velocity was kept constant, the other factors (flow rate, Reynolds number, tube size) has low influence on particle size.

The role of turbulence was also investigated in the above examples. It is considered that laminar air flow favors generation of large particles, and introducing turbulence deteriorates (reduces) the particle size.

Modelling methods were used in some of the above examples to simulate the average air velocity, the maximum air velocity, and the turbulence intensity in the vicinity of the wick. A COMSOL model with three coupled physics has also been developed to obtain the vapor cooling rate.

All experimental and modelling results of the above examples support a cooling rate theory that slower vapor cooling rate is a significant factor in ensuring larger particle size. Slower air velocity, laminar air flow and higher inlet air temperature lead to larger particle size, because they all allow vapor to cool down at slower rates.

The features disclosed in the foregoing description, or in the following claims, or in the accompanying drawings, or in the above examples, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments and examples described above, many equivalent modifications and variations will be apparent to those skilled in the art when given this disclosure. Accordingly, the exemplary embodiments and examples of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

In the following numbered "clauses" are set out statements of broad combinations of novel and inventive features of the present disclosure herein disclosed.

Development A

A1. A smoking substitute apparatus comprising:
- a housing having a longitudinal axis;
- an air outlet provided at a first end of the housing;
- an air inlet provided at a second end of the housing opposite to the first end;
- an air flow channel extending through the housing between the air inlet and the air outlet;
- an aerosol generator in fluid communication with the air flow channel, configured to generate an aerosol from an aerosol precursor; and
- one or more electrical contacts provided on a sidewall of the housing and electrically connected with the aerosol generator, wherein the one or more electrical contacts are configured to engage with corresponding electrical terminals on a main body of a smoking substitute system.

A2. A smoking substitute apparatus according to clause A1, wherein the one or more electrical contacts are provided on an outer surface of the sidewall of the housing.

A3. A smoking substitute apparatus according to clause A1, wherein the one or more electrical contacts have an electrically conductive surface which is parallel to the longitudinal axis of the housing.

A4. A smoking substitute apparatus according to clause A3, wherein the one or more electrical contacts is resiliently movable in a radial direction.

A5. A smoking substitute apparatus according to clause A1 or A2, wherein the one or more electrical contacts have an electrically conductive surface which is radial.

A6. A smoking substitute apparatus according to clause A5, wherein the one or more electrical contacts is resiliently movable in an axial direction.

A7. A smoking substitute apparatus according to any of the preceding clauses A1 to A6, wherein a pair of contacts is provided on diametrically opposite sides of the housing.

A8. A smoking substitute apparatus according to any one of the preceding clauses A1 to A7, wherein the air inlet has an area which is at least 50% of a total area of the second end of the housing.

A9. A smoking substitute apparatus according to any one of the preceding clauses A1 to A8, wherein the air inlet has an area which is at least 80% of a total area of the second end of the housing.

A10. A smoking substitute apparatus according to any one of the preceding clauses A1 to A9, wherein the air inlet has an area which is at least 90% of a total area of the second end of the housing.

A11. A smoking substitute apparatus according to any one of the preceding clauses A1 to A10 wherein the aerosol generator includes a heater operable to vaporize the aerosol precursor.

A12. A smoking substitute system comprising:
- a main body having one or more electrical contacts connected to, or connectable to, a power source in the main body; and
- a smoking substitute apparatus according to any of the preceding clauses A1 to A11.

A13. A smoking substitute system according to clause A12 wherein the one or more electrical contacts on the main body have an electrically conductive surface which is parallel to a longitudinal axis of the main body and the one or more electrical contacts of the smoking substitute apparatus have an electrically conductive surface which is parallel to the longitudinal axis of the housing, wherein respective contacts of the main body and the smoking substitute apparatus are configured to engage by a sliding fit.

A14. A smoking substitute system according to clause A13, wherein the one or more electrical contacts on the main body are resiliently movable in a radial direction.

A15. A smoking substitute system according to clause A12 wherein the one or more electrical contacts on the main body have a radial electrically conductive surface and the one or more electrical contacts of the smoking substitute apparatus have a radial electrically conductive surface.

A16. A smoking substitute system according to clause A15, wherein the one or more electrical contacts on the main body are resiliently movable in an axial direction.

A17. A smoking substitute device comprising a main body having one or more electrical contacts connected to, or connectable to, a power source in the main body, wherein said one or more electrical contacts are configured for engagement with the electrical contacts of a smoking substitute apparatus according to any one of clauses A1 to A11.

A18. A smoking substitute device according to clause A17 wherein the electrical contacts of the main body are located on an inner wall of a recessed region, said recessed region being shaped to receive at least a corresponding part of the smoking substitute apparatus.

Development B

B1. A smoking substitute apparatus comprising:

a housing having a longitudinal axis;

an air inlet provided at a first end of the housing and an air outlet provided at a second end of the housing opposite the first end;

an air flow channel extending longitudinally between the air inlet and the air outlet through the housing; and an aerosol generation chamber, the aerosol generation chamber having an aerosol generator configured to generate an aerosol from an aerosol precursor, wherein the aerosol generation chamber forms part of the air flow channel at a position downstream of the air inlet along the air flow channel;

wherein the first end of the housing has a first cross-sectional area and the air inlet has a second cross-sectional area, and wherein a ratio of the second cross-sectional area to the first cross-sectional area, expressed as a percentage, is at least 5%.

B2. A smoking substitute apparatus according to clause B1, wherein the ratio of the second cross-sectional area to the first cross-sectional area, expressed as a percentage, is at least 10%, optionally at least 20%, optionally at least 30%, optionally at least 40%, optionally at least 50%, optionally at least 60%, optionally at least 70%, optionally at least 80%, optionally at least 90%.

B3. A smoking substitute apparatus according to clause B1 or B2, wherein the ratio of the second cross-sectional area to the first cross-sectional area, expressed as a percentage, is less than 95%.

B4. A smoking substitute apparatus according to any one of the preceding clauses B1 to B3 wherein the aerosol generation chamber has a third cross-sectional area, and wherein the second cross-sectional area is less than the third cross-sectional area.

B5. A smoking substitute apparatus according to any one of clauses B1 to B3 wherein the aerosol generation chamber has a third cross-sectional area, and wherein the second cross-sectional area is equal to the third cross-sectional area.

B6. A smoking substitute apparatus according to any one of the preceding clauses B1 to B5, wherein the air inlet is configured to receive air flow from a substantially radial direction.

B7. A smoking substitute apparatus according to any one of the preceding clauses B1 to B6, wherein the air inlet has a first dimension in a first direction within a plane defined by the air inlet and a second dimension in a second direction orthogonal to the first direction, the second direction also being within the plane defined by the air inlet, wherein the first dimension is greater than the second dimension.

B8. A smoking substitute apparatus according to any one of the preceding clauses B1 to B7, wherein the air inlet is centered on the longitudinal axis of the housing.

B9. A smoking substitute apparatus according to any of the preceding clauses B1 to B8, comprising at least one electrical contact provided adjacent to the air inlet, wherein the at least one electrical contact is electrically connected to a heating element of the aerosol generator.

B10. A smoking substitute apparatus according to clause B9, wherein the at least one electrical contact is located beyond a perimeter of the air inlet.

B11. A smoking substitute apparatus according to clause B9 or B10, wherein the at least one electrical contact is substantially flush with an end face of the housing.

B12. A smoking substitute apparatus according to clause B9 or B10, wherein a channel is provided between the housing and the at least one electrical contact, the channel extending from the air inlet, the channel extending towards a perimeter of the housing.

B13. A smoking substitute apparatus according to clause B9, wherein at least one electrical contact is provided across the air inlet and wherein a perimeter of the air inlet extends radially beyond the at least one electrical contact, such that there is an air flow path between a perimeter of the housing and the air inlet which is not obstructed by the at least one electrical contact.

B14. A smoking substitute system comprising:

a main body; and a smoking substitute apparatus according to any of the preceding clauses B1 to B13.

B15. A smoking substitute system according to clause B14, comprising an upstream air flow channel positioned at least in part between the main body and the smoking substitute apparatus, the upstream air flow channel fluidly connecting with the air inlet.

What is claimed is:

1. A smoking substitute apparatus comprising:

a housing having a longitudinal axis;

an air outlet provided at a first end of the housing;

an air inlet provided at a second end of the housing opposite to the first end;

an air flow channel extending through the housing between the air inlet and the air outlet; and an aerosol generator in fluid communication with the air flow channel, configured to generate an aerosol from an aerosol precursor, wherein a sidewall of the housing extends between the first end of the housing and the second end of the housing, wherein first and second apparatus electrical contacts are provided on an outer surface of the sidewall of the housing and are electrically connected with the aerosol generator, wherein the first apparatus electrical contact is configured to engage with a corresponding first main body electrical contact on a main body of a smoking substitute system and the second apparatus electrical contact is configured to engage with a corresponding second main body electrical contact on the main body of the smoking substitute system, the first and second main body electrical contacts having different polarities.

2. A smoking substitute apparatus according to claim 1, wherein the first and second apparatus electrical contacts have an electrically conductive surface which is parallel to the longitudinal axis of the housing.

3. A smoking substitute apparatus according to claim 2, wherein the first and second apparatus electrical contacts are resiliently movable in a radial direction.

4. A smoking substitute apparatus according to claim 1, wherein the first and second apparatus electrical contacts have an electrically conductive surface which is radial.

5. A smoking substitute apparatus according to claim 4, wherein the first and second apparatus electrical contacts are resiliently movable in an axial direction.

6. A smoking substitute apparatus according to claim 1, wherein the first and second apparatus electrical contacts are provided on diametrically opposite sides of the housing.

7. A smoking substitute apparatus according to claim 1, wherein the air inlet has an area which is at least 50% of a total area of the second end of the housing.

8. A smoking substitute apparatus according to claim 1 wherein the aerosol generator includes a heater operable to vaporize the aerosol precursor.

9. A smoking substitute device comprising a main body having first and second main body electrical contacts configured to be connected to a power source in the main body, wherein the first main body electrical contact is configured for engagement with a corresponding first apparatus electrical contact of a smoking substitute apparatus and the second main body electrical contact is configured for engagement with a corresponding second apparatus electrical contact of the smoking substitute apparatus, the first and second main body electrical contacts having different polarities when connected to the power source, wherein the smoking substitute apparatus comprises:

a housing having a longitudinal axis;

an air outlet provided at a first end of the housing;

an air inlet provided at a second end of the housing opposite to the first end;

an air flow channel extending through the housing between the air inlet and the air outlet; and an aerosol generator in fluid communication with the air flow channel, configured to generate an aerosol from an aerosol precursor, wherein a sidewall of the housing extends between the first end of the housing and the second end of the housing, wherein the first and second apparatus electrical contacts are provided on an outer surface of the sidewall of the housing and are electrically connected with the aerosol generator.

10. A smoking substitute device according to claim 9 wherein the main body electrical contacts of the main body are located on an inner wall of a recessed region, said recessed region being shaped to receive at least a corresponding part of the smoking substitute apparatus.

11. A smoking substitute system comprising a smoking substitute device and a smoking substitute apparatus, the smoking substitute device comprising a main body having first and second main body electrical contacts configured to be connected to a power source in the main body, wherein the first main body electrical contact is configured for engagement with a corresponding first apparatus electrical contact of the smoking substitute apparatus and the second main body electrical contact is configured for engagement with a corresponding second apparatus electrical contact of the smoking substitute apparatus, the first and second main body electrical contacts having different polarities when connected to the power source, wherein the smoking substitute apparatus comprises:

a housing having a longitudinal axis;

an air outlet provided at a first end of the housing;

an air inlet provided at a second end of the housing opposite to the first end;

an air flow channel extending through the housing between the air inlet and the air outlet; and an aerosol generator in fluid communication with the air flow channel, configured to generate an aerosol from an aerosol precursor, wherein a sidewall of the housing extends between the first end of the housing and the second end of the housing, wherein the first and second apparatus electrical contacts are provided on an outer surface of the sidewall of the housing and are electrically connected with the aerosol generator.

12. A smoking substitute system according to claim 11 wherein the main body electrical contacts on the main body have an electrically conductive surface which is parallel to a longitudinal axis of the main body and the apparatus electrical contacts of the smoking substitute apparatus have an electrically conductive surface which is parallel to the longitudinal axis of the housing, wherein respective contacts of the main body and the smoking substitute apparatus are configured to engage by a sliding fit.

13. A smoking substitute system according to claim 12, wherein the main body electrical contacts on the main body are resiliently movable in a radial direction.

14. A smoking substitute system according to claim 13 wherein the main body electrical contacts on the main body have a radial electrically conductive surface and the electrical contacts of the smoking substitute apparatus have a radial electrically conductive surface.

15. A smoking substitute system according to claim 14, wherein the electrical contacts on the main body are resiliently movable in an axial direction.

* * * * *